United States Patent
Kreger-Stickles et al.

(10) Patent No.: US 12,341,690 B2
(45) Date of Patent: *Jun. 24, 2025

(54) SYSTEMS AND METHODS FOR A VLAN SWITCHING AND ROUTING SERVICE

(71) Applicant: Oracle International Corporation, Redwood Shores, CA (US)

(72) Inventors: Lucas Michael Kreger-Stickles, Seattle, WA (US); Shane Baker, Kenmore, WA (US); Bryce Eugene Bockman, Seattle, WA (US); Peter Croft Jones, Lexington, MA (US); Jagwinder Singh Brar, Bellevue, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,943

(22) Filed: Oct. 31, 2023

(65) Prior Publication Data

US 2024/0080269 A1    Mar. 7, 2024

Related U.S. Application Data

(63) Continuation of application No. 17/958,800, filed on Oct. 3, 2022, now Pat. No. 11,818,040, which is a
(Continued)

(51) Int. Cl.
*G06F 15/173* (2006.01)
*H04L 9/40* (2022.01)
(Continued)

(52) U.S. Cl.
CPC ........ *H04L 45/586* (2013.01); *H04L 12/4641* (2013.01); *H04L 45/02* (2013.01);
(Continued)

(58) Field of Classification Search
CPC ............................ H04L 65/1086; H04L 51/04
(Continued)

(56) References Cited

U.S. PATENT DOCUMENTS

| | | |
|---|---|---|
| 6,594,704 B1 | 7/2003 | Birenbach et al. |
| 6,628,624 B1 | 9/2003 | Mahajan et al. |

(Continued)

FOREIGN PATENT DOCUMENTS

| | | |
|---|---|---|
| CA | 2991359 A1 | 5/2018 |
| CN | 1964360 A | 5/2007 |

(Continued)

OTHER PUBLICATIONS

U.S. Appl. No. 18/315,970, "Non-Final Office Action", Apr. 15, 2024, 19 pages.

(Continued)

*Primary Examiner* — Hee Soo Kim
(74) *Attorney, Agent, or Firm* — Kilpatrick Townsend & Stockton LLP

(57) ABSTRACT

Systems and methods for a VLAN switching and routing service (VSRS) are disclosed herein. A method can include generating a table for an instance of a VSRS, which VSRS couples a first virtual layer 2 network (VLAN) with a second network. The table can contain information identifying IP addresses, MAC addresses, and virtual interface identifiers for instances within the virtual layer 2 network. The method can include receiving with the VSRS a packet from a first instance designated for delivery to a second instance within the virtual layer 2 network, identifying with the VSRS the second instance within the virtual layer 2 network for delivery of the packet based on information received with the packet and information contained within the table, and delivering the packet to the identified second instance.

20 Claims, 28 Drawing Sheets

Related U.S. Application Data continuation of application No. 17/376,002, filed on Jul. 14, 2021, now Pat. No. 11,463,355.

(60) Provisional application No. 63/132,377, filed on Dec. 30, 2020, provisional application No. 63/051,728, filed on Jul. 14, 2020.

(51) Int. Cl.
*H04L 12/46* (2006.01)
*H04L 45/00* (2022.01)
*H04L 45/02* (2022.01)
*H04L 45/586* (2022.01)
*H04L 45/745* (2022.01)
*H04L 49/00* (2022.01)
*H04L 61/103* (2022.01)
*H04L 61/4552* (2022.01)
*H04L 67/10* (2022.01)
*H04L 101/622* (2022.01)

(52) U.S. Cl.
CPC ............ *H04L 45/66* (2013.01); *H04L 45/745* (2013.01); *H04L 49/70* (2013.01); *H04L 61/103* (2013.01); *H04L 61/4552* (2022.05); *H04L 63/101* (2013.01); *H04L 63/166* (2013.01); *H04L 67/10* (2013.01); *H04L 2101/622* (2022.05)

(58) Field of Classification Search
USPC ......................................................... 709/206
See application file for complete search history.

(56) References Cited

U.S. PATENT DOCUMENTS

| | | |
|---|---|---|
| 6,801,506 B1 | 10/2004 | Dey |
| 6,857,027 B1 | 2/2005 | Lindeborg |
| 6,987,740 B1 | 1/2006 | Di Benedetto et al. |
| 7,061,875 B1 | 6/2006 | Portolani et al. |
| 7,127,523 B2 | 10/2006 | Kotser |
| 7,177,946 B1 | 2/2007 | Kaluve et al. |
| 7,463,597 B1 | 12/2008 | Kompella |
| 7,478,173 B1 | 1/2009 | Delco |
| 7,480,258 B1 | 1/2009 | Shuen et al. |
| 7,483,370 B1 | 1/2009 | Dayal et al. |
| 7,596,101 B2 | 9/2009 | Oguchi |
| 7,606,177 B1 | 10/2009 | Mahajan |
| 7,729,296 B1 | 6/2010 | Choudhary |
| 7,746,783 B1 | 6/2010 | Tripathi et al. |
| 7,792,056 B2 | 9/2010 | Sullivan et al. |
| 7,801,061 B2 | 9/2010 | Khan et al. |
| 7,821,931 B2 | 10/2010 | Swenson et al. |
| 8,441,942 B1 | 5/2013 | Guha et al. |
| 8,730,963 B1 | 5/2014 | Grosser et al. |
| 8,892,724 B1 | 11/2014 | Bertz et al. |
| 8,918,608 B2 | 12/2014 | Shatz |
| 9,154,327 B1 | 10/2015 | Marino et al. |
| 9,176,763 B2 | 11/2015 | Eidus et al. |
| 9,306,832 B2 | 4/2016 | Fishman et al. |
| 9,419,937 B2 | 8/2016 | Bhagwat et al. |
| 9,432,250 B2 | 8/2016 | Ma et al. |
| 9,477,505 B2 | 10/2016 | Eidus et al. |
| 9,647,902 B2 | 5/2017 | Fishman et al. |
| 9,648,121 B2 | 5/2017 | Figovsky et al. |
| 9,652,274 B2 | 5/2017 | Shatz |
| 9,866,525 B2 | 1/2018 | Figovsky et al. |
| 9,946,870 B2 | 4/2018 | Eidus et al. |
| 9,948,579 B1 | 4/2018 | Sivaramakrishnan |
| 10,009,371 B2 | 6/2018 | Antony |
| 10,063,469 B2 | 8/2018 | Shen et al. |
| 10,178,073 B2 | 1/2019 | Shaposhnik |
| 10,374,956 B1 | 8/2019 | Tracy et al. |
| 10,484,331 B1 | 11/2019 | Rossman |
| 10,516,599 B1 | 12/2019 | Sebastian et al. |
| 10,616,104 B2 | 4/2020 | Shen et al. |
| 10,623,433 B1 | 4/2020 | Veselov et al. |
| 10,671,424 B2 | 6/2020 | Behera et al. |
| 10,708,082 B1 | 7/2020 | Bakiaraj et al. |
| 10,778,465 B1 | 9/2020 | Borle |
| 10,834,044 B2 | 11/2020 | Tillotson et al. |
| 10,931,478 B2 | 2/2021 | Nunes et al. |
| 11,159,366 B1 | 10/2021 | Gawade et al. |
| 11,171,834 B1 | 11/2021 | Bockelmann et al. |
| 11,206,213 B2 | 12/2021 | Shen et al. |
| 11,316,822 B1 | 4/2022 | Gawade et al. |
| 11,347,537 B2 | 5/2022 | Behera et al. |
| 11,463,355 B2 | 10/2022 | Kreger-Stickles et al. |
| 11,496,392 B2 | 11/2022 | Agarwal et al. |
| 11,502,950 B2 | 11/2022 | Bays |
| 11,502,958 B2 | 11/2022 | Masurekar et al. |
| 11,637,770 B2 | 4/2023 | Tracy et al. |
| 11,652,743 B2 | 5/2023 | Brar et al. |
| 11,671,355 B2 | 6/2023 | Baker et al. |
| 11,689,455 B2 | 6/2023 | Brar et al. |
| 11,757,773 B2 | 9/2023 | Brar et al. |
| 11,765,080 B2 | 9/2023 | Brar et al. |
| 11,777,897 B2 | 10/2023 | Baker et al. |
| 11,818,040 B2 | 11/2023 | Kreger-Stickles et al. |
| 11,831,544 B2 | 11/2023 | Kreger-stickles et al. |
| 11,876,708 B2 | 1/2024 | Kreger-Stickles et al. |
| 11,909,636 B2 | 2/2024 | Brar et al. |
| 12,015,552 B2 | 6/2024 | Brar et al. |
| 12,177,120 B2 | 12/2024 | Brar et al. |
| 2002/0120769 A1 | 8/2002 | Ammitzboell |
| 2003/0225908 A1 | 12/2003 | Srinivasan et al. |
| 2004/0190454 A1 | 9/2004 | Higasiyama |
| 2004/0210623 A1 | 10/2004 | Hydrie et al. |
| 2004/0221087 A1 | 11/2004 | Benedetto et al. |
| 2005/0013260 A1 | 1/2005 | Ramanathan et al. |
| 2005/0138008 A1 | 6/2005 | Tsillas |
| 2005/0169239 A1 | 8/2005 | Knees et al. |
| 2005/0220036 A1 | 10/2005 | Sugitani et al. |
| 2005/0222815 A1 | 10/2005 | Tolly |
| 2006/0007869 A1 | 1/2006 | Hirota et al. |
| 2006/0045089 A1 | 3/2006 | Bacher et al. |
| 2006/0133287 A1 | 6/2006 | Nishi |
| 2006/0274665 A1 | 12/2006 | Hatori et al. |
| 2007/0008964 A1 | 1/2007 | Rose et al. |
| 2007/0025275 A1 | 2/2007 | Tallet et al. |
| 2007/0047472 A1 | 3/2007 | Florit et al. |
| 2007/0088829 A1 | 4/2007 | Shima et al. |
| 2007/0094411 A1 | 4/2007 | Mullane et al. |
| 2007/0097859 A1 | 5/2007 | Tancevski et al. |
| 2007/0115967 A1 | 5/2007 | Vandenberghe et al. |
| 2007/0121672 A1 | 5/2007 | Kang |
| 2007/0159987 A1 | 7/2007 | Khan et al. |
| 2007/0280238 A1 | 12/2007 | Lund |
| 2007/0280239 A1 | 12/2007 | Lund |
| 2008/0101219 A1 | 5/2008 | Rose et al. |
| 2008/0123561 A1 | 5/2008 | Sharma et al. |
| 2008/0165705 A1 | 7/2008 | Umayabashi et al. |
| 2008/0205387 A1 | 8/2008 | Wakumoto |
| 2008/0205402 A1 | 8/2008 | McGee et al. |
| 2008/0279203 A1 | 11/2008 | Ramalho Ribeiro dos Santos et al. |
| 2008/0291822 A1 | 11/2008 | Farkas et al. |
| 2008/0316917 A1 | 12/2008 | Farkas et al. |
| 2009/0063706 A1 | 3/2009 | Goldman et al. |
| 2009/0109972 A1 | 4/2009 | Chen |
| 2009/0154694 A1 | 6/2009 | Yamauchi et al. |
| 2009/0164522 A1 | 6/2009 | Fahey |
| 2009/0175203 A1 | 7/2009 | Tabery et al. |
| 2009/0180489 A1 | 7/2009 | Fujita et al. |
| 2009/0185571 A1 | 7/2009 | Tallet |
| 2009/0219817 A1 | 9/2009 | Carley |
| 2009/0219836 A1 | 9/2009 | Khan et al. |
| 2009/0274153 A1 | 11/2009 | Kuo et al. |
| 2009/0287848 A1 | 11/2009 | Kamura et al. |
| 2009/0316584 A1 | 12/2009 | Tanaka et al. |
| 2009/0327462 A1 | 12/2009 | Adams et al. |
| 2010/0002577 A1 | 1/2010 | Moreno et al. |
| 2010/0014526 A1 | 1/2010 | Chavan et al. |
| 2010/0110880 A1 | 5/2010 | Kulkarni et al. |

(56) References Cited

U.S. PATENT DOCUMENTS

| | | |
|---|---|---|
| 2010/0131636 A1 | 5/2010 | Suri et al. |
| 2010/0232322 A1 | 9/2010 | Umayabashi et al. |
| 2010/0290479 A1 | 11/2010 | Baron et al. |
| 2011/0032825 A1 | 2/2011 | Minkenberg et al. |
| 2011/0064002 A1 | 3/2011 | Khan et al. |
| 2011/0090910 A1 | 4/2011 | Tripathi et al. |
| 2011/0158248 A1 | 6/2011 | Vorunganti et al. |
| 2011/0249551 A1 | 10/2011 | Rollins |
| 2011/0264610 A1 | 10/2011 | Armstrong et al. |
| 2011/0273984 A1 | 11/2011 | Hsu et al. |
| 2011/0280159 A1 | 11/2011 | Miller |
| 2011/0283017 A1 | 11/2011 | Alkhatib et al. |
| 2011/0317703 A1 | 12/2011 | Dunbar et al. |
| 2012/0014291 A1 | 1/2012 | Matinotti |
| 2012/0014386 A1 | 1/2012 | Xiong et al. |
| 2012/0014387 A1 | 1/2012 | Dunbar et al. |
| 2012/0044837 A1 | 2/2012 | Ibanez Fernandez et al. |
| 2012/0051266 A1 | 3/2012 | Lindstrom et al. |
| 2012/0110055 A1 | 5/2012 | Van Biljon et al. |
| 2012/0110056 A1 | 5/2012 | Van Biljon et al. |
| 2012/0110180 A1 | 5/2012 | Van Biljon et al. |
| 2012/0110188 A1 | 5/2012 | Van Biljon et al. |
| 2012/0110636 A1 | 5/2012 | Van Biljon et al. |
| 2012/0110650 A1 | 5/2012 | Van Biljon et al. |
| 2012/0110651 A1 | 5/2012 | Van Biljon et al. |
| 2012/0117229 A1 | 5/2012 | Van Biljon et al. |
| 2012/0201539 A1 | 8/2012 | Boertjes et al. |
| 2012/0207177 A1 | 8/2012 | Sharma et al. |
| 2012/0210319 A1 | 8/2012 | Recio et al. |
| 2012/0216194 A1 | 8/2012 | Hadas et al. |
| 2012/0250695 A1 | 10/2012 | Jia et al. |
| 2012/0291026 A1 | 11/2012 | Biswas et al. |
| 2012/0307684 A1 | 12/2012 | Biswas et al. |
| 2012/0324442 A1 | 12/2012 | Barde |
| 2013/0003608 A1 | 1/2013 | Lei et al. |
| 2013/0031233 A1 | 1/2013 | Feng et al. |
| 2013/0044631 A1 | 2/2013 | Biswas et al. |
| 2013/0044636 A1 | 2/2013 | Koponen et al. |
| 2013/0061047 A1 | 3/2013 | Sridharan et al. |
| 2013/0083647 A1 | 4/2013 | Xie |
| 2013/0114400 A1 | 5/2013 | Zhang et al. |
| 2013/0188640 A1 | 7/2013 | Cors et al. |
| 2013/0227108 A1 | 8/2013 | Dunbar et al. |
| 2013/0259037 A1 | 10/2013 | Natarajan et al. |
| 2013/0259051 A1 | 10/2013 | Puneet |
| 2013/0286832 A1 | 10/2013 | Rajah et al. |
| 2013/0301440 A1 | 11/2013 | Yajima et al. |
| 2013/0301553 A1 | 11/2013 | Klein |
| 2013/0315580 A1 | 11/2013 | Boertjes et al. |
| 2014/0003442 A1 | 1/2014 | Hernandez et al. |
| 2014/0036924 A1 | 2/2014 | Christenson |
| 2014/0090910 A1 | 4/2014 | Treadway et al. |
| 2014/0092725 A1 | 4/2014 | Lindstrom |
| 2014/0112205 A1 | 4/2014 | Prakash et al. |
| 2014/0122704 A1 | 5/2014 | Wang |
| 2014/0126418 A1 | 5/2014 | Brendel et al. |
| 2014/0153445 A1 | 6/2014 | Huang |
| 2014/0185616 A1 | 7/2014 | Bloch et al. |
| 2014/0189075 A1 | 7/2014 | Stansell et al. |
| 2014/0233370 A1 | 8/2014 | Khare et al. |
| 2014/0247754 A1 | 9/2014 | Venkata et al. |
| 2014/0254604 A1 | 9/2014 | Janardhanan et al. |
| 2014/0280841 A1 | 9/2014 | Kamble et al. |
| 2014/0310390 A1 | 10/2014 | Sorenson, III et al. |
| 2014/0328340 A1 | 11/2014 | DeCusatis et al. |
| 2014/0376550 A1 | 12/2014 | Khan et al. |
| 2015/0009831 A1 | 1/2015 | Graf |
| 2015/0043576 A1* | 2/2015 | Dixon .................. H04L 61/103 |
| | | 370/392 |
| 2015/0058463 A1 | 2/2015 | Wang et al. |
| 2015/0058968 A1 | 2/2015 | Wang et al. |
| 2015/0071110 A1 | 3/2015 | Kothari et al. |
| 2015/0074661 A1 | 3/2015 | Kothari et al. |
| 2015/0082301 A1 | 3/2015 | Garg et al. |
| 2015/0103842 A1* | 4/2015 | Chandrashekhar ......................... G06F 9/45558 |
| | | 370/409 |
| 2015/0124643 A1 | 5/2015 | Pani et al. |
| 2015/0124814 A1 | 5/2015 | De Silva et al. |
| 2015/0200808 A1 | 7/2015 | Gourlay et al. |
| 2015/0264121 A1 | 9/2015 | Van Biljon et al. |
| 2015/0312049 A1 | 10/2015 | Duda |
| 2015/0350095 A1 | 12/2015 | Raney |
| 2015/0358231 A1 | 12/2015 | Zhang et al. |
| 2015/0365281 A1 | 12/2015 | Marino et al. |
| 2016/0006647 A1 | 1/2016 | Ikegami |
| 2016/0087885 A1 | 3/2016 | Tripathi et al. |
| 2016/0094650 A1 | 3/2016 | Garcia de Rio |
| 2016/0105393 A1 | 4/2016 | Thakkar et al. |
| 2016/0105471 A1 | 4/2016 | Nunes et al. |
| 2016/0110211 A1 | 4/2016 | Karnes |
| 2016/0149795 A1 | 5/2016 | Kang et al. |
| 2016/0149799 A1 | 5/2016 | Yu et al. |
| 2016/0173296 A1 | 6/2016 | Ooi |
| 2016/0182336 A1 | 6/2016 | Doctor et al. |
| 2016/0218972 A1 | 7/2016 | Sun |
| 2016/0224363 A1 | 8/2016 | Joy |
| 2016/0241474 A1 | 8/2016 | Wang et al. |
| 2016/0274967 A1 | 9/2016 | Umbehocker et al. |
| 2016/0323121 A1* | 11/2016 | Benny .................. H04L 45/74 |
| 2016/0335129 A1 | 11/2016 | Behera et al. |
| 2016/0352624 A1 | 12/2016 | Mishra et al. |
| 2016/0359731 A1 | 12/2016 | Kaku |
| 2017/0085667 A1 | 3/2017 | Flack et al. |
| 2017/0126726 A1 | 5/2017 | Han |
| 2017/0161090 A1 | 6/2017 | Kodama |
| 2017/0163599 A1 | 6/2017 | Shen et al. |
| 2017/0180249 A1 | 6/2017 | Shen et al. |
| 2017/0180250 A1 | 6/2017 | Shen et al. |
| 2017/0257340 A1 | 9/2017 | Richardson et al. |
| 2017/0279668 A1 | 9/2017 | Shevenell et al. |
| 2017/0302569 A1 | 10/2017 | Ramaswamy et al. |
| 2017/0324826 A1 | 11/2017 | Johnsen et al. |
| 2017/0364973 A1 | 12/2017 | Van Biljon et al. |
| 2017/0373952 A1 | 12/2017 | Shem Tov et al. |
| 2018/0006923 A1 | 1/2018 | Gao et al. |
| 2018/0007005 A1 | 1/2018 | Chanda et al. |
| 2018/0018193 A1 | 1/2018 | Yabushita et al. |
| 2018/0019956 A1 | 1/2018 | Ravindran et al. |
| 2018/0026872 A1 | 1/2018 | Manthiramoorthy et al. |
| 2018/0041477 A1 | 2/2018 | Shaposhnik |
| 2018/0048523 A1 | 2/2018 | Nakano et al. |
| 2018/0062923 A1 | 3/2018 | Katrekar et al. |
| 2018/0063074 A1 | 3/2018 | Shankarappa et al. |
| 2018/0069787 A1 | 3/2018 | Hill et al. |
| 2018/0098269 A1 | 4/2018 | Pradas et al. |
| 2018/0121223 A1 | 5/2018 | Cui et al. |
| 2018/0123954 A1 | 5/2018 | Jiang et al. |
| 2018/0124139 A1 | 5/2018 | Jiang et al. |
| 2018/0139123 A1 | 5/2018 | Qiang |
| 2018/0181417 A1 | 6/2018 | Nallapareddy et al. |
| 2018/0205573 A1 | 7/2018 | Roychoudhury et al. |
| 2018/0212928 A1 | 7/2018 | Gerber et al. |
| 2018/0234298 A1 | 8/2018 | Cohn et al. |
| 2018/0239631 A1 | 8/2018 | Behera et al. |
| 2018/0241610 A1 | 8/2018 | Wang et al. |
| 2018/0260292 A1 | 9/2018 | Wang et al. |
| 2018/0270140 A1 | 9/2018 | Taniguchi et al. |
| 2018/0287966 A1 | 10/2018 | Kamath et al. |
| 2018/0302315 A1 | 10/2018 | Kamisetty et al. |
| 2018/0309718 A1 | 10/2018 | Zuo |
| 2018/0338265 A1 | 11/2018 | Goel et al. |
| 2018/0343319 A1 | 11/2018 | Kutty et al. |
| 2018/0349163 A1 | 12/2018 | Gao et al. |
| 2018/0359171 A1 | 12/2018 | Kommula et al. |
| 2018/0367341 A1 | 12/2018 | Wallace et al. |
| 2018/0367417 A1 | 12/2018 | Dixit et al. |
| 2018/0375799 A1 | 12/2018 | Liu et al. |
| 2019/0004780 A1 | 1/2019 | Arumugam et al. |
| 2019/0014039 A1 | 1/2019 | Shen et al. |
| 2019/0028299 A1 | 1/2019 | Murray |
| 2019/0028424 A1 | 1/2019 | Mittal et al. |
| 2019/0028435 A1 | 1/2019 | Khare et al. |

(56) References Cited

U.S. PATENT DOCUMENTS

| | | | |
|---|---|---|---|
| 2019/0036729 A1 | 1/2019 | Warade et al. | |
| 2019/0036802 A1 | 1/2019 | Kuttuva Jeyaram | |
| 2019/0036868 A1* | 1/2019 | Chandrashekhar | ... H04L 45/021 |
| 2019/0059117 A1 | 2/2019 | Shu et al. | |
| 2019/0065228 A1 | 2/2019 | Tsirkin et al. | |
| 2019/0068496 A1 | 2/2019 | Tessmer et al. | |
| 2019/0104069 A1 | 4/2019 | Kommula et al. | |
| 2019/0132241 A1 | 5/2019 | Vattem et al. | |
| 2019/0132286 A1 | 5/2019 | Holla et al. | |
| 2019/0140931 A1 | 5/2019 | Ganichev et al. | |
| 2019/0166003 A1 | 5/2019 | Shelke et al. | |
| 2019/0173782 A1 | 6/2019 | Soliman et al. | |
| 2019/0222508 A1 | 7/2019 | Babu et al. | |
| 2019/0230025 A1 | 7/2019 | Kommula et al. | |
| 2019/0238642 A1 | 8/2019 | Sesham et al. | |
| 2019/0273683 A1 | 9/2019 | Jiang et al. | |
| 2019/0288871 A1 | 9/2019 | Xie et al. | |
| 2020/0007434 A1 | 1/2020 | Huang | |
| 2020/0036622 A1 | 1/2020 | Tamizkar | |
| 2020/0044959 A1 | 2/2020 | Bisht et al. | |
| 2020/0044969 A1 | 2/2020 | Hao et al. | |
| 2020/0052999 A1 | 2/2020 | Lee et al. | |
| 2020/0067821 A1 | 2/2020 | Sebastian | |
| 2020/0067838 A1 | 2/2020 | Perumal et al. | |
| 2020/0092252 A1 | 3/2020 | Tillotson et al. | |
| 2020/0092299 A1 | 3/2020 | Srinivasan et al. | |
| 2020/0099659 A1 | 3/2020 | Cometto et al. | |
| 2020/0112515 A1 | 4/2020 | Brar et al. | |
| 2020/0119974 A1 | 4/2020 | Subramani | |
| 2020/0177539 A1 | 6/2020 | Mittal et al. | |
| 2020/0213246 A1 | 7/2020 | Pan et al. | |
| 2020/0228447 A1 | 7/2020 | Shen et al. | |
| 2020/0236041 A1 | 7/2020 | Yu et al. | |
| 2020/0252291 A1 | 8/2020 | Mittal et al. | |
| 2020/0278879 A1 | 9/2020 | Behera et al. | |
| 2020/0280534 A1 | 9/2020 | Rajendran et al. | |
| 2020/0304413 A1 | 9/2020 | MacCarthaigh | |
| 2020/0382592 A1 | 12/2020 | Himura et al. | |
| 2020/0389796 A1 | 12/2020 | Olofsson et al. | |
| 2020/0409739 A1 | 12/2020 | Kamath et al. | |
| 2020/0409873 A1 | 12/2020 | Kamath et al. | |
| 2021/0058295 A1 | 2/2021 | Pianigiani et al. | |
| 2021/0067408 A1 | 3/2021 | Vaidya et al. | |
| 2021/0075630 A1 | 3/2021 | Immidi et al. | |
| 2021/0092057 A1* | 3/2021 | Devireddy | ... H04L 45/64 |
| 2021/0144177 A1 | 5/2021 | Tsirkin et al. | |
| 2021/0152516 A1 | 5/2021 | Moreno et al. | |
| 2021/0314232 A1 | 10/2021 | Nainar et al. | |
| 2021/0377166 A1 | 12/2021 | Brar et al. | |
| 2022/0021610 A1 | 1/2022 | Kreger-Stickles et al. | |
| 2022/0060415 A1 | 2/2022 | Dutta | |
| 2022/0094646 A1 | 3/2022 | Padala et al. | |
| 2022/0103487 A1 | 3/2022 | Ang et al. | |
| 2022/0150312 A1* | 5/2022 | Ranpise | ... H04L 61/50 |
| 2022/0200801 A1 | 6/2022 | Potlapally et al. | |

FOREIGN PATENT DOCUMENTS

| | | |
|---|---|---|
| CN | 100525312 C | 8/2009 |
| CN | 106936777 B | 2/2020 |
| EP | 2680514 A1 | 1/2014 |
| EP | 3462686 A1 | 4/2019 |
| EP | 3605969 A1 | 2/2020 |
| EP | 3617879 A1 | 3/2020 |
| EP | 3675423 A1 | 7/2020 |
| EP | 3716533 A1 | 9/2020 |
| EP | 3783835 A1 | 2/2021 |
| JP | 2010148063 A | 7/2010 |
| JP | 2013514046 A | 4/2013 |
| JP | 2013153262 A | 8/2013 |
| JP | 2014230057 A | 12/2014 |
| JP | 2014535252 A | 12/2014 |
| JP | 2015061121 A | 3/2015 |
| JP | 2015076874 A | 4/2015 |
| JP | 2017200099 A | 11/2017 |
| JP | 2017201804 A | 11/2017 |
| JP | 2018050306 A | 3/2018 |
| JP | 2018182418 A | 11/2018 |
| JP | 2018537006 A | 12/2018 |
| JP | 2020022100 A | 2/2020 |
| WO | 2010138937 A2 | 12/2010 |
| WO | 2016134380 A1 | 8/2016 |
| WO | 2018027007 A1 | 2/2018 |

OTHER PUBLICATIONS

European Application No. EP21839719.8, "Intention to Grant", Apr. 25, 2024, 8 pages.

European Application No. EP21840228.7, "Intention to Grant", Apr. 26, 2024, 7 pages.

U.S. Appl. No. 17/494,722, "Notice of Allowance", Feb. 6, 2024, 11 pages.

"Configuring Local Span, Rspan and Erspan", Cisco IOS Software Configuration Guide, Release 12.2SX, Chapter 68, Aug. 17, 2007, 36 pages.

"Configuring Traffic Storm Control", Cisco Nexus 5000 Series NX-OS Layer 2 Switching Configuration Guide, Release 5.0(3) N2(1), Jul. 29, 2011, pp. 1-4.

U.S. Appl. No. 17/168,888, Non-Final Office Action, Mailed On Nov. 10, 2022, 13 pages.

U.S. Appl. No. 17/168,888, Notice of Allowance, Mailed On Apr. 14, 2023, 9 pages.

U.S. Appl. No. 17/168,888, Notice of Allowance, Mailed On Feb. 23, 2023, 9 pages.

U.S. Appl. No. 17/192,681, Final Office Action, Mailed On Oct. 14, 2022, 18 pages.

U.S. Appl. No. 17/192,681, Non-Final Office Action, Mailed On Dec. 9, 2022, 16 pages.

U.S. Appl. No. 17/192,681, Non-Final Office Action, Mailed On Mar. 30, 2022, 34 pages.

U.S. Appl. No. 17/192,681, Notice of Allowance, Mailed On Apr. 12, 2023, 15 pages.

U.S. Appl. No. 17/192,681, Notice of Allowance, Mailed On Mar. 24, 2023, 15 pages.

U.S. Appl. No. 17/237,745, Non-Final Office Action, Mailed On Feb. 9, 2023, 24 pages.

U.S. Appl. No. 17/237,745, Non-Final Office Action, Mailed On Oct. 12, 2023, 29 pages.

U.S. Appl. No. 17/237,750, Non-Final Office Action, Mailed On Jun. 9, 2022, 27 pages.

U.S. Appl. No. 17/237,750, Notice of Allowance, Mailed On Jan. 25, 2023, 9 pages.

U.S. Appl. No. 17/347,061, Final Office Action, Mailed On Apr. 28, 2023, 11 pages.

U.S. Appl. No. 17/347,061, Non-Final Office Action, Mailed On Oct. 25, 2022, 17 pages.

U.S. Appl. No. 17/347,061, Notice of Allowance, Mailed On Jul. 26, 2023, 12 pages.

U.S. Appl. No. 17/375,999, "Corrected Notice of Allowability", Oct. 19, 2023, 2 pages.

U.S. Appl. No. 17/375,999, "Corrected Notice of Allowability", Sep. 13, 2023, 2 pages.

U.S. Appl. No. 17/375,999, Final Office Action, Mailed On Jan. 5, 2023, 24 pages.

U.S. Appl. No. 17/375,999, Non-Final Office Action, Mailed On Aug. 4, 2022, 22 pages.

U.S. Appl. No. 17/375,999, Notice of Allowance, Mailed On Jul. 13, 2023, 14 pages.

U.S. Appl. No. 17/375,999, Notice of Allowance, Mailed On Jun. 2, 2023, 14 pages.

U.S. Appl. No. 17/376,002, Notice of Allowance, Mailed On May 25, 2022, 8 pages.

U.S. Appl. No. 17/376,004, Non-Final Office Action, Mailed On Apr. 10, 2023, 8 pages.

U.S. Appl. No. 17/376,004, "Notice of Allowability", Dec. 14, 2023, 2 pages.

U.S. Appl. No. 17/376,004, Notice of Allowance, Mailed On Aug. 29, 2023, 11 pages.

(56) References Cited

OTHER PUBLICATIONS

U.S. Appl. No. 17/494,719, Non-Final Office Action, Mailed On Apr. 4, 2023, 16 pages.
U.S. Appl. No. 17/494,719, Notice of Allowance, Mailed On Jul. 21, 2023, 10 pages.
U.S. Appl. No. 17/494,720, Notice of Allowance, Mailed On Sep. 29, 2023, 13 pages.
U.S. Appl. No. 17/494,722, Final Office Action, Mailed On Aug. 8, 2023, 10 pages.
U.S. Appl. No. 17/494,722, Non-Final Office Action, Mailed On May 8, 2023, 11 pages.
U.S. Appl. No. 17/494,725, "Corrected Notice of Allowability", Apr. 14, 2023, 2 pages.
U.S. Appl. No. 17/494,725, Non-Final Office Action, Mailed On Nov. 9, 2022, 29 pages.
U.S. Appl. No. 17/494,725, Notice of Allowance, Mailed On Mar. 2, 2023, 9 pages.
U.S. Appl. No. 17/494,729, Non-Final Office Action, Mailed On Mar. 2, 2023, 21 pages.
U.S. Appl. No. 17/494,729, Notice of Allowance, Mailed On Jul. 11, 2023, 11 pages.
U.S. Appl. No. 17/958,800, "Corrected Notice of Allowability", Oct. 16, 2023, 2 pages.
U.S. Appl. No. 17/958,800, Notice of Allowance, Mailed On Jul. 7, 2023, 9 pages.
Abdou et al., "A Framework and Comparative Analysis of Control Plane Security of SDN and Conventional Networks", Computer Science, Networking and Internet Architecture, Available Online at: https://arxiv.org/abs/1703.06992, Mar. 20, 2017, pp. 1-14.
Azodolmolky et al., "Cloud Computing Networking: Challenges and Opportunities for Innovations", Institute of Electrical and Electronics Engineers Communications Magazine, vol. 51, No. 7, Jul. 2013, pp. 54-62.
Chinese Application No. CN202180038294.5, Notice of Decision to Grant, Mailed On Sep. 18, 2023, 6 pages.
Jain et al., "Network Virtualization and Software Defined Networking for Cloud Computing: A Survey", Institute of Electrical and Electronics Engineers Communications Magazine, vol. 51, No. 11, Nov. 2013, pp. 24-31.
International Application No. PCT/US2021/027281, International Preliminary Report on Patentability, Mailed On Dec. 8, 2022, 10 pages.
International Application No. PCT/US2021/027281, International Search Report and Written Opinion, Mailed On Jul. 23, 2021, 11 pages.
International Application No. PCT/US2021/041676, International Preliminary Report on Patentability, Mailed On Jan. 26, 2023, 9 pages.
International Application No. PCT/US2021/041676, International Search Report and Written Opinion, Mailed On Oct. 29, 2021, 13 pages.
International Application No. PCT/US2021/041678, International Preliminary Report on Patentability, Mailed On Jan. 26, 2023, 7 pages.
International Application No. PCT/US2021/041678, International Search Report and Written Opinion, Mailed On Nov. 16, 2021, 11 pages.
International Application No. PCT/US2021/041679, International Preliminary Report on Patentability, Mailed On Jan. 26, 2023, 7 pages.
International Application No. PCT/US2021/041679, International Search Report and Written Opinion, Mailed On Nov. 16, 2021, 11 pages.
International Application No. PCT/US2021/060721, International Preliminary Report on Patentability, Mailed On Jul. 13, 2023, 7 pages.
International Application No. PCT/US2021/060721, International Search Report and Written Opinion, Mailed On Mar. 22, 2022, 11 pages.
International Application No. PCT/US2021/060790, International Preliminary Report on Patentability, Mailed On Jul. 13, 2023, 9 pages.
International Application No. PCT/US2021/060790, International Search Report and Written Opinion, Mailed On Mar. 18, 2022, 13 pages.
International Application No. PCT/US2021/060804, International Preliminary Report on Patentability, Mailed On Jul. 13, 2023, 11 pages.
International Application No. PCT/US2021/060804, International Search Report and Written Opinion, Mailed On Mar. 21, 2022, 15 pages.
International Application No. PCT/US2021/060820, International Preliminary Report on Patentability, Mailed On Jul. 13, 2023, 9 pages.
International Application No. PCT/US2021/060820, International Search Report and Written Opinion, Mailed On Mar. 21, 2022, 13 pages.
International Application No. PCT/US2021/060843, International Preliminary Report on Patentability, Mailed On Jul. 13, 2023, 10 pages.
International Application No. PCT/US2021/060843, International Search Report and Written Opinion, Mailed On Mar. 23, 2022, 14 pages.
International Application No. PCT/US2022/012513, International Search Report and Written Opinion, Mailed On Mar. 23, 2022, 11 pages.
International Application No. PCT/US2022/012529, International Search Report and Written Opinion, Mailed On Apr. 25, 2022, 15 pages.
International Application No. PCT/US2022/012538, International Search Report and Written Opinion, Mailed On Apr. 25, 2022, 13 pages.
European Application No. EP21751927.1, "Intention to Grant", Nov. 30, 2023, 8 pages.
European Application No. EP21752350.5, "Intention to Grant", Nov. 16, 2023, 8 pages.
Ansari, "Basics On Azure—Network Address Translation (NAT)", C# Corner, Available Online at: https://www.c-sharpcorner.com/article/basic-on-azure-network-address-translationnat/, May 13, 2021, pp. 1-6.
"Network Address Translation", Wikipedia, Available Online at: https://web.archive.org/web/20210116013931/https://en.wikipedia.org/wiki/Network_address_translation, Accessed from Internet on Apr. 28, 2023, pp. 1-14.
Srisuresh et al., "DNS Extensions to Network Address Translators (DNS_ALG)", Network Working Group, Sep. 1999, 29 pages.
U.S. Appl. No. 18/295,400, "Non-Final Office Action", Jun. 6, 2024, 37 pages.
U.S. Appl. No. 18/315,970, "Notice of Allowance", Aug. 9, 2024, 14 pages.
U.S. Appl. No. 18/390,384, "Non-Final Office Action", Jul. 18, 2024, 8 pages.
U.S. Appl. No. 18/412,012, "Non-Final Office Action", Jul. 31, 2024, 8 pages.
U.S. Appl. No. 18/511,037, "Non-Final Office Action", Jul. 2, 2024, 30 pages.
European Application No. EP21840231.1, "Intention to Grant", Jul. 3, 2024, 8 pages.
Indian Application No. IN202347000303, "First Examination Report", Aug. 19, 2024, 7 pages.
Indian Application No. IN202347000297, "First Examination Report", Oct. 11, 2024, 5 pages.
Japanese Application No. JP2022-572697, "Office Action", Oct. 1, 2024, 14 pages (Includes 7 pages of English Translation and 7 pages of official copy).
U.S. Appl. No. 18/295,400, Notice of Allowance, Mailed On Dec. 12, 2024, 10 pages.
U.S. Appl. No. 18/315,970, "Corrected Notice of Allowability", Nov. 15, 2024, 12 pages.
U.S. Appl. No. 18/390,384, Notice of Allowance, Mailed On Dec. 19, 2024, 6 pages.

(56) References Cited

OTHER PUBLICATIONS

U.S. Appl. No. 18/412,012, Notice of Allowance, Mailed On Dec. 19, 2024, 6 pages.
U.S. Appl. No. 18/511,037, "Corrected Notice of Allowability", Dec. 11, 2024, 2 pages.
U.S. Appl. No. 18/511,037, Notice of Allowance, Mailed On Nov. 27, 2024, 9 pages.
U.S. Appl. No. 18/295,400, "Corrected Notice of Allowability", Mailed On Jan. 6, 2025, 3 pages.
Amiri et al., "A New Method for Layer 2 Loop Prevention in Software Defined Networks", Telecommunication Systems, vol. 73, No. 1, Jul. 22, 2019, pp. 47-57.
European Patent Application No. EP21813441.9, Extended European Search Report, Mailed On May 31, 2024, 10 pages.
Minkenberg et al., "Adaptive Routing in Data Center Bridges", 17th Institute of Electrical and Electronics Engineers Symposium on, High Performance Interconnects, Aug. 25, 2009, pp. 33-41.
U.S. Appl. No. 18/511,037, Notice of Allowance, Mailed On Feb. 10, 2025, 9 pages.
Japanese Patent Application No. JP2023-502784, Office Action, Mailed On Feb. 4, 2025, 10 pages (5 pages of English translation and 5 pages of official language copy).
U.S. Appl. No. 18/412,012, Notice of Allowance, Mailed On Feb. 25, 2025, 9 pages.
U.S. Appl. No. 18/511,037, "Corrected Notice of Allowability", Feb. 26, 2025, 2 pages.
Japanese Patent Application No. JP2023-502767, Office Action, Mailed On Feb. 18, 2025, 8 pages (4 pages of English translation and 4 pages of official language copy).
Japanese Patent Application No. JP2023-502776, Office Action, Mailed On Feb. 18, 2025, 6 pages (3 pages of English translation and 3 pages of official language copy).
European Patent Application No. EP21813441.9, "Intention to Grant", Mar. 14, 2025, 8 pages.
Japanese Patent Application No. JP2022-572697, Office Action, Mailed On Feb. 12, 2025, 12 pages (6 pages of English translation and 6 pages of official language copy).

* cited by examiner

SYSTEMS AND METHODS FOR A VLAN SWITCHING AND ROUTING SERVICE

CROSS-REFERENCES TO RELATED APPLICATIONS

This application is a continuation of U.S. Non-Provisional application Ser. No. 17/958,800, filed on Oct. 3, 2022, and entitled "Systems and Methods for a VLAN Switching and Routing Service", which is a continuation of U.S. Non-Provisional application Ser. No. 17/376,002, filed on Jul. 14, 2021, and entitled "Systems and Methods for a VLAN Switching and Routing Service", which claims the benefit of U.S. Provisional Application No. 63/051,728, filed on Jul. 14, 2020, and entitled "VLAN Switching And Routing Service And Layer-2 Networking In A Virtualized Cloud Environment", and which claims the benefit of U.S. Provisional Application No. 63/132,377, filed on Dec. 30, 2020, and entitled "Layer-2 Networking In A Virtualized Cloud Environment". The entire contents of the above-referenced provisional applications are hereby incorporated by reference herein for all purposes.

This application is also related to U.S. application Ser. No. 17/375,999, filed on Jul. 14, 2021, and entitled "VIRTUAL LAYER-2 NETWORK", and this application is also related to U.S. application Ser. No. 17/376,004, filed on Jul. 14, 2021, and entitled "INTERFACE-BASED ACLS IN A LAYER-2 NETWORK", the entire contents of each of which related applications are hereby incorporated by reference herein for all purposes.

BACKGROUND

Cloud computing provides on-demand availability of computing resources. Cloud computing can be based on data centers that are available to users over the internet. Cloud computing can provide Infrastructure as a Service (IaaS). A virtual network may be created for use by users. However, these virtual networks have limitations that limit their functionality and value. Accordingly, further improvements are desired.

BRIEF SUMMARY

One aspect of the present disclosure relates to a computer-implemented method. The method includes providing a virtual Layer 3 network in a virtualized cloud environment, the virtual Layer 3 network hosted by an underlying physical network, and providing a virtual Layer 2 network in the virtualized cloud environment, the virtual Layer 2 network hosted by the underlying physical network.

In some embodiments, the virtual Layer 2 network can be a virtual local area network (VLAN). In some embodiments, the VLAN includes a plurality of endpoints. In some embodiments, the plurality of endpoints can be a plurality of compute instances. In some embodiments, the VLAN includes a plurality of L2 virtual network interface cards (L2 VNICs), and a plurality of switches.

In some embodiments, each of the plurality of compute instances is communicatingly coupled with a pair comprising a unique L2 virtual network interface card (L2 VNIC) and a unique switch. In some embodiments, the plurality of switches together can form a distributed switch. In some embodiments, each of the plurality of switches routes outbound traffic according to a mapping table received from the L2 VNIC paired with the switch. In some embodiments, the mapping table identifies interface-to-MAC address mapping for the endpoints within the VLAN.

In some embodiments, the method further includes instantiating the pair comprising the unique L2 VNIC and the unique switch on a network virtualization device (NVD). In some embodiments, the method includes receiving a packet addressed for one of the plurality of compute instances at the unique L2 VNIC of one of the plurality of compute instances from another endpoint within the VLAN, and learning with the unique L2 VNIC of the one of the plurality of compute instances mapping of the other endpoint. In some embodiments, the mapping of the other endpoint includes interface-to-MAC address mapping of the other endpoint.

In some embodiments, the method includes decapsulating the received packet with the unique L2 VNIC of the one of the plurality of compute instances, and forwarding the decapsulated packet to the one of the plurality of compute instances. In some embodiments, the method includes learning with the one of the plurality of compute instances IP address-to-MAC address mapping of the other endpoint.

In some embodiments, the method includes sending an IP packet from a first compute instance in the VLAN, the IP packet including a destination IP address of a second compute instance within the VLAN, receiving the IP packet at a first L2 VNIC associated with the first compute instance, encapsulating the IP packet at the first L2 VNIC, and forwarding the IP packet to the second compute instance via a first switch. In some embodiments, the first switch and the first L2 VNIC together for the pair communicatingly coupled with the first compute instance. In some embodiments, the method further includes receiving the IP packet at a second VNIC, which second VNIC is associated with the second compute instance, decapsulating the IP packet at the second VNIC, and forwarding the IP packet from the second VNIC to the second compute instance.

In some embodiments, the virtual Layer 2 network includes a plurality of virtual local area networks (VLANs). In some embodiments, each of the plurality of VLANs includes a plurality of endpoints. In some embodiments, the plurality of VLANs includes a first VLAN and a second VLAN. In some embodiments, the first VLAN includes a plurality of first endpoints, and the second VLAN includes a plurality of second endpoints. In some embodiments, each of the plurality of VLANs has a unique identifier. In some embodiments, one of the plurality of first endpoints in the first VLAN communicates with one of the plurality of second endpoints in the second VLAN.

One aspect of the present disclosure relates to a system including a physical network. The physical network includes at least one host machine and at least one network virtualization device. The physical network can provide a virtual Layer 3 network in a virtualized cloud environment, the virtual Layer 3 network hosted by an underlying physical network, and provide a virtual Layer 2 network in the virtualized cloud environment, the virtual Layer 2 network hosted by the underlying physical network.

One aspect of the present disclosure relates to a non-transitory computer-readable storage medium storing a plurality of instructions executable by one or more processors. The plurality of instructions when executed by the one or more processors cause the one or more processors to provide a virtual Layer 3 network in a virtualized cloud environment, the virtual Layer 3 network hosted by an underlying physical network, and provide a virtual Layer 2 network in the virtualized cloud environment, the virtual Layer 2 network hosted by the underlying physical network.

One aspect of the present disclosure relates to a method including generating a table for an instance of a VLAN switching and routing service (VSRS), the VSRS coupling a first virtual layer 2 network with a second network. In some embodiments the table contains information identifying IP addresses, MAC addresses, and virtual interface identifiers for instances within the first virtual layer 2 network. The method includes receiving with the VSRS a packet from a first instance designated for delivery to a second instance within the first virtual layer 2 network, identifying with the VSRS the second instance within the first virtual layer 2 network for delivery of the packet based on information received with the packet and information contained within the table, and delivering the packet to the identified second instance.

In some embodiments, the first virtual layer 2 network includes a plurality of instances. In some embodiments, the first virtual layer 2 network includes a plurality of L2 virtual network interface cards (L2 VNICs), and a plurality of switches. In some embodiments, each of the plurality of instances is communicatively coupled with a pair including a unique L2 virtual network interface card (L2 VNIC) and a unique switch.

In some embodiments, identifying with the VSRS the second instance within the first virtual layer 2 network for delivery of the packet based on information received with the packet and information contained within the table includes determining with the VSRS that the table does not include mapping information for the second instance, suspending with the VSRS delivery of the packet, broadcasting with the VSRS an ARP request to L2 VNICs in the first virtual layer 2 network, the ARP request containing an IP address of the second instance, and receiving with the VSRS an ARP response from the L2 VNIC of the second instance.

In some embodiments, the method further includes updating the table based on the received ARP response. In some embodiments, the first instance is outside of the first virtual layer 2 network and is in the second network. In some embodiments, the second network can be an L3 network. In some embodiments, the second network can be a second virtual layer 2 network. In some embodiments, the table is generated based on communications received by the VSRS.

In some embodiments, the method includes instantiating the VSRS as a service on a plurality of hardware nodes. In some embodiments, the method includes distributing the table across the hardware nodes. In some embodiments, the table distributed across the hardware nodes is accessible by another VSRS instantiation. In some embodiments, the first instance is inside of the first virtual layer 2 network.

In some embodiments, the method includes receiving with the VSRS a packet from a third instance inside of the first virtual layer 2 network. In some embodiments, the packet is designated for delivery to a fourth instance outside the first virtual layer 2 network and forwarding the packet to the fourth instance. In some embodiments, the method includes receiving with the VSRS a packet from a third instance inside of the first virtual layer 2 network. In some embodiments, the packet is designated for delivery to a service used by the third instance inside the first virtual layer 2 network. In some embodiments, the service can be at least one of: DHCP; NTP; and DNS.

In some embodiments, the method includes receiving with the VSRS a packet from a third instance inside of the first virtual layer 2 network. In some embodiments, the packet is designated for delivery to a fourth instance in a second virtual layer 2 network. In some embodiments, the method includes distributing the tables for the instance of the VSRS with layer 2 and layer 3 network information across a fleet of service nodes to provide a highly reliable, and highly scalable instantiation of a VSRS. In some embodiments, the method comprises receiving with the VSRS a packet from a third instance inside the first virtual layer 2 network, and learning with the VSRS the mapping of the third instance.

One aspect of the present disclosure relates to a system. The system includes a physical network. The physical network includes at least one processor and a network virtualization device. The at least one processor can instantiate an instance of a VLAN switching and routing service (VSRS), the VSRS coupling a first virtual layer 2 network with a second network, and generate a table for the instance of the VSRS. In some embodiments, the table contains information identifying IP addresses, MAC addresses, and virtual interface identifiers for instances within the first virtual layer 2 network. The at least one processor can receive with the VSRS a packet from a first instance designated for delivery to a second instance within the first virtual layer 2 network, identify with the VSRS the second instance within the first virtual layer 2 network for delivery of the packet based on information received with the packet and information contained within the table, and deliver the packet to the identified second instance.

One aspect of the present disclosure relates to a non-transitory computer-readable storage medium storing a plurality of instructions executable by one or more processors. The plurality of instructions when executed by the one or more processors cause the one or more processors to instantiate an instance of a VLAN switching and routing service (VSRS), the VSRS coupling a first virtual layer 2 network with a second network, and generate a table for the instance of the VSRS. In some embodiments, the table contains information identifying IP addresses, MAC addresses, and virtual interface identifiers for instances within the first virtual layer 2 network. The plurality of instructions when executed by the one or more processors cause the one or more processors to receive with the VSRS a packet from a first instance designated for delivery to a second instance within the first virtual layer 2 network, identify with the VSRS the second instance within the first virtual layer 2 network for delivery of the packet based on information received with the packet and information contained within the table, and deliver the packet to the identified second instance.

One aspect of the present disclosure relates to a method. The method includes sending a packet from source compute instance in a virtual network to a destination compute instance via a destination L2 virtual network interface card (destination L2 VNIC) within a first virtual layer 2 network, evaluating an access control list (ACL) for the packet with a source virtual network interface card (source VNIC), embedding ACL information relevant to the packet in the packet, forwarding the encapsulated packet to a virtual switching and routing service (VSRS), the VSRS coupling a first virtual layer 2 network (VLAN) with a second network, identifying with the VSRS the destination L2 VNIC within the first virtual layer 2 network for delivery of the packet based on information received with the packet and mapping information contained within a mapping table, accessing with the VSRS the ACL information from the packet, applying the accessed ACL information to the packet.

In some embodiments, the packet includes an IP packet. In some embodiments, the source compute instance is located in a virtual L3 network. In some embodiments, the source compute instance is located in a second virtual layer 2 network.

In some embodiments, the method includes encapsulating the packet with the source VNIC. In some embodiments, the method includes receiving and decapsulating the packet with the VSRS. In some embodiments, identifying with the VSRS the destination L2 VNIC within the first virtual layer 2 network for delivery of the packet based on information received with the packet and mapping information contained within the mapping table includes determining with the VSRS that the mapping table does not include mapping information for the destination compute instance, suspending with the VSRS forwarding of the packet, broadcasting with the VSRS an ARP request to L2 VNICs in the first virtual layer 2 network, the ARP request containing an IP address of the destination compute instance, and receiving with the VSRS an ARP response from the L2 VNIC of the destination compute instance. In some embodiments, one of the L2 VNICs is a L2 VNIC of the destination compute instance.

In some embodiments, the method includes updating the table based on the received ARP response. In some embodiments, identifying with the VSRS the destination L2 VNIC within the first virtual layer 2 network for delivery of the packet based on information received with the packet and mapping information contained within the mapping table includes determining that the mapping table includes mapping information for the destination compute instance, and identifying the destination L2 VNIC based on the mapping information contained in the mapping table. In some embodiments, embedding ACL information relevant to the packet in the packet comprises storing the ACL information as metadata in the packet. In some embodiments, accessing with the VSRS the ACL information from the packet includes extracting metadata containing the ACL information in the packet.

In some embodiments, applying the accessed ACL information to the packet includes determining that the ACL information is not relevant to the destination L2 VNIC. In some embodiments, applying the accessed ACL information to the packet further includes forwarding the packet to the destination compute instance via the destination L2 VNIC. In some embodiments, applying the accessed ACL information to the packet includes determining with the VSRS that the ACL information is relevant to the destination L2 VNIC. In some embodiments, applying the accessed ACL information to the packet further includes: determining with the VSRS that the destination L2 VNIC complies with the ACL information; and forwarding with the VSRS the packet to the destination compute instance via the destination L2 VNIC.

In some embodiments, applying the accessed ACL information to the packet further includes: determining with the VSRS that the destination L2 VNIC does not comply with the ACL information; and the VSRS dropping the packet. In some embodiments, the accessed ACL information to the packet further includes sending with the VSRS a response to the source compute instance indicating the dropping of the packet.

One aspect of the present disclosure relates to a system including the physical network. The physical network includes at least one first processor, a network virtualization device, and at least one second processor. The at least one processor can send a packet from source compute instance in a virtual network instantiated on the physical network to a destination compute instance via a destination L2 virtual network interface card (destination L2 VNIC) within a first virtual layer 2 network instantiated on the physical network. The network virtualization device can instantiate a source VNIC. The source VNIC can evaluate a access control list (ACL) for the packet, embed ACL information relevant to the packet in the packet, and forward the packet to a virtual switching and routing service (VSRS), the VSRS coupling a first virtual layer 2 network (VLAN) with a second network. The at least one second processor can instantiate the VSRS. The VSRS can identify the destination L2 VNIC for delivery of the packet based on information received with the packet and mapping information contained within a mapping table, access the ACL information from the packet, and apply the accessed ACL information to the packet.

In some embodiments, applying the accessed ACL information to the packet includes determining that the ACL information is relevant to the destination L2 VNIC, determining that the destination L2 VNIC complies with the ACL information, and forwarding with the VSRS the packet to the destination compute instance via the destination L2 VNIC.

One aspect of the present disclosure relates to a non-transitory computer-readable storage medium storing a plurality of instructions executable by one or more processors. The plurality of instructions when executed by the one or more processors cause the one or more processors to send a packet from source compute instance in a virtual network to a destination compute instance via a destination L2 virtual network interface card (destination L2 VNIC) within a first virtual layer 2 network, evaluate an access control list (ACL) for the packet with a source virtual network interface card (source VNIC), embed ACL information relevant to the packet in the packet, forward the packet to a virtual switching and routing service (VSRS), the VSRS coupling a first virtual layer 2 network (VLAN) with a second network, identify with the VSRS the destination L2 VNIC within the first virtual layer 2 network for delivery of the packet based on information received with the packet and mapping information contained within a mapping table, access with the VSRS the ACL information from the packet; and apply the accessed ACL information to the packet.

DETAILED DESCRIPTION

Figure 1:
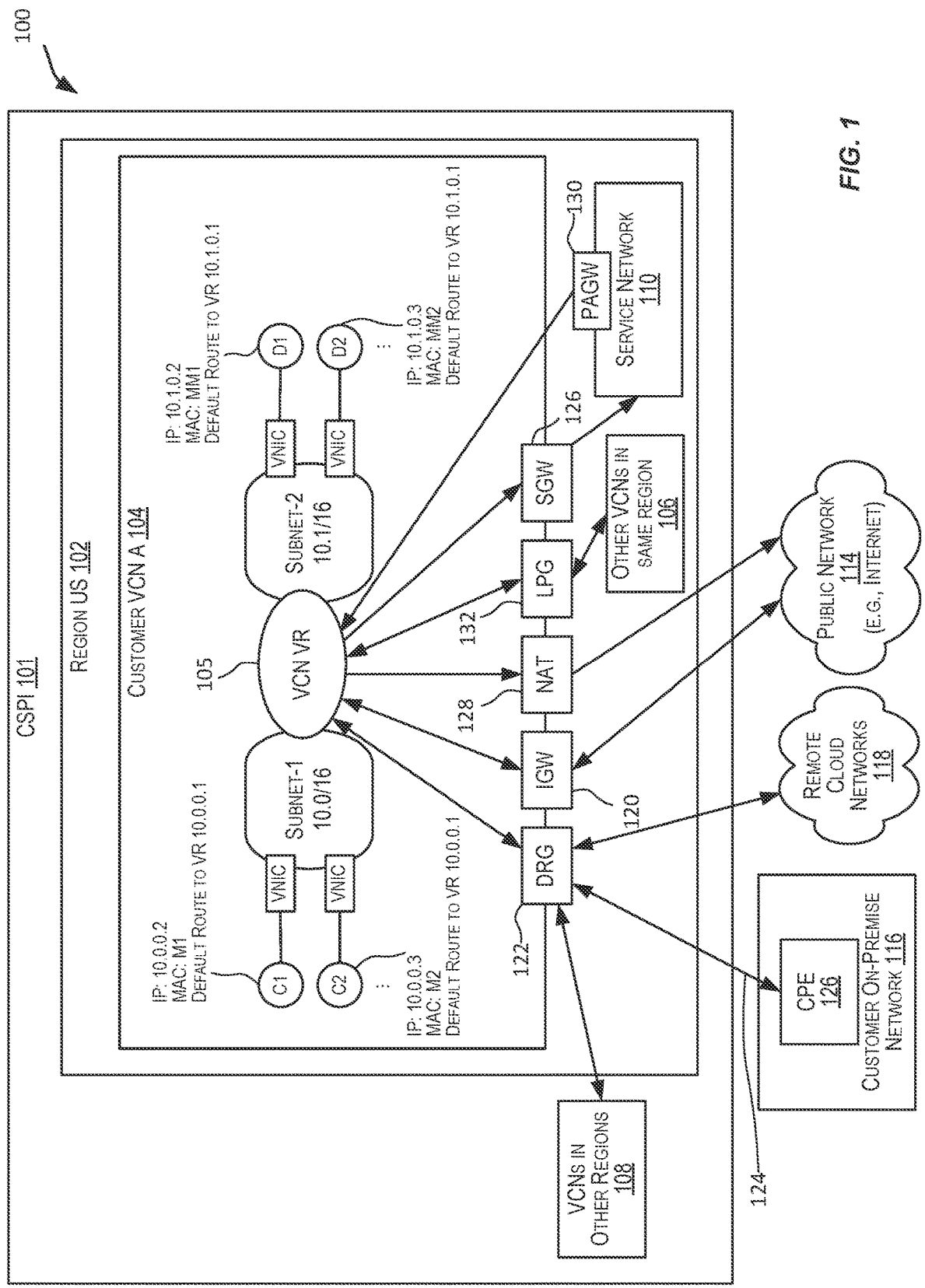
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking.

Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that represents or maps to multiple real IP addresses. A virtual IP address provides a 1-to-many mapping between the virtual IP address and multiple real IP addresses. For example, a load balancer may user a VIP to map to or represent multiple server, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 24, 25, 26, and 27 (see references 24116, 2516, 2616, and 2716) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 24, 25, 26, and 28, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a Media access control address (MAC address). For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 24, 25, 26, and 27 (for example, gateways referenced by reference numbers 2434, 2436, 2438, 2534, 2536, 2538, 2634, 2636, 2638, 2734, 2736, and 2738) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. APE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
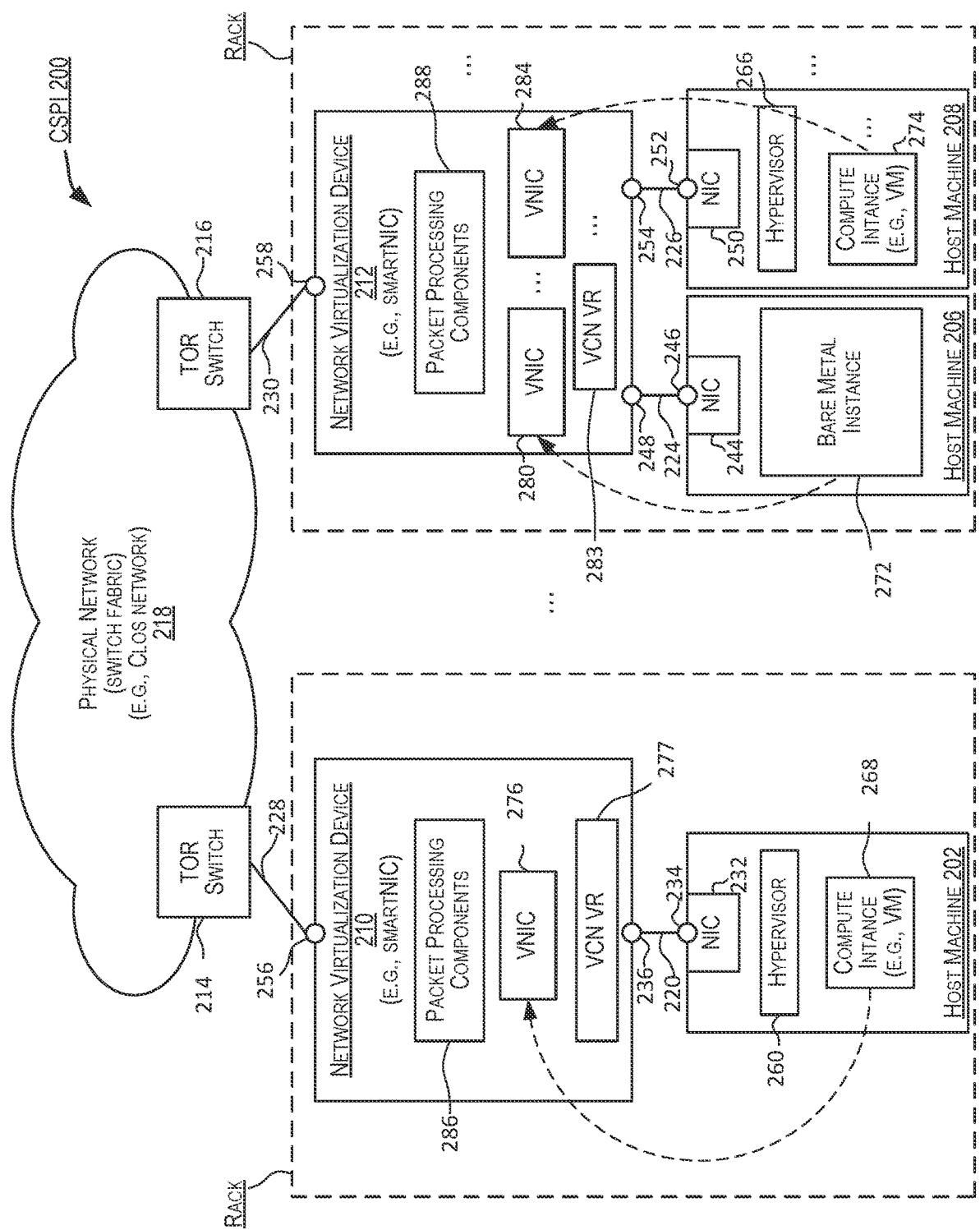
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
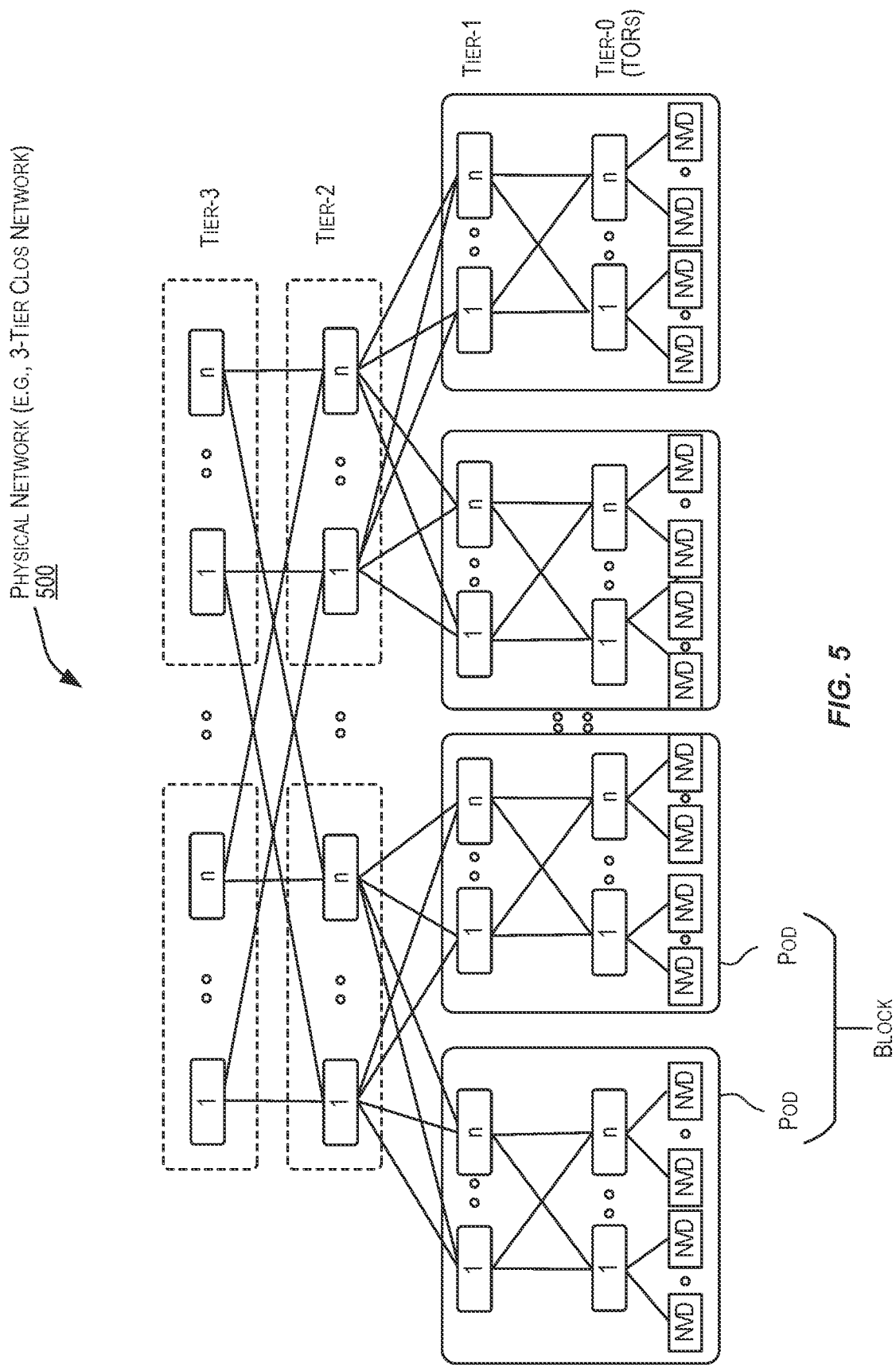
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
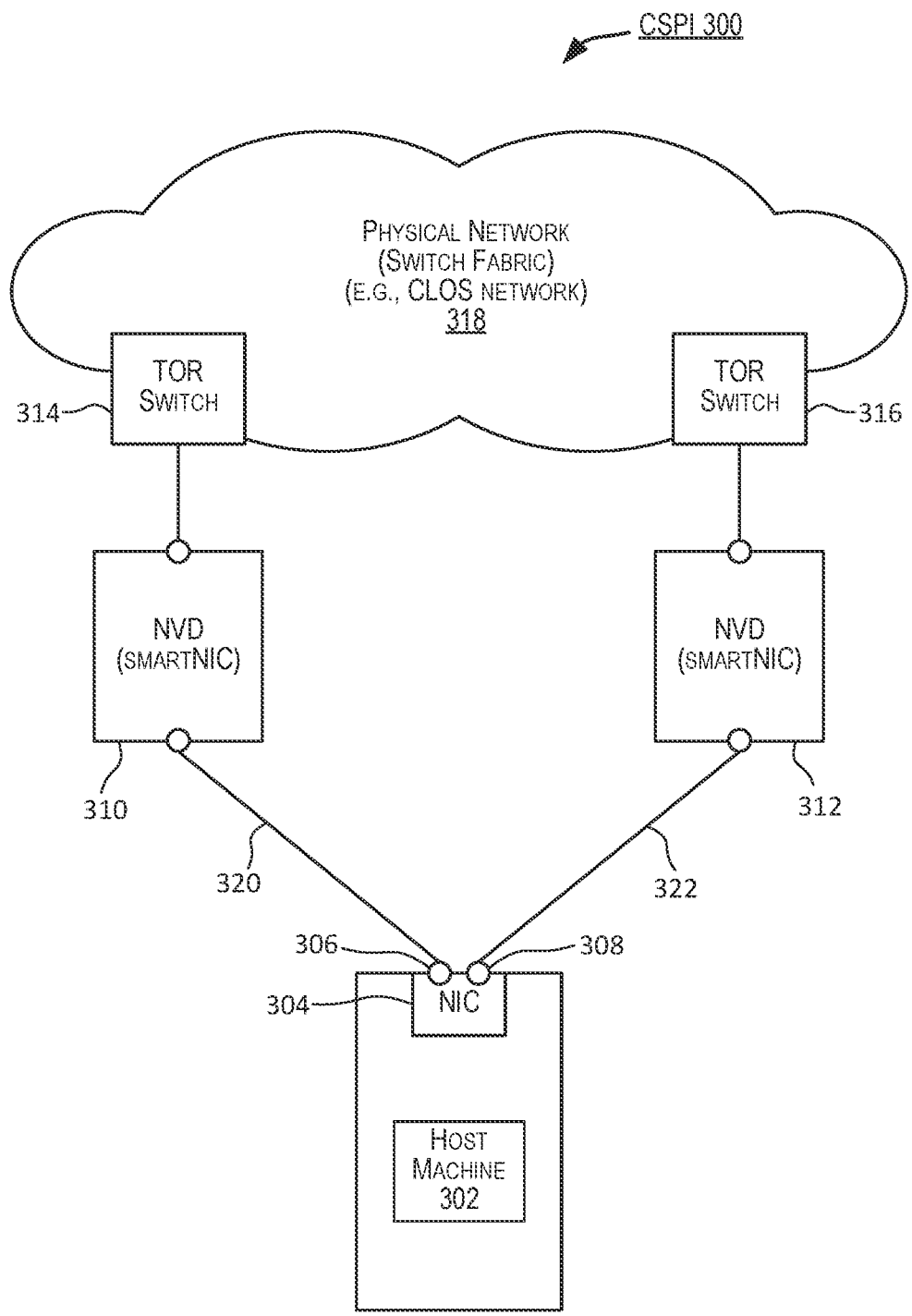
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 24, 25, 26, and 27 (see references 2416, 2516, 2616, and 2716) and described below. Examples of a VCN Data Plane are depicted in FIGS. 24, 25, 26, and 27 (see references 2418, 2518, 2618, and 2718) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN identifier on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
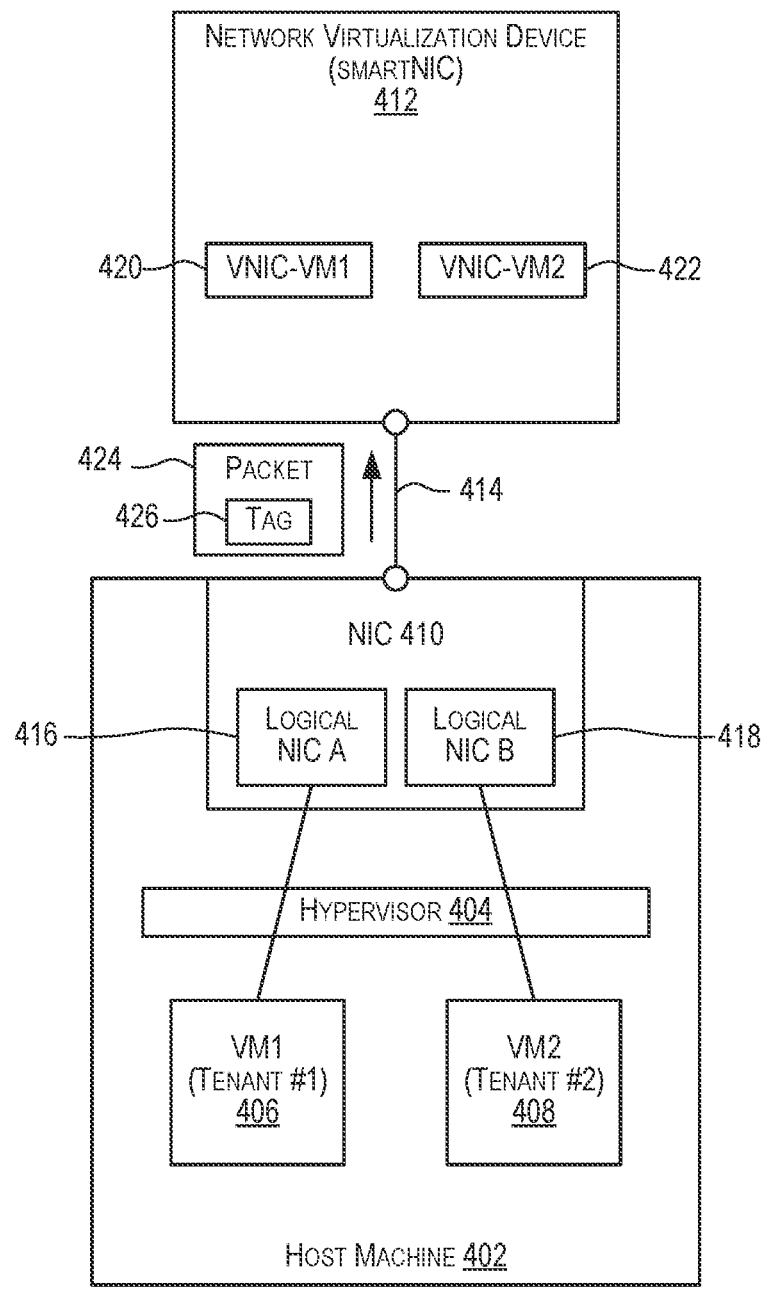
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN D. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where,
ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

L2 Virtual Network

The number of enterprise customers transitioning their on-premise applications to a cloud environment provided by a cloud services provider (CSP) continues to increase rapidly. However, many of these customers are quickly realizing that the road to transitioning to a cloud environment can be quite bumpy requiring the customers to rearchitect and reengineer their existing applications to make them workable in the cloud environment. This is because applications written for an on-premise environment often depend on features of the physical network for monitoring, availability, and scale. These on-premise applications thus need to be rearchitected and reengineered before they can work in a cloud environment.

There are several reasons why on-premise applications cannot easily transition to the cloud environment. One of the main reasons is that current cloud virtual networks operate at the Layer-3 of the OSI model, for example at the IP layer, and do not provide Layer-2 capabilities, which are needed by the application. Layer-3-based routing or forwarding includes determining where a packet is to be sent (e.g., to which customer instance) based upon information contained in the Layer-3 header of the packet, for example, based upon the destination IP address contained in the Layer-3 header of the packet. To facilitate this, the location of IP addresses in the virtualized cloud network are determined through a centralized control and orchestration system or controller. These may include, for example, IP addresses associated with customer entities or resources in the virtualized cloud environment.

Many customers run applications in their on-premise environments that have strict requirements for Layer-2 networking capabilities which currently are not addressed by current cloud offerings and IaaS service providers. For example, traffic is current cloud offerings is routed using Layer-3 protocols that use Layer-3 headers, and Layer-2 features needed by the applications are not supported. These Layer-2 features may include features such as Address Resolution Protocol (ARP) processing, Medium Access Controls (MAC) address learning, and Layer-2 broadcast capabilities, Layer-2 (MAC based) forwarding, Layer-2 networking constructs, and others. By providing virtualized Layer-2 networking functionality in the virtualized cloud network, as described in this disclosure, customers can now migrate their legacy applications seamlessly to the cloud environment without requiring any substantial rearchitecting or reengineering. For example, the virtualized Layer-2 networking capabilities described herein enable such applications (e.g., VMware vSphere, vCenter, vSAN and NSX-T components) to communicate at Layer-2 as they do in the on-premise environment. These applications are able to run the same versions and configurations in the public cloud, thereby enabling customers to use their legacy on-premise applications including existing knowledge, tools, and processes associated with the legacy applications. Customers are also be able to access native cloud services from their applications (e.g., using VMware Software Defined Data Center (SDDC)).

As another example, there are several legacy on-premise applications (e.g., enterprise clustering software applications, network virtual appliances) that require Layer-2 broadcast support for failover. Example applications include Fortinet FortiGate, IBM QRadar, Palo Alto firewalls, Cisco ASA, Juniper SRX, and Oracle RAC (Real Application Clustering). By providing virtualized Layer-2 networking in the virtualized public cloud as described in this disclosure, these appliances are now able to run in a virtualized public cloud environment unaltered. AS described herein, virtualized Layer-2 networking functionality is provided that is comparable to on-premise. The virtualized Layer-2 networking functionality described in this disclosure supports traditional Layer-2 networking. This includes support of customer-defined VLANs as well as unicast, broadcast, and multicast Layer-2 traffic functions. Layer-2 based routing and forwarding of packets comprises using Layer-2 protocols and using information contained in the Layer-2 header of a packet, for example, based upon the destination MAC address contained in the Layer-2 header to route or forward the packet. Protocols used by enterprise applications (e.g., clustering software applications) such as ARP, Gratuitous Address Resolution Protocol (GARP), and Reverse Address Resolution Protocol (RARP) can also now work in the cloud environment.

There are several reasons why traditional virtualized cloud infrastructures support virtualized Layer-3 networking and not Layer-2 networking. Layer-2 networks typically do not scale as well as Layer-3 networks. Layer-2 network control protocols do not have the level of sophistication that is desired for scaling. For example, Layer-3 networks do not have to worry about packet looping that Layer-2 networks have to tackle. IP packets (i.e., Layer-3 packets) have the notion of a time to live (TTL), while Layer-2 packets do not. IP addresses, contained inside of Layer-3 packets, have a concept of topology, such as subnets, CDR ranges, etc., while Layer-2 addresses (e.g., MAC addresses) do not. Layer-3 IP networks have inbuilt tools that facilitate troubleshooting, such as ping, traceroute, etc. for finding path information. Such tools are not available for Layer-2. Layer-3 networks support multi-pathing, which is not available at Layer-2. Because of the lack of sophisticated control protocols (e.g. Border Gateway Protocol (BGP) and Open Shortest Path First (OSPF)) especially for exchanging information between entities in a network, Layer-2 networks have to rely on broadcasting and multicasting in order to learn about the network, which can adversely impact network performance. As networks change, the learning process for Layer-2 has to be repeated, which is not needed at Layer-3. For these reasons and others, it is more desirable for cloud IaaS service providers to provide infrastructures that operate at Layer-3 rather than at Layer-2.

However, in spite of its multiple shortcomings, Layer-2 functionality is needed by many on-premise applications. For example, assume a virtualized cloud configuration where a customer (Customer 1) has two instances instance A with IP1 and instance B with IP2, in a virtual network "V" where an instance may be a compute instance (e.g. bare metal, virtual machine or container) or a service instance such as a load balancer, nfs mount point, or other service instance. The virtual network V is a distinct address space isolated from other virtual networks and the underlying physical network. For example, this isolation may be achieved using various techniques including packet encapsulation or NAT. For this reason the IP address for an instance in a customer's virtual network is distinct from an address in the physical network where it is hosted. A centralized SDN (Software Defined Networking) control plane is provided that knows the physical IP and virtual interfaces of all virtual IP addresses. When a packet is sent from instance A to a destination of IP2 in the virtual network V, the virtual network SDN stack needs to know where IP2 is located. It has to know this ahead of time so that it can send the packet to the IP in the physical network where virtual IP address IP2 for V is hosted. The location of a virtual IP address can be modified in the cloud thus changing the relationship between a physical IP and virtual IP address. Whenever a virtual IP address is to be moved (e.g., an IP address associated with a virtual machine is to be moved to another virtual machine or a virtual machine is migrated to a new physical host), an API call has to be made to the SDN control plane letting the controller know that the IP is being moved so that it can update all participants in the SDN stack including packet processors (data planes). There are classes of applications however that do not make such API calls. Examples include various on-premise applications, applications provided by various virtualization software vendors such as VMware, and others. The value of facilitating a virtual Layer-2 network in a virtualized cloud environment enables support for such applications that are not programmed to make such API calls or applications that rely on other Layer-2 networking features, such as support for non-IP Layer-3 and MAC learning.

A virtual Layer-2 network creates a broadcast domain wherein learning is performed by members of the broadcast domain. In a virtual Layer-2 domain, there can be any IP on any MAC on any host within this Layer-2 domain and the system will learn using standard Layer-2 networking protocols and the system will virtualize these networking primitives, without having to be explicitly told by a centralized controller as to where MACs and IPs live in that virtual Layer-2 network. This enables applications to be run that need low latency failover, applications that need to support broadcast or multicast protocols to multiple nodes, and legacy applications that do not know how to make API calls to a SDN control plane or to an API endpoint to determine where IP and MAC addresses live. Providing Layer-2 networking capabilities in the virtualized cloud environment is thus needed to be able to support functionality that is not available at the IP Layer-3 level.

Another technical advantage of providing virtual Layer-2 in a virtualized cloud environment is that it enables various different Layer-3 protocols (such as IPV4, IPV6) to be supported, including non-IP protocols. For example, various non-IP protocols can be supported, such as IPX, AppleTalk, and others. Because existing cloud IaaS providers do not provide Layer-2 functionality in their virtualized cloud networks, they cannot support these non-IP protocols. By providing Layer-2 networking functionality as described in this disclosure, support can be provided for protocols at Layer-3 and for applications that need and rely on the availability of Layer-2 level functionality.

Using the techniques described in this disclosure, both Layer-3 and Layer-2 functionality is provided in the virtualized cloud infrastructure. As previously described, Layer-3 based networking provides certain efficiencies, especially well-suited for scaling, that are not provided by Layer-2 networking. Providing Layer-2 functionality in addition to Layer-3 functionality allows such efficiencies provided by Layer-3 to be leveraged (e.g., to provide more scalable solutions) while providing Layer-2 functionality in a more scalable way. For example, virtualized Layer-3 avoids having to use broadcasting for learning purposes. By offering Layer-3 for its efficiencies, and at the same time offering a virtualized Layer-2 for enabling those applications that need it and applications that are not be able to function without having Layer-2 functionality, and for supporting non-IP protocols, etc., complete flexibility in the virtualized cloud environment is offered to customers.

Customers themselves have hybrid environments in which Layer-2 environments exist along with Layer-3 environments, and the virtualized cloud environment can now support both these environments. A customer can have Layer-3 networks such as subnets, and/or Layer-2 networks such as VLANs, and these two environments can talk to each other in the virtualized cloud environment.

The virtualized cloud environment also needs to support multitenancy. Multi-tenancy makes the provisioning of both Layer-3 functionality and Layer-2 functionality in the same virtualized cloud environment technically difficult and complicated. For example, the Layer-2 broadcast domain must be managed across many different customers in the cloud provider's infrastructure. The embodiments describe in this disclosure overcome these technical issues.

For a virtualization provider (e.g. VMware), a virtualized Layer-2 network that emulates a physical Layer-2 network allows workloads to be run unaltered. Applications provided by such a virtualization provider can then run on the virtualized Layer-2 network provided by the cloud infrastructure. For example, such applications may comprise a set of instances that need to run on a Layer-2 network. When a customer wants to lift and shift such an application from their on-premise environment to a virtualized cloud environment, they cannot just take the application and run it in the cloud because those applications rely on an underlying Layer-2 network (e.g., the Layer-2 network features are used to perform migration of virtual machines, or to move where MAC and IP addresses live), which is not provided by current virtualized cloud providers. For these reasons, such applications cannot run natively in a virtualized cloud environment. Using the techniques described herein, a cloud provider, in addition to providing a virtualized Layer-3 network, also provides a virtualized Layer-2 network. Now, such application stacks can run in the cloud environment unaltered and can run a nested virtualization in the cloud environment. Customers can now run their own Layer-2 applications in the cloud and manage them. Application providers do not have to make any changes to their software to facilitate this. Such legacy applications or workloads (e.g., legacy load balancers, legacy applications, KVMs, Openstack, clustering software) can now be run in the virtualized cloud environment unaltered.

By offering virtualized Layer-2 functionality as described herein, various Layer-3 protocols, including non-IP protocols, can be now be supported by the virtualized cloud environment. Taking Ethernet as an example, various different EtherTypes (a field in the Layer-2 header that tells what type of Layer-3 packet is being sent; tells what protocol to expect at Layer-3) can be supported, including various non-IP protocols. EtherType is a two-octet field in an Ethernet frame. It is used to indicate which protocol is encapsulated in the payload of the frame and is used at the receiving end by the data link layer to determine how the payload is processed. The EtherType is also used as the basis of 802.1Q VLAN tagging, encapsulating packets from VLANs for transmission multiplexed with other VLAN traffic over an Ethernet trunk. Examples of EtherTypes include IPV4, IPv6, Address Resolution Protocol (ARP), AppleTalk, IPX, and others. A cloud network that supports Layer-2 protocols can support any protocol at the Layer-3 layer. In a similar manner, when the cloud infrastructure provides support for a Layer-3 protocol, it can support various protocols at Layer-4 such as TCP, UDP, ICMP, and others. The network can be agnostic to the Layer-4 protocols when virtualization is provided at Layer-3. Similarly, the network can be agnostic to Layer-3 protocols when virtualization is provided at Layer-2. This technology can be extended to support any Layer-2 network type, including FDDI, Infiniband, etc.

Accordingly, many applications written for physical networks, especially ones that work with clusters of computer nodes that share a broadcast domain use Layer-2 features that are not supported by in an L3 virtual network. The following six examples highlight the complications that can result from not providing Layer-2 networking capabilities:

(1) Assignment of MACs and IPs without a preceding API call. Network appliances and Hypervisors (such as VMware) were not built for cloud virtual networks. They assume they are able to use a MAC so long as it is unique and either get a dynamic address from a DHCP server or use any IP that was assigned to the cluster. There is often no mechanism by which they can be configured to inform the control-plane about the assignment of these Layer-2 and Layer-3 addresses. If where the MACs and IPs are is not known, the Layer-3 virtual network does not know where to send the traffic.

(2) Low latency reassignment of MACs and IPs for high-availability and live migration. Many on-premises applications use ARP to reassign IPs and MACs for high availability—when an instance in a cluster or HA pair stops responding, the newly active instance will send a Gratuitous ARP (GARP) to reassign a service IP to its MAC or a Reverse ARP (RARP) to reassign a service MAC to its interface. This is also important when live-migrating an instance on a hypervisor: the new host must send a RARP when the guest has migrated so that guest traffic is sent to the new host. Not only is the assignment done without an API call, but it also needs to be extremely low latency (sub-millisecond). This cannot be accomplished with HTTPS calls to a REST endpoint.

(3) Interface multiplexing by MAC address. When hypervisors host multiple virtual machines on a single host, all of which are on the same network, guest interfaces are differentiated by their MAC. This requires support for multiple MACs on the same virtual interface.

(4) VLAN Support. A single physical virtual machine Host will need to be on multiple broadcast domains as indicated by the use of a VLAN tag. For example, VMware ESX uses VLANs for traffic separation (e.g. guest virtual machines may communicate on one VLAN, storage on another, and host virtual machines on yet another).

(5) Use of broadcast and multicast traffic. ARP requires L2 broadcast, and there are examples of on-premises applications using broadcast and multicast traffic for cluster and HA applications.

6) Support for Non-IP traffic. Since the L3 network requires the IPv4 or IPv6 header to communicate, use of any L3 protocol other than IP will not work. L2 virtualization means that the network within the VLAN can be L3 protocol agnostic—the L3 header could by IPv4, IPv6, IPX, or anything else—even absent all together.

As disclosed herein, a Layer 2 (L2) network can be created within a cloud network. This virtual L2 network includes one or several virtualized L2 VLANs (referred to herein as VLANs). Each VLAN can include a plurality of compute instances, each of which can be associated with at least one L2 virtual interface (e.g., a L2 VNIC) and a local switch. In some embodiments, each pair of L2 VNIC and switch is hosted on an NVD. An NVD may host multiple of such pairs, where each pair is associated with a different compute instance. The collection of local switches represent an emulated single switch of the VLAN. The L2 VNICs represent a collection of ports on the emulated single switch. The VLAN can be connected, via a VLAN Switching and Routing Service (VSRS), also referred to herein as, a Real Virtual Router (RVR) or as an L2 VSRS, to other VLANs, Layer 3 (L3) networks, on-premise networks, and/or other networks.

Figure 6:
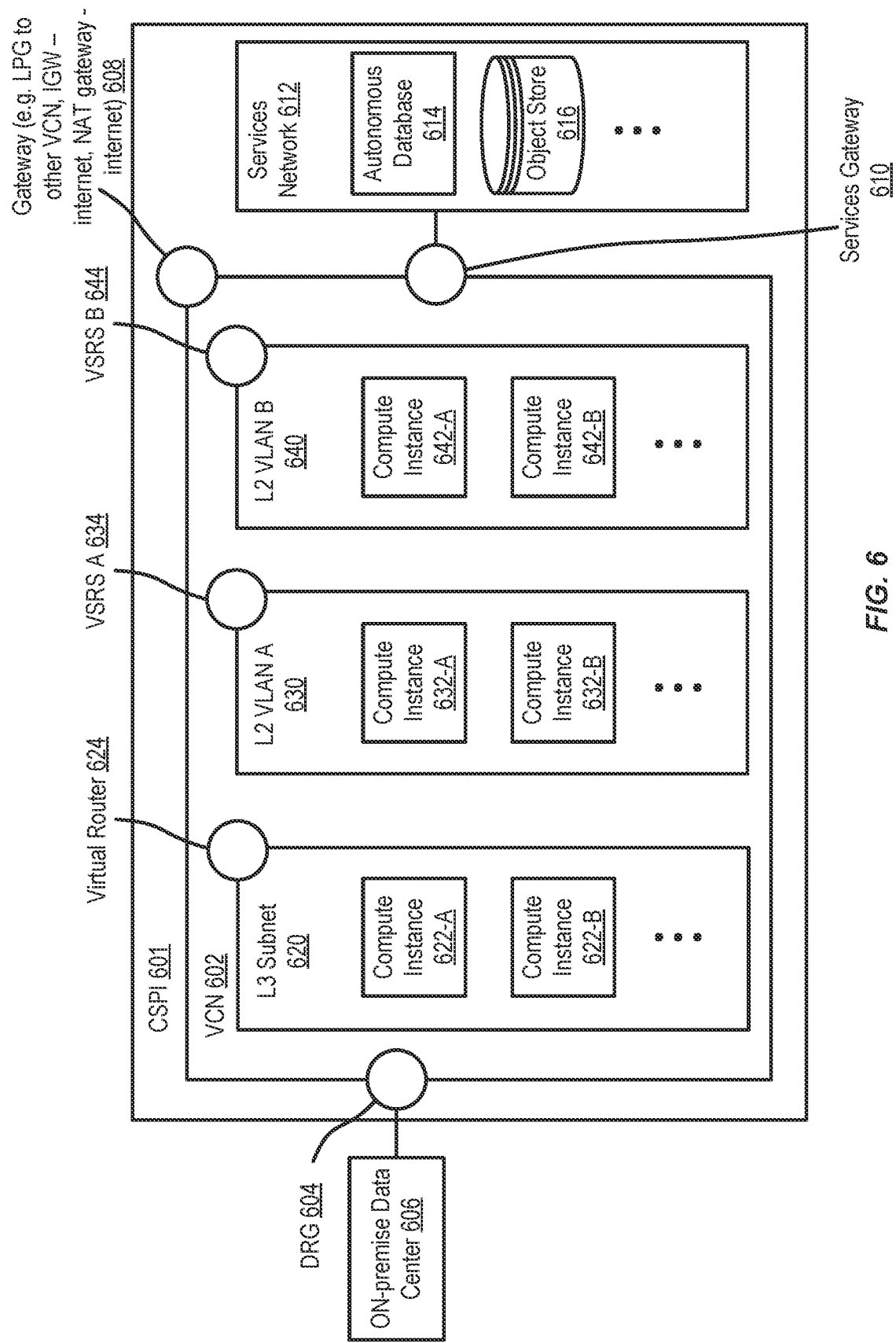
FIG. 6 is a schematic illustration of one embodiment of a computing network.

With reference now to FIG. 6, a schematic illustration of one embodiment of a computing network is shown. A VCN 602 resides of a CSPI 601. The VCN 602 includes a plurality gateways connecting the VCN 602 to other networks. These gateways include DRG 604 which can connect the VCN 602 to, for example, an on-premise network such as on-premise data center 606. The gateways can further include gateway 600, which can include, for example, a LPG for connecting the VCN 602 with another VCN, and/or an IGW and/or NAT gateway for connecting the VCN 602 to the internet. The gateways of the VCN 602 can further include a services gateway 610 which can connect the VCN 602 with a services network 612. The services network 612 can include one or several databases and/or stores including, for example, autonomous database 614 and/or object store 616. The services network can comprise a conceptual network comprising an aggregation of IP ranges, which can be, for example, public IP ranges. In some embodiments, these IP ranges can cover some or all of the public services offered by the CSPI 601 provider. These services can, for example, be accessed through an Internet Gateway or NAT Gateway. In some embodiments, the services network provides a way for the services in the services network to be accessed from the local region through a dedicated gateway for that purpose (a Service Gateway). In some embodiments, the backends of these services can be implemented in, for example, their own private networks. In some embodiments, the services network 612 can include further additional databases.

The VCN 602 can include a plurality of virtual networks. These networks can, each include one or several compute instances which can communicate within their respective networks, between networks, or outside of the VCN 602. One of the virtual networks of the VCN 602 is an L3 subnet 620. The L3 subnet 620 is a unit of configuration or a subdivision created within the VCN 602. The subnet 620 can comprise a virtual Layer 3 network in the virtualized cloud environment of the VCN 602, which VCN 602 is hosted on the underlying physical network of CPSI 601. Although FIG. 6 depicts a single subnet 620, the VCN 602 can have one or multiple subnets. Each subnet within the VCN 602 can be associated with a contiguous range of overlay IP addresses (e.g., 10.0.0.0/24 and 10.0.1.0/24) that do not overlap with other subnets in that VCN and which represent an address space subset within the address space of the VCN. In some embodiments, this IP address space can be isolated from an address space associated with CPSI 601.

The subnet 620 includes one or more compute instances, and specifically includes a first compute instance 622-A and a second compute instance 622-B. The compute instances 622-A, 622-B can communicate with each other within the subnet 620, or they can communicate with other instances, devices, and/or networks outside of the subnet 620. Communication outside of the subnet 620 is enabled by a virtual router (VR) 624. The VR 624 enables communications between the subnet 620 and other networks of the VCN 602. For the subnet 620, the VR 624 represents a logical gateway that enables the subnet 620 (i.e., the compute instances 622-A, 622-B) to communicate with endpoints on other networks within the VCN 602, and with other endpoints outside the VCN 602.

The VCN 602 can further include additional networks, and specifically can include one or several L2 VLANs (referred to herein as VLANs), which are examples of a virtual L2 network. These one or several VLANs can each comprise a virtual Layer 2 network that is localized in the cloud environment of the VCN 602 and/or that is hosted by the underlying physical network of the CPSI 601. In the embodiment of FIG. 6, the VCN 602 includes a VLAN A 630 and a VLAN B 640. Each VLAN 630, 640 within the VCN 602 can be associated with a contiguous range of overlay IP addresses (e.g., 10.0.0.0/24 and 10.0.1.0/24) that do not overlap with other networks in that VCN, such as other subnets or VLANs in that VCN, and which represent an address space subset within the address space of the VCN. In some embodiments, this IP address space of the VLAN can be isolated from an address space associated with CPSI 601.

Each of the VLANs 630, 640 can include one or several compute instances, and specifically, VLAN A 630 can include, for example, a first compute instance 632-A, and a second compute instance 632-B. In some embodiments VLAN A 630 can include additional compute instances. VLAN B 640 can include, for example, a first compute instance 642-A, and a second compute instance 642-B. Each of the compute instances 632-A, 632-B, 642-A, 642-B can have an IP address and a MAC address. These addresses can be assigned or generated in any desired manner. In some embodiments, these addresses can be within a CIDR of the VLAN of the compute instances, and in some embodiments, these addresses can be any addresses. In embodiments in which compute instances of a VLAN communicate with endpoints outside of the VLAN, then one or both of these addresses are from the VLAN CIDR, whereas when all communications are intra-VLAN, then these addresses are not limited to addresses within the VLAN CIDR. In contrast to a network in which addresses are assigned by a control plane, the IP and/or MAC addresses of the compute instances in the VLAN can be assigned by the user/customer of that VLAN, and these IP and/or MAC addresses can then be discovered and/or learned by the compute instances in the VLAN according to the processes for learning discussed below.

Each of the VLANs can include a VLAN Switching and Routing Service (VSRS), and specifically, VLAN A 630 includes VSRS A 634 and VLAN B 640 includes VSRS B 644. Each VSRS 634, 644 participates in Layer 2 switching and local learning within a VLAN and also performs all necessary Layer 3 network functions including ARP, NDP, and routing. VSRS performs ARP (which is a Layer 2 protocol) as the VSRS has to map IPs to MACs.

In these cloud-based VLANs, each virtual interface or virtual gateway can be associated with one or more media access control (MAC) addresses, which can be virtual MAC addresses. Within the VLAN, the one or several compute instances 632-A, 632-B, 642-A, 642-B, which can be, for example bare metal, VM, or container, and/or one or several service instances, can directly communicate with each other via a virtual switch. Communication outside of the VLAN, such as with other VLANs or with an L3 network is enabled via the VSRS 634, 644. The VSRS 634, 644 is a distributed service providing the Layer 3 functions, such as IP routing, for a VLAN network. In some embodiments, the VSRS 634, 644 is a horizontally scalable, highly available routing service that can sit at the intersection of IP networks and L2 networks and participate in IP routing and L2 learning within a cloud-based L2 domain.

The VSRS 634, 644 can be distributed across multiple nodes within the infrastructure, and the VSRS 634, 644 function can be scalable, and specifically can be horizontally scalable. In some embodiments, each of the nodes implementing the function of the VSRS 634, 644 share and replicate the function of a router and/or a switch with each other. Further, these nodes can present themselves as a single VSRS 634, 644 to all of the instances in the VLAN 630, 640. The VSRS 634, 644 can be implemented on any virtualization device within the CSPI 601, and specifically within the virtual network. Thus, in some embodiments, the VSRS 634, 644 can be implemented on any of the virtual network virtualization devices including NICs, SmartNICs, switches, Smart switches or general compute hosts.

The VSRS 634, 644 can be a service residing on one or several hardware nodes, such as one or several servers, such as for example, one or several x86 servers, or one or several networking devices, such as one or several NICs and specifically one or several SmartNICs, supporting the cloud network. In some embodiments, the VSRS 634, 644 can be implemented on a server fleet. Thus, the VSRS 634, 644 can be a service distributed across a fleet of nodes, which may be a centrally managed fleet or may be distributed to the edges, of virtual networking enforcers that participates in and shares L2 and L3 learning along with evaluating routing and security policies. In some embodiments each of the VSRS instances can update other VSRS instances with new mapping information as this new mapping information is learned by a VSRS instance. For example, when a VSRS instance learns IP, interface, and/or MAC mapping for one or several CIs in its VLAN, the VSRS instance can provide that updated information to other VSRS instances within the VCN. Via this cross-updating, a VSRS instance associated with a first VLAN can know the mappings, including IP, interface, and/or MAC mappings for CIs in other VLANs, in some embodiments, for CIs in other VLANs within the VCN 602. When the VSRS resides on a server fleet and/or is distributed across a fleet of nodes, these updates can be greatly expedited.

In some embodiments, the VSRS 634, 644 may also host one or several higher level services necessary for networking including, but not limited to: a DHCP relay; a DHCP (hosting); a DHCPv6; a neighbor discovery protocol such as IPv6 Neighbor Discovery Protocol; a DNS; a hosting DNSv6; a SLAAC for IPv6; a NTP; a metadata service; and blockstore mount points. In some embodiments, the VSRS can support one or several Network Address Translation (NAT) functions to translate between network address spaces. In some embodiments, the VSRS can incorporate anti-spoofing, anti-MAC spoofing, ARP-cache poisoning protection for IPv4, IPv6 Route Advertisement (RA) guarding, DHCP guarding, packet filtering using Access Control Lists (ACLs); and/or reverse path forwarding checks. The VSRS can implement functions including, for example, ARP, GARP, Packet Filters (ACLs), DHCP relay, and/or IP routing protocols. The VSRS 634, 644 can, for example, learn MAC addresses, invalidate expired MAC addresses, handle moves of MAC addresses, vet MAC address information, handling flooding of MAC information, handling of storm control, loop prevention, Layer 2 multicast via, for example, protocols such as IGMP in the cloud, statistic gathering including logs, statistics using SNMP, monitoring, and/or gathering and using statistics for broadcast, total traffic, bits, spanning tree packets, or the like.

Within the virtual network, the VSRS 634, 644 can manifest as different instantiations. In some embodiments, each of these instantiations of the VSRS can be associated with a VLAN 630, 640, and in some embodiments each VLAN 630, 640 can have an instantiation of the VSRS 634, 644. In some embodiments, each instantiation of the VSRS 634, 644 can have one or several unique tables corresponding to the VLAN 630, 640 with which the instantiation of the VSRS 634, 644 is associated. Each instantiation of the VSRS 634, 644 can generate and/or curate the unique tables associated with that instantiation of the VSRS 634, 644. Thus, while a single service may provide VSRS 634, 644 functionality for one or several cloud networks, individual instantiations of the VSRS 634, 644 within the cloud network can have unique Layer 2 and Layer 3 forwarding tables, while multiple such customer networks can have over-lapping Layer 2 and Layer 3 forwarding tables.

In some embodiments, the VSRS 634, 644 can support conflicting VLAN and IP spaces across multiple tenants. This can include having multiple tenants on the same VSRS 634, 644. In some embodiments, some or all of these tenants could choose to use some or all of: the same IP address space, the same MAC space, and the same VLAN space. This can provide extreme flexibility for users in choosing addresses. In some embodiments, this multitenancy is supported via providing each tenant with a distinct virtual network, which virtual network is a private network within the cloud network. Each virtual network is given a unique identifier. Similarly, in some embodiments, each host can have a unique identifier, and/or each virtual interface or virtual gateway can have a unique identifier. In some embodiments, these unique identifiers, and specifically the unique identifier of the virtual network for a tenant can be encoded in each communication. By providing each virtual network with a unique identifier and including this within communications, a single instantiation of the VSRS 634, 644 can service multiple tenants having overlapping address and/or name spaces.

The VSRS 634, 644 can perform these switching and/or routing functions to facilitate and/or enable the creation and/or communication with an L2 network within the VLAN 630, 640. This VLAN 630, 640 can be found within a cloud computing environment, and more specifically within a virtual network in that cloud computing environment.

For example, each of VLAN 630, 640 include multiple compute instances 632-A, 632-B, 642-A, 642-B. The VSRS 634, 644 enables communication between a compute instance in one VLAN 630, 640 with a compute instance in another VLAN 630, 640 or in the subnet 620. In some embodiments, the VSRS 634, 644 enables communication between a compute instance in one VLAN 630, 640 with another VCN, another network outside of the VCN including the internet, an on-premise data center, or the like. In such an embodiment, for example, a compute instance, such as compute instance 632-A, can send a communication to an endpoint outside of the VLAN, in this instance, outside of L2 VLAN A 630. The compute instance (632-A) can send a communication to VSRS A 634, which can direct the communication to a router 624, 644 or gateway 604, 608, 610 communicatively coupled with the desired endpoint. The router 624, 644 or gateway 604, 608, 610 communicatively coupled with the desired endpoint can receive the communication from the compute instance (632-A) and can direct the communication to the desired endpoint.

Figure 7:
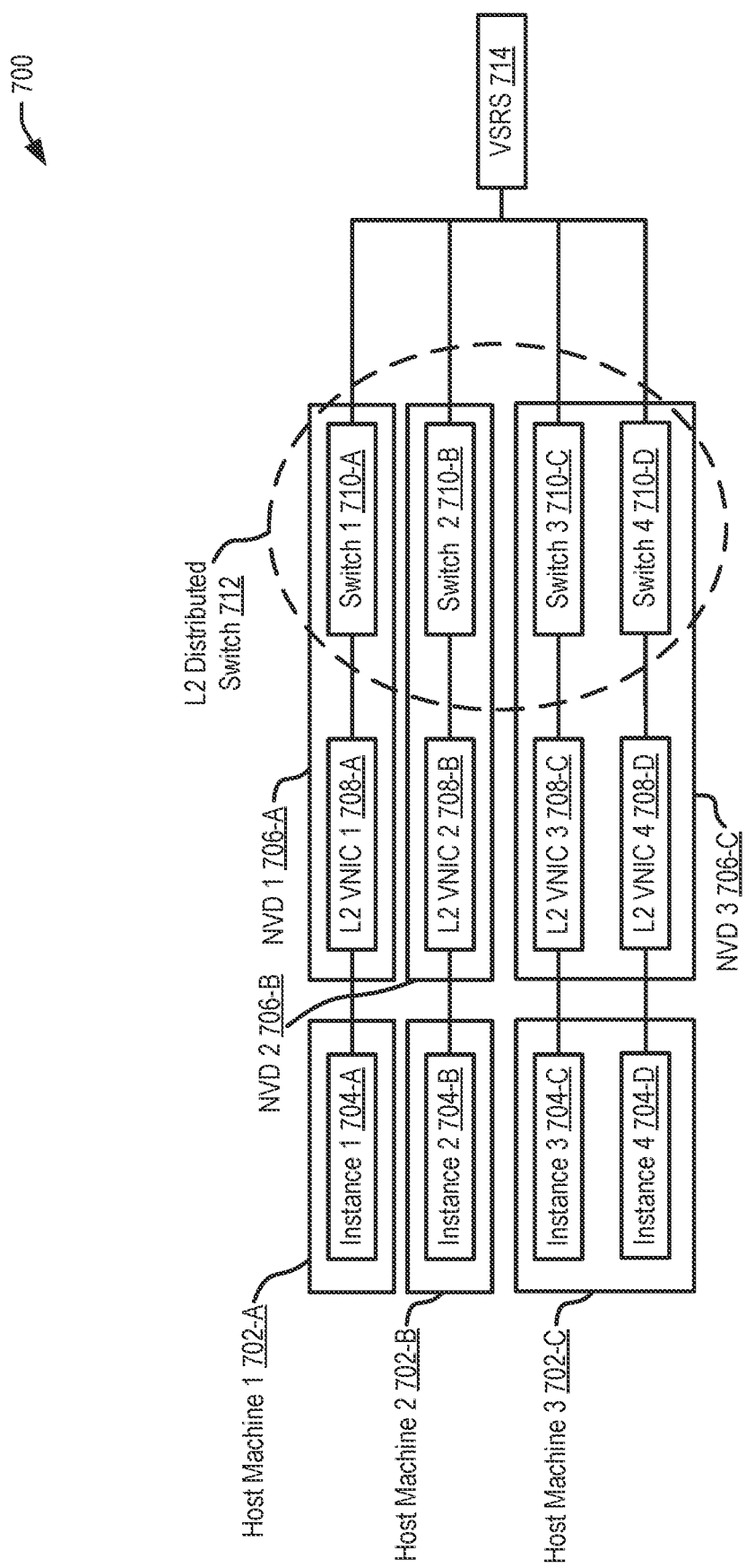
FIG. 7 is a logical and hardware schematic illustration of virtual local area network (VLAN).

With reference now to FIG. 7, a logical and hardware schematic illustration of VLAN 700 is shown. As seen, the VLAN 700 includes a plurality of endpoints, and specifically includes a plurality of compute instances and a VSRS. The plurality of compute instances (CIs) are instantiated on one or several host machines. In some embodiments, this can be in a one-to-one relationship such that each CI is instantiated on a unique host machine, and/or in some embodiments, this can be in a many-to-one relationship such that a plurality of CIs are instantiated on a single, common host machine. In the various embodiments, the CIs can be Layer 2 CIs by being configured to communicate with each other using L2 protocols. FIG. 7 depicts a scenario in which some CIs are instantiated on unique host machines and in which some CIs share a common host machine. As seen in FIG. 7, Instance 1 (CI1) 704-A is instantiated on host machine 1 702-A, instance 2 (CI2) 704-B is instantiated on host machine 2 702-B, and instances 3 (CI3) 704-C and instance 4 (CI4) 704-D are instantiated on a common host machine 702-C.

Each of the CIs 704-A, 704-B, 704-C, 704-D is communicatively coupled with other CIs 704-A, 704-B, 704-C, 704-D in the VLAN 700 and with VSRS 714. Specifically, each of the CIs 704-A, 704-B, 704-C, 704-D is connected to the other CIs 704-A, 704-B, 704-C, 704-D in the VLAN 700 and to the VSRS 714 via an L2 VNIC and a switch. Each CI 704-A, 704-B, 704-C, 704-D is associated with a unique L2 VNIC and a switch. The switch can be an L2 virtual switch that is local and uniquely associated with and deployed for the L2 VNIC. Specifically, CI1 704-A is associated with L2 VNIC 1 708-A and switch 1 710-A, CI2 704-B is associated with L2 VNIC 2 708-B and switch 710-B, CI3 704-C is associated with L2 VNIC 3 708-C and switch 3 710-C, and CI4 704-D is associated with L2 VNIC 4 708-D and switch 4 710-D.

In some embodiments, each L2 VNIC 708 and its associated switch 710 can be instantiated on an NVD 706. This instantiation can be in a one-to-one relationship such that a single L2 VNIC 708 and its associated switch 710 are instantiated on a unique NVD 706, or this instantiation can be in a many-to-one relationship such that multiple L2 VNICs 708 and their associated switches 710 are instantiated on a single, common NVD 706. Specifically, L2 VNIC 1 708-A and switch 1 710-A are instantiated on NVD 1 706-A, L2 VNIC 2 708-B and switch 2 710-B are instantiated on NVD 2, and both L2 VNIC 3 708-C and switch 3 710-C, and L2 VNIC 4 708-D, and switch 710-D are instantiated on a common NVD, namely, NVD 706-C.

In some embodiments, the VSRS 714 can support conflicting VLAN and IP spaces across multiple tenants. This can include having multiple tenants on the same VSRS 714. In some embodiments, some or all of these tenants could choose to use some or all of: the same IP address space, the same MAC space, and the same VLAN space. This can provide extreme flexibility for users in choosing addresses. In some embodiments, this multitenancy is supported via providing each tenant with a distinct virtual network, which virtual network is a private network within the cloud network. Each virtual network (e.g., each VLAN or VCN) is given a unique identifier such as a VCN identifier which can be a VLAN identifier. This unique identifier can be selected by, for example, the control plane, and specifically by the control plane of the CSPI. In some embodiments, this unique identifier can comprise one or several bits that can be included and/or used in packet encapsulation.

Similarly, in some embodiments, each host can have a unique identifier, and/or each virtual interface or virtual gateway can have a unique identifier. In some embodiments, these unique identifiers, and specifically the unique identifier of the virtual network for a tenant can be encoded in each communication. By providing each virtual network with a unique identifier and including this within communications, a single instantiation of the VSRS can service multiple tenants having overlapping address and/or name spaces.

In some embodiments, a VSRS 714 can determine to which tenant a packet belongs based on the VCN identifier and/or the VLAN identifier associated with a communication, and specifically inside of the VCN header of the communication. In embodiments disclosed herein, a communication leaving or entering a VLAN can have a VCN header which can include VLAN identifier. Based on the VCN header containing the VLAN identifier, the VSRS can determine tenancy, or in other words, the recipient VSRS can determine to which VLAN and/or to which tenant to send the communication.

In addition, each compute instance that belongs to a VLAN (e.g., an L2 compute instance) is given a unique interface identifier that identifies the L2 VNIC that is associated with the compute instance. The interface identifier can be included in traffic from and/or to the computer instance (e.g., by being included in a header of a frame) and can be used by an NVD to identify the L2 VNIC associated with the compute instance. In other words, the interface identifier can uniquely indicate the compute instance and/or its associated L2 VNIC. As indicated in FIG. 7, the switches 710-A, 710-B, 710-C, 710-D can together form an L2 distributed switch 712, also referred to herein as distributed switch 712. From a customer standpoint, each switch 710-A, 710-B, 710-C, 710-D in the L2 distributed switch 712 is a single switch that connects to all of the CIs in the VLAN. However, the distributed switch, which emulates the user experience of a single switch, is infinitely scalable and includes a collection of local switches (e.g., in the illustrative example of FIG. 7, the switches 710-A, 710-B, 710-C, 710-D). As shown in FIG. 7, each CI executes on a host machine connected to a NVD. For each CI on a host connected to an NVD, the NVD hosts a Layer 2 VNIC and a local switch associated with the compute instance (e.g., an L2 virtual switch, local to the NVD, associated with the Layer 2 VNIC, and being one member or component of the L2 distributed switch 712). The Layer 2 VNIC represents a port of the compute instance on the Layer 2 VLAN. The local switch connects the L2 VNIC to other L2 VNICs (e.g., other ports) associated with other compute instances of the Layer 2 VLAN.

Each of the CIs 704-A, 704-B, 704-C, 704-D can communicate with the others of the CIs 704-A, 704-B, 704-C, 704-D in the VLAN 700 or with the VSRS 714. One of CIs 704-A, 704-B, 704-C, 704-D sends a packet to another of the CIs 704-A, 704-B, 704-C, 704-D or to the VSRS 714 by sending the packet to the MAC address and the interface of the recipient one of the CIs 704-A, 704-B, 704-C, 704-D or the VSRS 714. The MAC address and the interface identifier can be included in a header of a packet. As explained herein above, the interface identifier can indicate the L2 VNIC of the recipient one of the CIs 704-A, 704-B, 704-C, 704-D or of the VSRS 714.

In one embodiment, the CI1 704-A can be a source CI, L2 VNIC 708-A can be a source VNIC, and switch 710-A can be a source switch. In this embodiment, CI3 704-C can be the destination CI, and L2 VNIC 3 708-C can be the destination VNIC. The source CI can send a packet with a source MAC address and a destination MAC address. This packet can be intercepted by the NVD 706-A instantiating the source VNIC and the source switch.

The L2 VNICs 708-A, 708-B, 708-C, 708-D can, for the VLAN 700, each learn mapping of MAC addresses to interface identifiers of the L2 VNICs. This mapping can be learned based on packets and/or communications received from within the VLAN 700. Based on this previously determined mapping, the source VNIC can determine the interface identifier of the destination interface associated with the destination CI within the VLAN, and can encapsulate the packet. In some embodiments, this encapsulation can comprise a GENEVE encapsulation, and specifically an L2 GENEVE encapsulation, which encapsulation include the L2 (Ethernet) header of the packet being encapsulated. The encapsulated packet can identify the destination MAC, the destination interface identifier, the source MAC, and the source interface identifier.

The source VNIC can pass the encapsulated packet to the source switch, which source switch can direct the packet to the destination VNIC. Upon receipt of the packet, the destination VNIC can decapsulate the packet and can then provide the packet to the destination CI.

Figure 8:
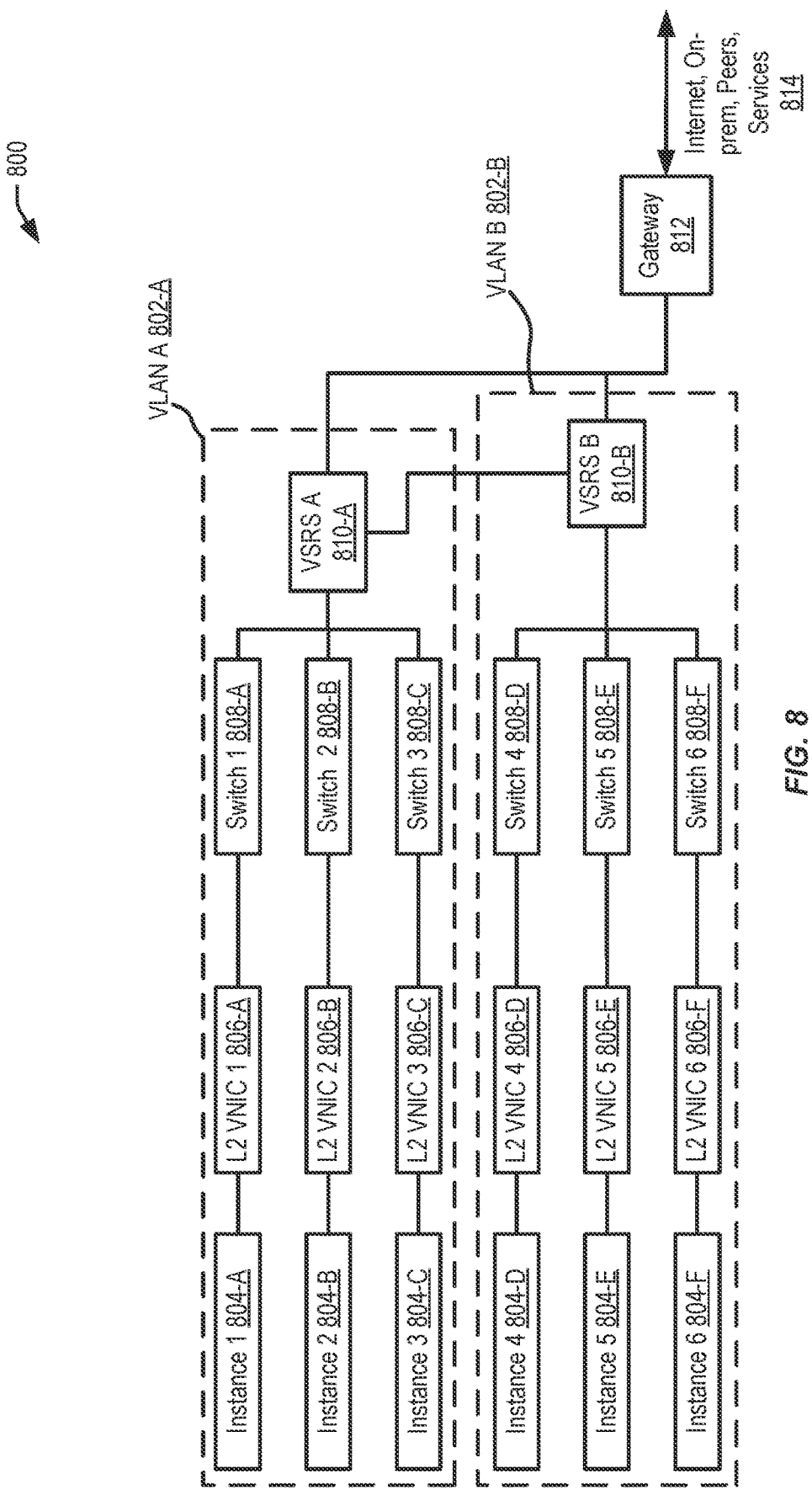
FIG. 8 is a logical schematic illustration of multiple connected L2 VLANs.

With reference now to FIG. 8, a logical schematic illustration of multiple connected L2 VLANs 800 is shown. In the specific embodiment depicted in FIG. 8, both VLANs are located in the same VCN. As seen, the multiple connected L2 VLANs 800 can include a first VLAN, VLAN A 802-A and a second VLAN, VLAN B 802-B. Each of these VLANs 802-A, 802-B can include one or several CIs, each of which can have an associated L2 VNIC and an associated L2 virtual switch. Further, each of these VLANs 802-A, 802-B can include a VSRS.

Specifically, VLAN A 802-A can include instance 1 804-A connected to L2 VNIC 1 806-A and switch 1 808-A, instance 2 804-B connected to L2 VNIC 2 806-B and switch 808-B, and instance 3 804-C connected to L2 VNIC 3 806-C and switch 3 808-C. VLAN B 802-B can include instance 4 804-D connected to L2 VNIC 4 806-D and switch 4 808-D, instance 5 804-E connected to L2 VNIC 5 806-E and switch 808-E, and instance 6 804-F connected to L2 VNIC 6 806-F and switch 3 808-F. VLAN A 802-A can further include VSRS A 810-A, and VLAN B 802-B can include VSRS B 810-B. Each of the CIs 804-A, 804-B, 804-C of VLAN A 802-A can be communicatively coupled to VSRS A 810-A, and each of the CIS 804-D, 804-E, 804-F of VLAN B 802-B can be communicatively coupled to VSRS B 810-B.

VLAN A 802-A can be communicatively coupled to VLAN B 802-B via their respective VSRS 810-A, 810-B. Each VSRS can likewise be coupled to gateway 812, which can provide access to CIs 804-A, 804-B, 804-C, 804-D, 804-E, 804-F in each VLAN 802-A, 802-B to other networks outside of the VCN in which the VLANs are 802-A, 802-B are located. In some embodiments, these networks can include, for example, one or several on-premise networks, another VCN, a services network, a public network such as the internet, or the like.

Each of the CIs 804-A, 804-B, 804-C in VLAN A 802-A can communicate with the CIs 804-D, 804-E, 804-F in VLAN B 802-B via the VSRS 810-A, 810-B of each VLAN 802-A, 802-B. For example, one of CIs 804-A, 804-B, 804-C, 804-D, 804-E, 804-F in one of the VLANs 802-A, 802-B can send a packet to a CI 804-A, 804-B, 804-C, 804-D, 804-E, 804-F in the other of the VLANs 802-A, 802-B. This packet can exit the source VLAN via the VSRS of the source VLAN and can enter the destination VLAN, and be routed to the destination CI via the destination VSRS.

In one embodiment, the CI 1 804-A can be a source CI, L2 VNIC 806-A can be a source VNIC, and a switch 808-A can be a source switch. In this embodiment, CI 5 804-E can be the destination CI, and L2 VNIC 5 806-E can be the destination VNIC. VSRS A 810-A can be the source VSRS identified as SVSRS, and VSRS B 810-B can be the destination VSRS, identified as DVSRS.

Source CI can send a packet with a MAC address. This packet can be intercepted by the NVD instantiating source VNIC and the source switch. The source VNIC, encapsulates the packet. In some embodiments, this encapsulation can comprise a Geneve encapsulation, and specifically an L2 Geneve encapsulation. The encapsulated packet can identify a destination address of the destination CI. In some embodiments, this destination address can also comprise a destination address of the destination VSRS. The destination address of the destination CI can include a destination IP address, an destination MAC of the destination CI, and/or a destination interface identifier of the destination VNIC of the destination CI. The destination address of the destination VSRS can include the IP address of the destination VSRS, an interface identifier of the destination VNIC associated with of the destination VSRS, and/or the MAC address of the destination VSRS.

The source VSRS can receive the packet from the source switch, can look up the VNIC mapping from the destination address of the packet, which destination address can be a destination IP address, and can forward the packet to the destination VSRS. The destination VSRS can receive the packet. Based on the destination address contained in the packet, the destination VSRS can forward the packet to the destination VNIC. The destination VNIC can receive and decapsulate the packet and can then provide the packet to the destination CI.

Figure 9:
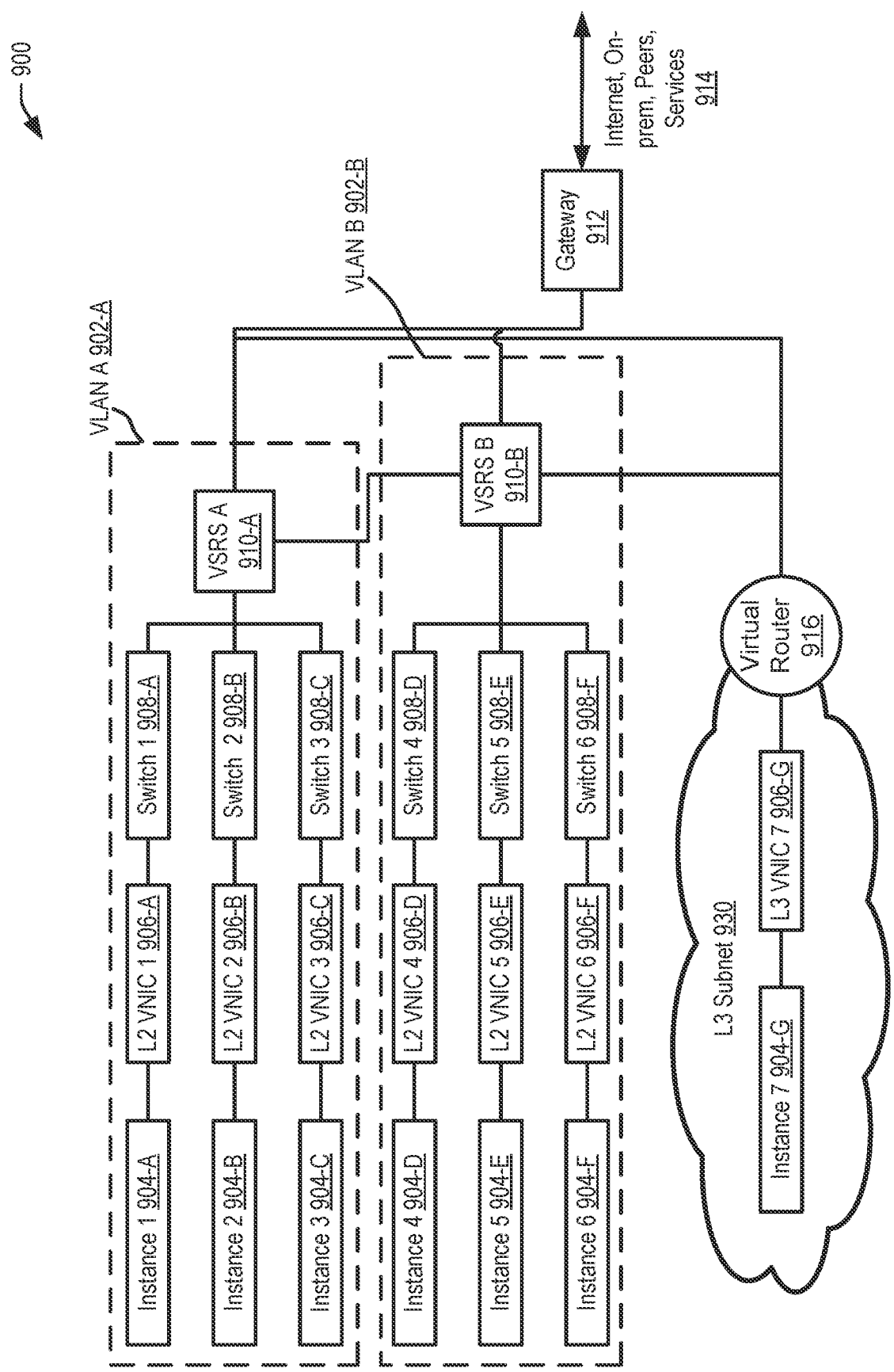
FIG. 9 is a logical schematic illustration of multiple connected L2 VLANs and a subnet.

With reference now to FIG. 9, a logical schematic illustration of multiple connected L2 VLANs and a subnet 900 is shown. In the specific embodiment depicted in FIG. 9, both VLANs and the subnet are located in the same VCN. This is indicated as the virtual router and the VSRS of both of the VLANs and the subnet are directly connected, as opposed to connected through a gateway.

As seen, this can include a first VLAN, VLAN A 902-A, a second VLAN, VLAN B 902-B, and subnet 930. Each of these VLANs 902-A, 902-B can include one or several CIs, each of which can have an associated L2 VNIC and an associated L2 switch. Further, each of these VLANs 902-A, 902-B can include a VSRS. Likewise, the subnet 930, which can be an L3 subnet, can include one or several CIs, each of which can have an associated L3 VNIC, and the L3 subnet 930 can include a virtual router 916.

Specifically, VLAN A 902-A can include instance 1 904-A connected to L2 VNIC 1 906-A and switch 1 908-A, instance 2 904-B connected to L2 VNIC 2 906-B and switch 908-B, and instance 3 904-C connected to L2 VNIC 3 906-C and switch 3 908-C. VLAN B 902-B can include instance 4 904-D connected to L2 VNIC 4 906-D and switch 4 908-D, instance 5 904-E connected to L2 VNIC 5 906-E and switch 908-E, and instance 6 904-F connected to L2 VNIC 6 906-F and switch 3 908-F. VLAN A 902-A can further include VSRS A 910-A, and VLAN B 902-B can include VSRS B 910-B. Each of the CIs 904-A, 904-B, 904-C of VLAN A 902-A can be communicatively coupled to VSRS A 910-A, and each of the CIS 904-D, 904-E, 904-F of VLAN B 902-B can be communicatively coupled to VSRS B 910-B. L3 subnet 930 can include one or several CIs, and specifically can include instance 7 904-G, which is communicatively coupled to L3 VNIC 7 906-G. The L3 subnet 930 can include virtual router 916.

VLAN a 902-A can be communicatively coupled to VLAN B 902-B via their respective VSRS 910-A, 910-B. The L3 subnet 930 can be communicatively coupled with VLAN a 902-A and VLAN B 902-B via virtual router 916. Each of which virtual router 916 and VSRS instances 910-A, 910-B can likewise be coupled to gateway 912, which can provide access for CIs 904-A, 904-B, 904-C, 904-D, 904-E, 904-F, 904-G in each VLAN 902-A, 902-B and in the subnet 930 to other networks outside of the VCN in which the VLANs are 902-A, 902-B and subnet 930 are located. In some embodiments, these networks can include, for example, one or several on-premise networks, another VCN, a services network, a public network such as the internet, or the like.

Each VSRS instance 910-A, 910-B can provide an egress pathway for packets leaving the associated VLAN 902-A, 902-B, and an ingress pathway for packets entering the associated VLAN 902-A, 902-B. From the VSRS instance 910-A, 910-B of a VLAN 902-A, 902-B, packets can be sent to any desired endpoint, including an L2 endpoint such as an L2 CI in another VLAN either on the same VCN or on a different VCN or network, and/or to an L3 endpoint such as an L3 CI in a subnet either on the same VCN or one a different VCN or network.

In one embodiment, the CI 1 904-A can be a source CI, L2 VNIC 906-A can be a source VNIC, and switch 908-A can be a source switch. In this embodiment, CI 7 904-G can be the destination CI, and VNIC 7 906-G can be the destination VNIC. VSRS A 910-A can be the source VSRS identified as SVSRS, and virtual router (VR) 916, can be the destination VR.

Source CI can send a packet with a MAC address. This packet can be intercepted by the NVD instantiating source VNIC and the source switch. The source VNIC, encapsulates the packet. In some embodiments, this encapsulation can comprise a Geneve encapsulation, and specifically an L2 Geneve encapsulation. The encapsulated packet can identify a destination address of the destination CI. In some embodiments, this destination address can also comprise a destination address of the VSRS of the VLAN of the source CI. The destination address of the destination CI can include a destination IP address, an destination MAC of the destination CI, and/or a destination interface identifier of the destination VNIC of the destination CI.

The source VSRS can receive the packet from the source switch, can look up the VNIC mapping from the destination address of the packet, which destination address can be a destination IP address, and can forward the packet to the destination VR. The destination VR can receive the packet. Based on the destination address contained in the packet, the destination VR can forward the packet to the destination VNIC. The destination VNIC can receive and decapsulate the packet and can then provide the packet to the destination CI.

Learning within a Virtual L2 Network

Figure 10:
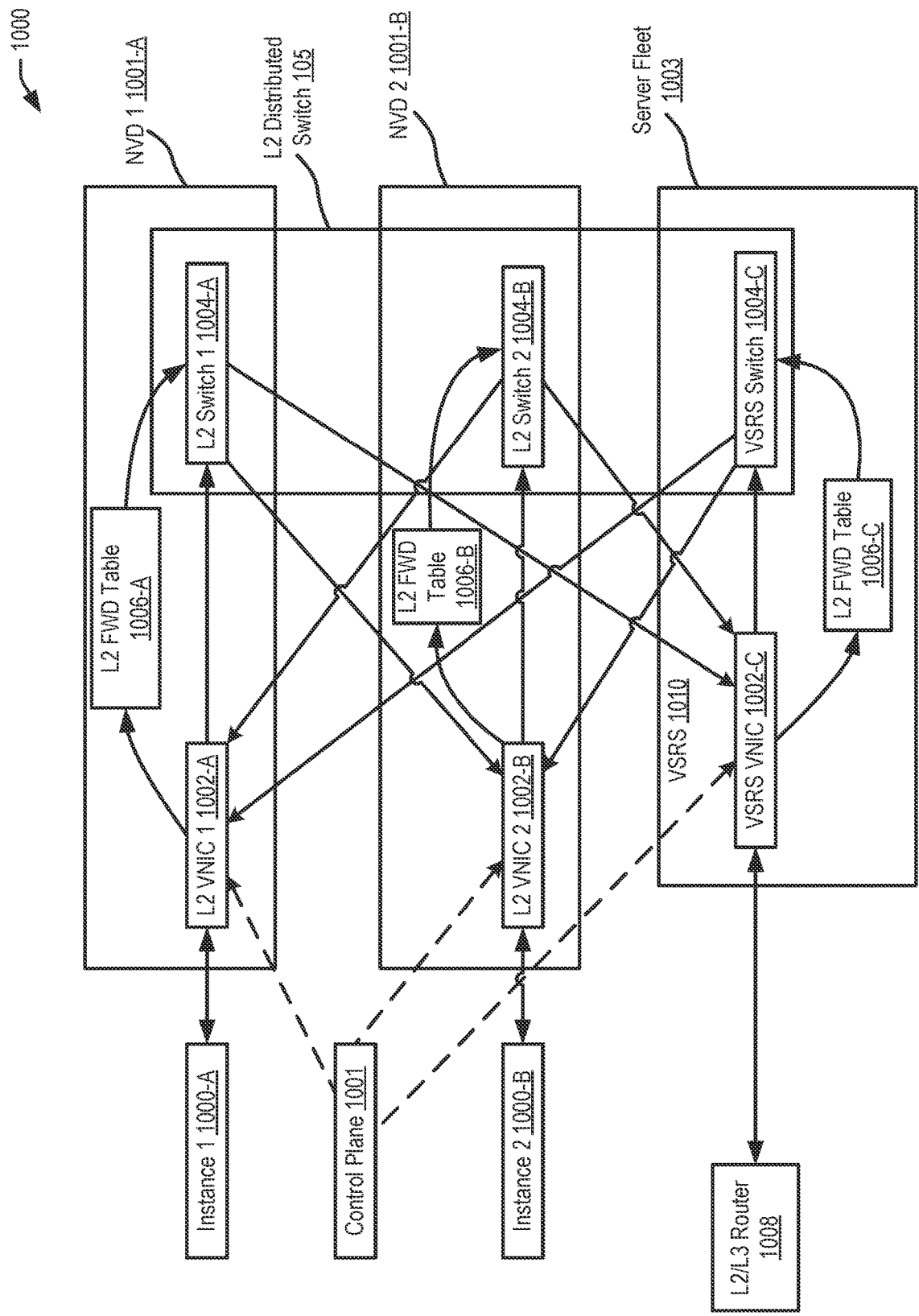
FIG. 10 is a schematic illustration of one embodiment of intra-VLAN communication and learning within a VLAN.

With reference now to FIG. 10, a schematic illustration of one embodiment of intra-VLAN communication and learning within a VLAN 1000 is shown. The learning here is specific to how an L2 VNIC, a VSRS VNIC, and/or an L2 virtual switch learn associations between MAC addresses and L2 VNICs/VSRS VNICs (more specifically, between MAC addresses associated with L2 compute instances or a VSRS and interface identifiers associated with L2 VNICS of these L2 compute instances or associated with a VSRS VNIC). Generally, the learning is based on ingress traffic. This learning, for an aspect of interface-to-MAC address learning, is different from a learning process (e.g., an ARP process) that an L2 compute instance may implement to learn a destination MAC address. The two learning processes (e.g., of an L2 VNIC/L2 virtual switch and of an L2 compute instance) are illustrated as being jointly implemented in FIG. 12.

As seen, the VLAN 1000 includes compute instance 1 1000-A communicatively coupled with NVD 1 1001-A which instantiates L2 VNIC 1 1002-A and L2 switch 1 1004-A. The VLAN 1000 also include compute instance 2 1000-B communicatively coupled with NVD 2 1001-B which instantiates L2 VNIC 2 1002-B and L2 switch 2 1004-A. The VLAN 1000 also includes VSRS 1010 running on a server fleet, and which includes VSRS VNIC 1002-C and VSRS switch 1004-C. All of the switches 1004-A, 1004-B, 1004-C together form a distributed switch. VSRS 1010 is communicatively coupled with an endpoint 1008 which can comprise a gateway, and specifically can comprise L2/L3 router in, for example, the form of another VSRS, or an L3 router in, for example, the form of a virtual router.

A control plane 1001 of a VCN hosting the VLAN 1000 maintains information identifying each L2 VNIC on the VLAN 1000 and network placement of the L2 VNIC. For example, this information can include for an L2 VNIC, the interface identifier associated with the L2 VNIC, and/or the physical IP address of the NVD hosting the L2 VNIC. The control plane 1001 updates, for example, periodically updates or updates on demand, interfaces in the VLAN 1000 with this information. Thus, each L2 VNIC 1002-A, 1002-B, 1002-C in the VLAN receives the information from the control plane 1001 identifying the interfaces in the VLAN, and populates a table with this information. The table populated by an L2 VNIC can be stored locally to the NVD hosting the L2 VNIC. In the event that a L2 VNIC 1002-A, 1002-B, 1002-C already includes a current table, the L2 VNIC 1002-A, 1002-B, 1002-C can determine any discrepancy between the L2 VNIC's 1002-A, 1002-B, 1002-C current table and the information/table received from the control plane 1001. The L2 VNIC 1002-A, 1002-B, 1002-C can, in some embodiments, update its table to match information received from the control plane 1001.

As seen in FIG. 10, packets are sent via an L2 switch 1004-A, 1004-B, 1004-C, and are received by a recipient L2 VNIC 1002-A, 1002-B, 1002-C. As packets are received by a L2 VNIC 1002-A, 1002-B, 1002-C, that VNIC learns the mapping of the source interface (source VNIC) and source MAC address of that packet. Based on its table of information received from the control plane 1010, the VNIC can map the source MAC address (from a received packet, also referred to herein as a frame) to an interface identifier of the source VNIC and the IP address of the VNIC and/or IP address of the NVD hosting the VNIC (where the interface identifier and IP address(es) are available from the table). As such, a L2 VNIC 1002-A, 1002-B, 1002-C learns mapping of interface identifiers to MAC addresses based on received communications and/or packets, the L2 VNIC 1002-A, 1002-B, 1002-C can update its table, L2 FWD table 1006-A, 1006-B, 1006-C with this learned mapping information. In some embodiments, an L2 forwarding table includes and associates a MAC address with at least one of an interface identifier, or a physical IP address. In such embodiments, the MAC address is an address assigned to an L2 compute instance and can correspond to a port emulated by an L2 VNIC associated with the L2 compute instance. The interface identifier can uniquely identify the L2 VNIC and/or the L2 compute instance. The virtual IP address can be that of the L2 VNIC. And the physical IP address can be that of the NVD hosting the L2 VNIC. The L2 forwarding updated by an L2 VNIC can be stored locally on the NVD hosting the L2 VNIC and used by the L2 virtual switch associated with the L2 VNIC to direct frames. In some embodiments, L2 VNICs within a common VLAN can share all or portions of their mapping table with each other.

In light of the above network architecture, traffic flows are described herein next. In the interest of clarity of explanation, the traffic flows are described in connection with compute instance 2 1000-B, L2 VNIC 2 10002-B, L2 switch 2 1004-B, and NVD 2 1001-B. The description equivalently applies to traffic flows to and/or from other compute instances.

As explained herein above, the VLAN is implemented within a VCN as an overlay L2 network on top of an L3 physical network. An L2 compute instance of the VLAN can send or receive an L2 frame that includes overlay MAC addresses (also referred to as virtual MAC addresses) as source and destination MAC addresses. The L2 frame can also encapsulate a packet that includes overlay IP addresses (also referred to as virtual IP addresses) as source and destination IP addresses. The overlay IP address of the compute instance can, in some embodiments, belong to a CIDR range of the VLAN. The other overlay IP address can belong to the CIDR range (in which case, the L2 frame flows within the VLAN) or outside the CIDR range (in which case, the L2 frame is destined to or received from another network). The L2 frame can also include a VLAN tag that uniquely identifies the VLAN and a VLAN tag, which VLAN tag can be used to distinguish against multiple L2 VNICs on the same NVD The L2 frame can be received in an encapsulated packet by the NVD via a tunnel from the host machine of the compute instance, from another NVD, or from the server fleet hosting the VSRS. In these different cases, the encapsulated packet can be an L3 packet sent on the physical network, where the source and destination IP addresses are physical IP addresses. Different types of encapsulation are possible, including Geneve encapsulation. The NVD can decapsulate the received packet to extract the L2 frame. Similarly, to send an L2 frame, the NVD can encapsulate it in an L3 packet and send it on the physical substrate.

For intra-VLAN egress traffic from the instance 2 1000-B, NVD 2 1001-B receives a frame from the host machine of instance 2 1000-B over an Ethernet link. The frame includes an interface identifier that identifies L2 VNIC 2 1000-B. The frame includes the overlay MAC address of instance 2 1000-B (e.g., M.2) as the source MAC address and the overlay MAC address of instance 1 1000-A (e.g., M.1) as the destination MAC address. Given the interface identifier, NVD 2 1001-B passes the frame to L2 VNIC 2 1002-B for further processing. L2 VNIC 2 1002-B forwards the frame to L2 switch 2 1004-B. Based on L2 forwarding table 1006-B, L2 switch 2 1004-B determines whether the destination MAC address is known (e.g., matches with an entry in L2 forwarding table 1006-B).

If known, L2 switch 2 1004-B determines that L2 VNIC 1 1002-A is the relevant tunnel endpoint and forwards the frame to L2 VNIC 1 1002-A. The forwarding can include encapsulation of the frame in a packet and decapsulation of the packet (e.g., Geneve encapsulation and decapsulation), where the packet includes the frame, the physical IP address of NVD 1 1001-A (e.g., IP.1) as the destination address, and the physical IP address of NVD 2 1001-B (e.g., IP.2) as the source address.

If unknown, L2 switch 2 1004-B broadcasts the frame to the various L2 VNICs of the VLAN (e.g., including L2 VNIC 1 1002-A and any other L2 VNIC of the VLAN), where the broadcasted frames are processed (e.g., encapsulated, sent, decapsulated) between the relevant NVDs. In some embodiments, this broadcast can be performed, or more specifically, emulated, at the physical network, encapsulating the frame separately to each L2 VNIC, including the VSRS in the VLAN. Thus, the broadcast is emulated via a series of replicated unicast packets at the physical network. In turn, each L2 VNIC receives the frame and learns the association between the interface identifier of L2 VNIC 2 1002-B and the source MAC address (e.g., M.2) and the source physical IP address (e.g., IP.2).

For intra-VLAN ingress traffic to compute instance 2 1000-B from compute instance 1 1000-A, NVD 2 1001-B receives a packet from NVD 1. The packet has IP.1 as the source address and a frame, where the frame includes M.2 as the destination MAC address and M.1 as the source MAC address. The frame also includes the network identifier of L2 VNIC 1 1002-A. Upon decapsulation, L2 VNIC 2 receives the frame and learns that this interface identifier is associated with M.1 and/or with IP.1 and stores, if previously unknown, this learned information in L2 forwarding table 1006-B, at switch 2, for subsequent egress traffic. Alternatively, upon decapsulation, L2 VNIC 2 receives the frame and learns that this interface identifier is associated with M.1 and/or with IP.1 and refreshes the expiration time if this information is already known.

For egress traffic sent from instance 2 1000-B in the VLAN 1000 to an instance in another VLAN, a similar flow as the above egress traffic can exist, except that the VSRS VNIC and VSRS switch are used. In particular, the destination MAC address is not within the L2 broadcast of the VLAN 1000 (it is within the other L2 VLAN). Accordingly, the overlay destination IP address (e.g., IP.A) of the destination instance is used for this egress traffic. For example, L2 VNIC 2 1002-B determines that IP.A is outside of the CIDR range of the VLAN 1000. Accordingly, L2 VNIC 2 1002-B sets a destination MAC address to a default gateway MAC address (e.g., M.DG). Based on M.DG, the L2 switch 2 1004-B sends the egress traffic to the VSRS VNIC (e.g., via a tunnel, with the proper end-to-end encapsulation). The VSRS VNIC forwards the egress traffic to the VSRS switch. In turn, the VSRS switch performs a routing function, where, based on the overlay destination IP address (e.g., IP.A), the VSRS switch of the VLAN 1000 sends the egress traffic to the VSRS switch of the other VLAN (e.g., via the virtual router between these two VLANs, also with the proper end-to-end encapsulation). Next, the VSRS switch of the other VLAN performs a switching function by determining that IP.A is within the CIDR range of this VLAN and performs a look-up of its ARP cache based on IP.A to determine the destination MAC address associated with IP.A. If no match exists in the ARP cache, ARP requests are sent to the different L2 VNICs of the other VLAN to determine the destination MAC address. Otherwise, the VSRS switch sends the egress traffic to the relevant VNIC (e.g., via a tunnel, with the proper encapsulation).

For ingress traffic to an instance in the VLAN 1000 from an instance in another VLAN, the traffic flow is similar to the above, except in the opposite direction. For egress traffic from an instance in the VLAN 1000 to an L3 network, the traffic flow is similar to the above except that the VSRS switch of the VLAN 1000 routes the packet directly to the destination VNIC in the virtual L3 network via the virtual router (e.g., without having to route the packet through another VSRS switch). For ingress traffic to an instance in the VLAN 1000 from a virtual L3 network, the traffic flow is similar to the above except that the packet is received by the VSRS switch of the VLAN 1000 A that sends it within the VLAN as a frame. For traffic (egress or ingress) between the VLAN 1000 and other networks, the VSRS switch is similarly used, where its routing function is used on the egress to send a packet via the proper gateway (e.g., IGW, NGW, DRG, SGW, LPG), and where its switching function is used on the ingress to send a frame within the VLAN 1000.

Figure 11:
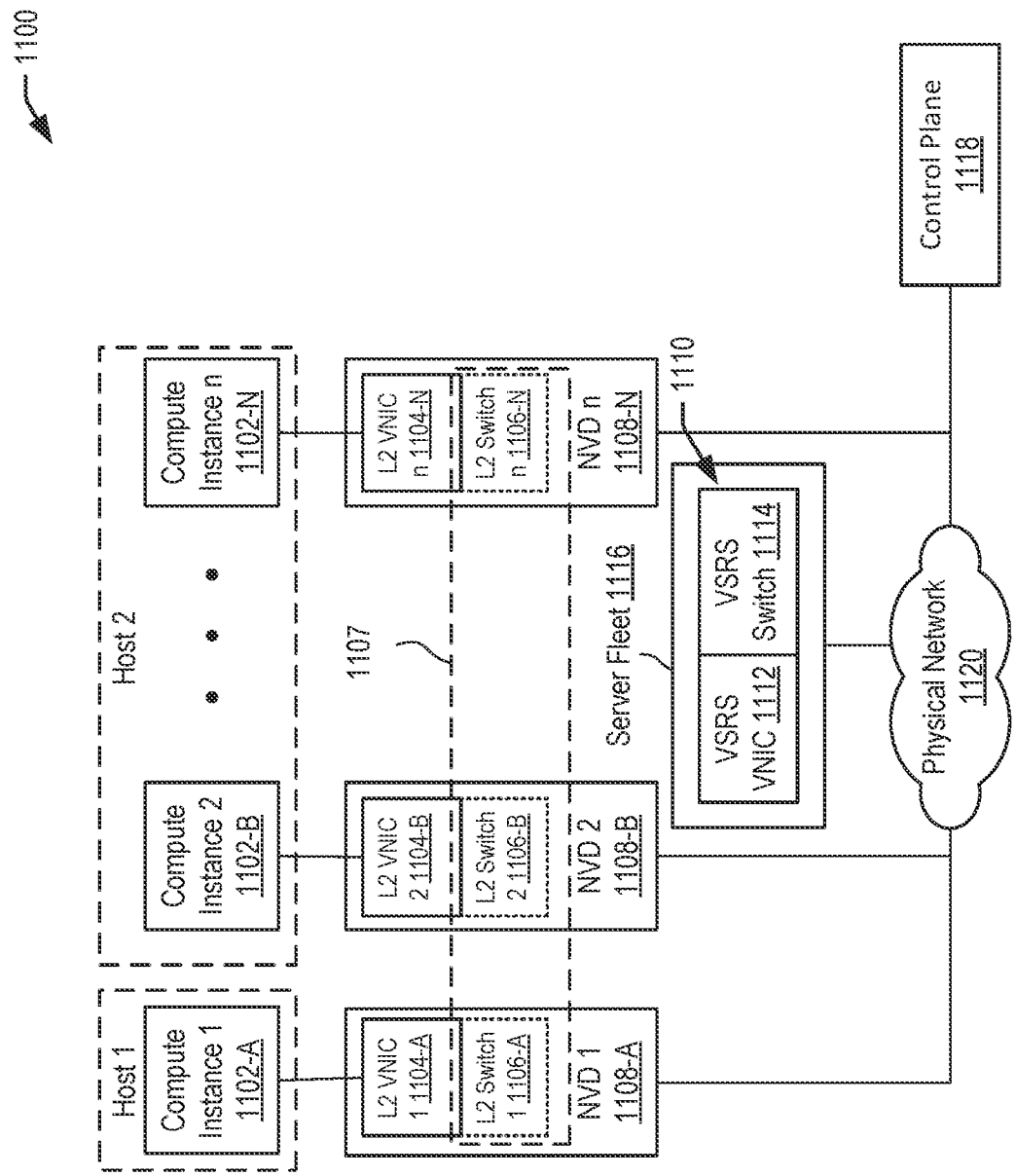
FIG. 11 is a schematic illustration of an embodiment of an implementation view of a VLAN.

With reference now to FIG. 11, a schematic illustration of an embodiment of a VLAN 1100 (e.g., a cloud-based Virtual L2 network) is shown, and specifically an implementation view of the VLAN is shown.

As described herein above, the VLAN can include "n" compute instances 1102-A, 1102-B, 1102-N, each of which executes on a host machine. As previously discussed, there can be a one-to-one association between a compute instance and a host machine, or a many-to-one association between a plurality of compute instances and a single host machine. Each compute instance 1102-A, 1102-B, 1102-N can be an L2 compute instance, in which case, it is associated with at least one virtual interface (e.g., an L2 VNIC) 1104-A, 1104-B, 1104-N and a switch 1106-A, 1106-B, 1106-N. The switches 1106-A, 1106-B, 1106-N are L2 virtual switches and together form an L2 distributed switch 1107.

The pair of L2 VNIC 1104-A, 1104-B, 1104-N and switch 1106-A, 1106-B, 1106-N associated with a compute instance 1102-A, 1102-B, 1102-N on a host machine is a pair of software modules on a NVD 1108-A, 1108-B, 1108-N connected to the host machine. Each L2 VNIC 1104-A, 1104-B, 1104-N represents an L2 port of the customer's perceived single switch (referred to herein as vswitch). Generally, a host machine "i" executes a compute instance "i" and is connected to NVD "i". In turn, NVD "i" executes L2 VNIC "i" and "switch "i". L2 VNIC "i" represents an L2 port "i" of the vswitch. "i" is a positive integer between 1 and "n". Here also, although one-to-one associations are described, other types of associations are possible. For instance, a single NVD can be connected to multiple hosts, each executing one or more compute instances that belong to the VLAN. If so, the NVD hosts multiple pairs of L2 VNIC and switch, each corresponding to one of the compute instances.

The VLAN can include an instance of a VSRS 1110. The VSRS 1110 performs switching and routing functionalities and includes an VSRS VNIC 1112 and an instance of a VSRS switch 1114. The VSRS VNIC 1112 represents a port on the vswitch, where this port connects the vswitch to other networks via a virtual router. As shown, the VSRS 1110 can be instantiated on a server fleet 1116.

A control plane 1118 can track information identifying L2 VNICs 1104-A, 1104-B, 1104-N and their placements in the VLAN. The control plane 1110 can further provide this information to the interfaces 1104-A, 1104-B, 1104-N in the VLAN.

As shown in FIG. 11, the VLAN can be a cloud-based virtual L2 network that can be built on top of the physical network 1120. In some embodiments, this physical network 1120 can include the NVDs 1108-A, 1108-B, 1108-N.

Generally, a first L2 compute instance of the VLAN (e.g., compute instance 1 1102-A) can communicate with a second compute instance of the VLAN (e.g., compute instance 2 1102-B) using L2 protocols. For instance, a frame can be sent between these two L2 compute instances over the VLAN. Nonetheless, the frame can be encapsulated, tunneled, routed, and/or subject to other processing such that the frame can sent over the underlying physical network 1120.

For example, the compute instance 1 1102-A sends a frame destined to the compute instance 2 1102-B. Depending on the network connections between host machine 1 and NVD 1, NVD1 and the physical network 1120, the physical network 1120 NVD 2, and NVD 2 and host machine 2 (e.g., TCP/IP connections, Ethernet connections, tunneling connections, etc.), different types of processing can be applied to the frame. For instance, the frame is received by NVD 1 and encapsulated, and so on and so forth, until the frame reaches the compute instance 2. This processing such that the frame can be sent between the underlying physical resources is assumed and, for the purpose of brevity and clarity, its description is omitted from the description the VLAN and the related L2 operations.

Virtual L2 Network Communication

Multiple forms of communication can occur within or with a virtual L2 network. These can include intra-VLAN communications. In such an embodiments, a source compute instance can send a packet to a destination compute instance that is in the same VLAN as the source compute instance (CI). The communication can further include the sending of a packet to an endpoint outside of the VLAN of the source CI. This can include, for example, a communication between a source CI in a first VLAN to a destination CI in a second VLAN, a communication between a source CI in a first VLAN to a destination CI in a L3 subnet, and/or a communication from a source CI in a first VLAN to a destination CI outside of the VCN containing the VLAN of the source CI. This communication can further include, for example, receiving a communication at a destination CI from a source CI outside of the VLAN of the destination CI. This source CI can be in another VLAN, in a L3 subnet, or outside of the VCN containing the VLAN of the source CI.

Each CI within a VLAN can play an active role in the traffic flow. This includes learning interface identifier-to-MAC address, also referred to herein as interface-to-MAC address, mapping of instances within the VLAN to maintain L2 forwarding tables within the VLAN, and the sending and/or receiving of communication packets. The VSRS can play an active role in communication within the VLAN and in communication with source or destination CIs outside of the VLAN. The VSRS can maintain a presence in the L2 network and in the L3 network to enable the egress and ingress communication.

Intra-VLAN Communication

Figure 12:
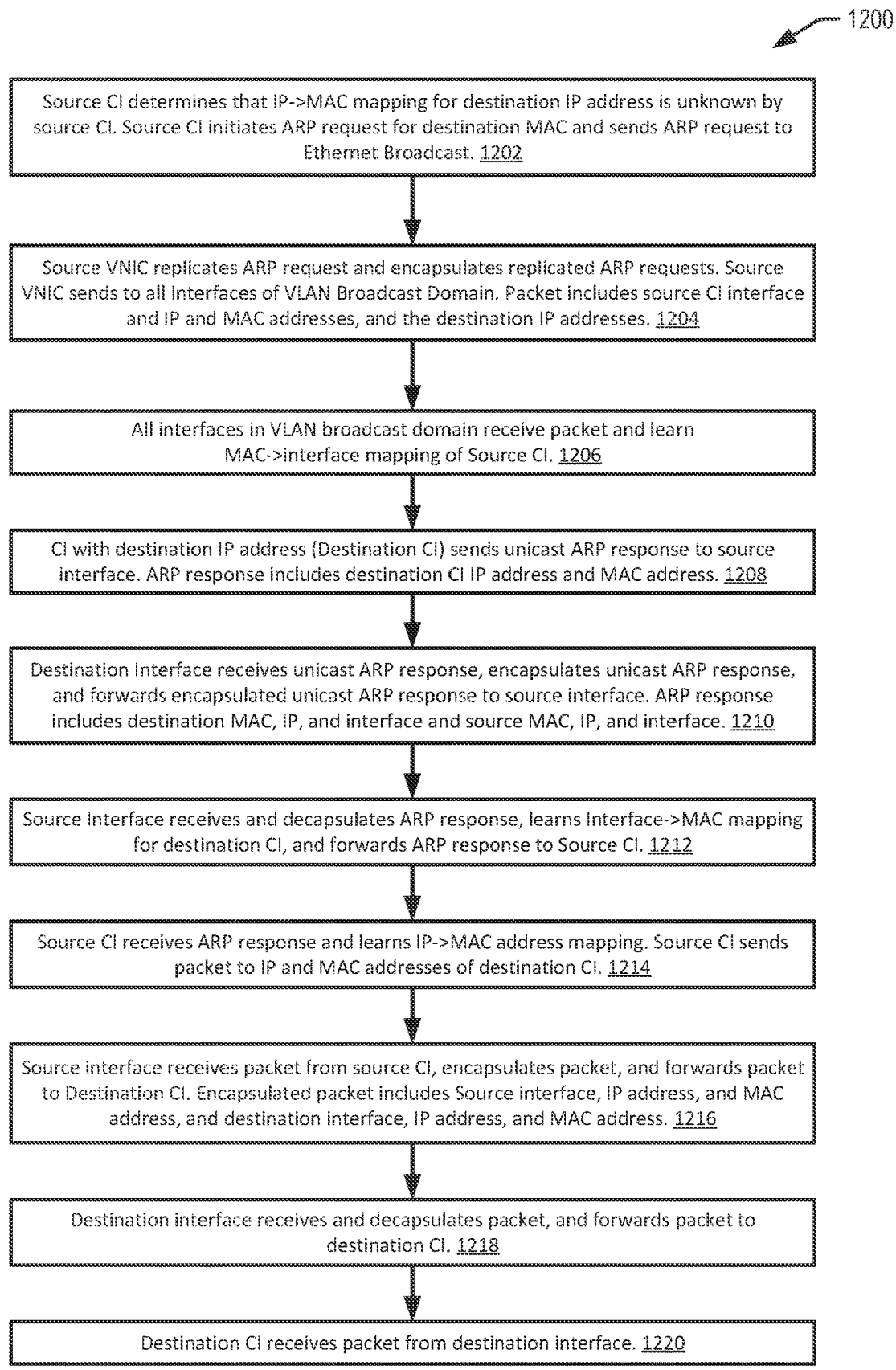
FIG. 12 is a flowchart illustrating one embodiment of a process for intra-VLAN communication.

With reference now to FIG. 12, a flowchart illustrating one embodiment of a process 1200 for intra-VLAN communication is shown. In some embodiments, the process 1200 can be performed by the compute instances within a common VLAN. The process can be specifically performed in the event that a source CI sends a packet to a destination CI within the VLAN, but does not know the IP-to-MAC address mapping of that destination CI. This can occur, for example, when a source CI sends a packet to destination CI having an IP address in the VLAN, but the source CI does not know the MAC address for that IP address. In this case, an ARP process can be performed to learn the destination MAC address and the IP-to-MAC address mapping.

In the event that the source CI knows the IP-to-MAC address mapping, the source CI can send the packet directly to the destination CI, and the ARP process need not be performed. In some embodiments, this packet can be intercepted by the source VNIC, which source VNIC in intra-VLAN communication is an L2 VNIC. If the source VNIC knows interface-to-MAC address mapping for destination MAC address, then the source VNIC can encapsulate the packet, for example in an L2 encapsulation, and can forward the encapsulated packet to the destination VNIC, which destination VNIC in intra-VLAN communication is an L2 VNIC, for the destination MAC address.

If the source VNIC does not know the interface-to-MAC address mapping for the MAC address, then the source VNIC can perform an aspect of an interface-to-MAC address learning process. This can include the source VNIC sending the packet to all interfaces within the VLAN. In some embodiments, this packet can be sent via broadcast to all of the interfaces within the VLAN. In some embodiments, this broadcast can be implemented at the physical network in the form of serial unicast. This packet can include the destination MAC and IP addresses, and the interface, MAC address, and IP address of the source VNIC. Each of the VNICs in the VLAN can receive this packet and can learn the interface-to-MAC address mapping of the source VNIC.

Each of the receiving VNICs can further decapsulate the packet and forward the decapsulated packet to their associated CI. Each CI can include a network interface which can evaluate the forwarded packet. If the network interface determines that the CI having received the forwarded packet does not match the destination MAC and/or IP address, then the packet is dropped. If the network interface determines that the CI having received the forwarded packet matches the destination MAC and/or IP address, then the packet is received by the CI. In some embodiments, the CI having a MAC and/or IP address matching the destination MAC and/or IP address of the packet can send a response to the source CI, whereby the source VNIC can learn the interface-to-MAC address mapping of the destination CI, and whereby the source CI can learn the IP-to-MAC address mapping of the destination CI.

When the source CI does not know the IP-to-MAC address mapping, or when the source CI's IP-to-MAC address mapping for the destination CI is stale, then the process 1200 can be performed.

Thus, when the IP-to-MAC address mapping is known, then the source CI can send the packet. When the IP-to-MAC address mapping is not known, then the process 1200 can be performed. When the interface-to-MAC address mapping is not known, the interface-to-MAC address learning process outlined above can be performed. When the interface-to-MAC address mapping is known, then the VNIC can send the packet to the destination CI.

The process 1200 begins at block 1202, wherein the source CI determines that IP-to-MAC address mapping of the destination CI is unknown to the source CI. In some embodiments, this can include the source CI determining a destination IP address for a packet, and determining that that destination IP address is not associated with a MAC address stored in a mapping table of the source CI. Alternatively, the source CI can determine that the IP-to-MAC address mapping for the destination CI is stale. A mapping can be stale, in some embodiments, if the mapping has not been updated and/or verified within some time limit. Upon determining that the IP-to-MAC address mapping of the destination CI is unknown and/or stale to the source CI, the source CI initiates an ARP request for the destination IP and sends the ARP request for Ethernet broadcast.

At block 1204, the source VNIC, also referred to herein as the source interface, receives the ARP request from the source CI. The source interface identifies all interfaces on the VLAN, and sends the ARP request to all interfaces on the VLAN broadcast domain. As previously mentioned, as the control plane knows all of the interfaces on the VLAN and provides that information to the interfaces with the VLAN, the source interface likewise knows all of the interfaces in the VLAN and is able to send the ARP request to each of the interfaces in the VLAN. To do this, the source interface replicates the ARP request and encapsulates one of the ARP requests for each of the interfaces on the VLAN. Each encapsulated ARP request includes the source CI interface identifier and source CI MAC and IP addresses, the target IP address, and the destination CI interface identifier. The source CI interface replicates an Ethernet broadcast by sending the replicated and encapsulated ARP requests as serial unicast, one sent to each interface in the VLAN.

At block 1206, all interfaces in the VLAN broadcast domain receive and decapsulate the packet. Each of the interfaces in the VLAN broadcast domain that receives the packet learns the interface-to-MAC address mapping of the source VNIC of the source CI (e.g., interface identifier of the source interface to MAC address of the source CI) as the packet identifies the source CI MAC and IP addresses and the source CI interface identifier. As part of learning the interface-to-MAC address mapping for the source CI, each of the interfaces can update their mapping tables (e.g., its L2 forwarding table), and can provide the updated mapping to its associated switch and/or CI. Each recipient interface, except the VSRS, can forward the decapsulated packet to their associated CI. The CI recipient of the forwarded decapsulated packet, and specifically the network interface of that CI, can determine if the target IP address of the packet matches the IP address of the CI. If the IP address of the CI associated with that interface does not match the destination CI IP address specified in the received packet, then, in some embodiments, the packet is dropped by that CI, and no further action is taken. In the case of the VSRS, the VSRS can determine if the target IP address of the packet matches the IP address of the VSRS. If the IP address of the VSRS does not match the target IP address specified in the received packet, then, in some embodiments, the packet is dropped by the VSRS and no further action is taken.

If it is determined that the destination CI IP address specified in the received packet matches the IP address of the CI associated with the recipient interface (destination CI), then, and as indicated in block 1208, the destination CI sends a response, which can be a unicast ARP response to the source interface. This response includes the destination CI MAC address and the destination CI IP address, and the source CI IP and MAC addresses. As will be discussed below, if the VSRS determines that the target IP address matches the VSRS IP address, then the VSRS can send an ARP response.

This response is received by the destination interface which encapsulates the unicast ARP response as indicated in block 1210. In some embodiments, this encapsulation can comprise Geneve encapsulation. The destination interface can forward the encapsulated packet via the destination switch to the source interface. The encapsulated packet includes the destination CI MAC and IP addresses and destination CI interface identifier, and the source CI MAC and IP addresses and the source CI interface identifier.

At block 1212, the source interface receives and decapsulates the ARP response. The source interface can further learn the interface-to-MAC address mapping for the destination CI based on information contained in the encapsulation and/or in the encapsulated packet. The source interface can, in some embodiments, forward the ARP response to the source CI.

At block 1214, the source CI receives the ARP response. In some embodiments, the source CI can update a mapping table based on information contained in the ARP response, and specifically update a mapping table to reflect the IP-to-MAC address mapping based on the MAC and IP addresses of the destination CI. Subsequently, the source CI can then send a packet, which can be any packet including an IP packet, and specifically an IPv4 or IPv6 packet to the destination CI. This packet can include the MAC address and the IP address of the source CI as the source MAC address and source IP address of the packet, and the MAC address and IP address of the destination CI as the destination MAC address and destination IP address.

At block 1216, the source interface can receive the packet from the source CI. The source interface can encapsulate the packet, and in some embodiments, can encapsulate the packet with a Geneve encapsulation. The source interface can forward the encapsulated packet to the destination CI, and specifically to the destination interface. The encapsulated packet can include the IP and MAC addresses and interface identifier of the source CI as the source MAC address, source IP address, and source interface identifier, and the MAC address, IP address, and interface identifier of the destination CI as the destination MAC address, IP address, and destination interface identifier.

At block 1218, the destination interface receives the packet from the source interface. The destination interface can decapsulate the packet, and can then forward the packet to the destination CI. At block 1220, the destination CI receives the packet from the destination interface.

Figure 13:
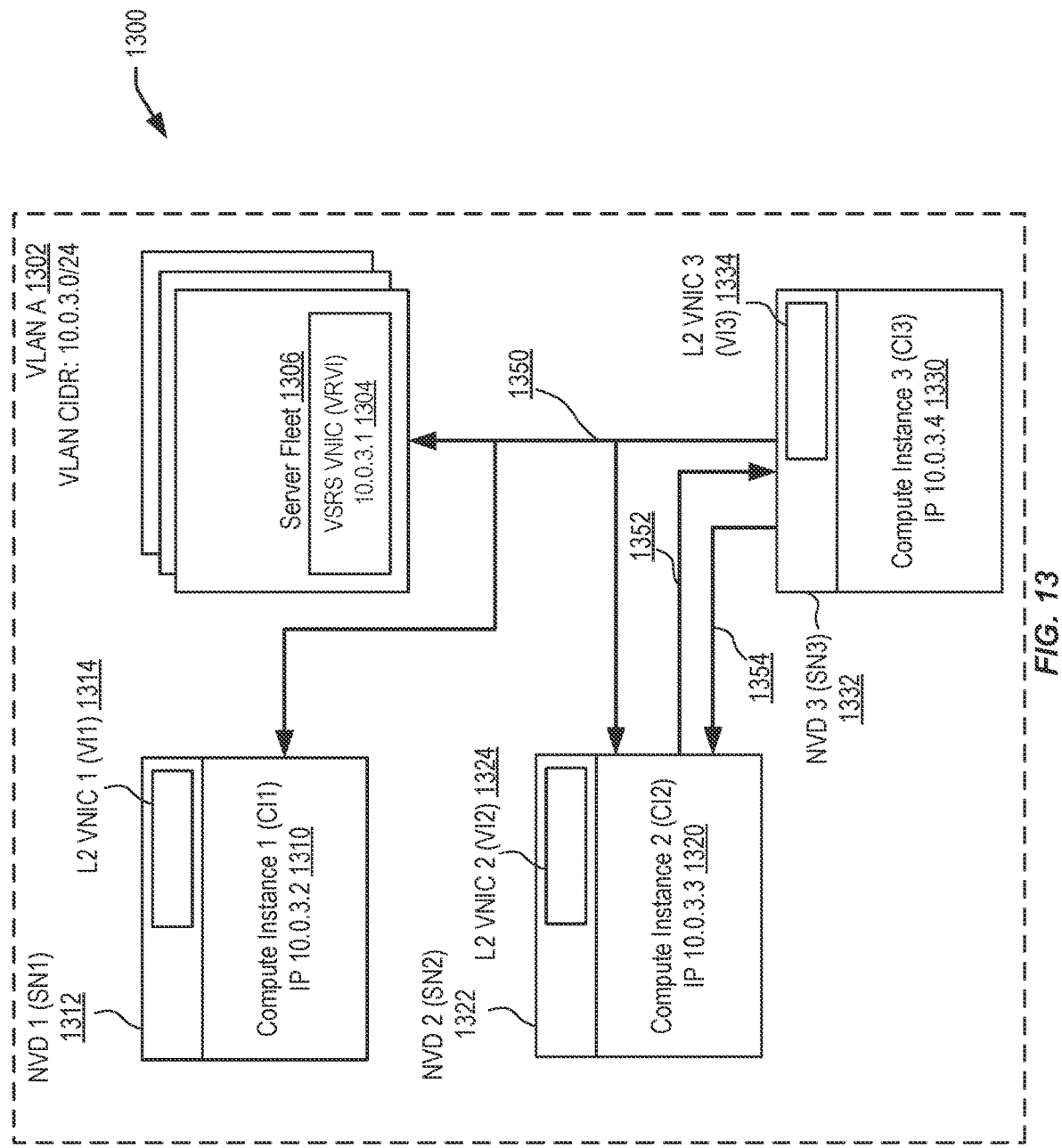
FIG. 13 is a schematic illustration of the process for intra-VLAN communication.

With reference now to FIG. 13, a schematic illustration 1300 of the process 1200 for intra-VLAN communication is shown. As seen, VLAN A 1302 has a VLAN CIDR of 10.0.3.0/24. VLAN A 1302 includes a VSRS VNIC (VRVI) 1304 which can be instantiated on one or several pieces of hardware, and specifically can be instantiated on a server fleet 1306. VRVI 1304 can have an IP address of 10.0.3.1. The VLAN can include compute instance 1 (CI1) 1310 having an IP address of 10.0.3.2 and communicatively coupled with NVD 1 (SN1) 1312 which can instantiate L2 VNIC 1 (VI1) 1314 and L2 switch 1. The VLAN can include compute instance 2 (CI2) 1320 having an IP address of 10.0.3.3 and communicatively coupled with NVD 2 (SN2) 1322 which can instantiate L2 VNIC 2 (VI2) 1324 and L2 switch 2. The VLAN can include compute instance 3 (CI3) 1330 having an IP address of 10.0.3.4 and communicatively coupled with NVD 3 (SN3) 1332 which can instantiate L2 VNIC 3 (VI3) 1334 and L2 switch 3.

In the example of FIG. 13, and applying the method 1200 of FIG. 12, CI3 1330 is the source CI and VI3 1334 is the source interface. Further, CI2 1320 is the destination CI and VI2 1324 is the destination interface. CI3 determines that it does not have an IP-to-MAC mapping for a destination IP address (10.0.3.3), resulting in CI3 1330 sending an ARP request. The ARP request can be for the known address, and specifically can be for the known IP address of CI2 1320. Thus, in some embodiments, the ARP request can be for 10.0.3.3.

This ARP request is received by SN3 1332 and VI3 1334. VI3 1334 replicates the ARP request to create an ARP request for each CI in the VLAN 1302. VI3 1334 encapsulates each ARP request and sends an ARP request to each of the interfaces in the VLAN. These encapsulated ARP requests can include information identifying the MAC address of the source CI, CI3, the interface identifier of the source interface, VI3, and the destination MAC address. These requests can be sent to each of the interfaces in the VLAN as shown by arrows 1350. In the VLAN, these requests can be broadcast ARP requests.

The interfaces in the VLAN receive the encapsulated ARP request, and decapsulate the ARP request. Based on information contained in and/or associated with the ARP request, the interfaces in the VLAN update their mapping. Specifically, for example, each of VI1 1314, VI2 1324, and VRVI 1304 receive an ARP request from CI 3 1330, decapsulate the ARP request, and learn the mapping of the interface-to-MAC address of the source CI, both of which interface identifier and MAC address are included in the encapsulated packet. VRVI 1304 can further update IP-to-MAC address mapping for the source CI based on information contained in the encapsulated packet.

Interfaces in the VLAN having a CI with the requested IP address can send an ARP response to CI 3 1330 as indicated with arrow 1352. Specifically, as shown in FIG. 13, VI2 1324 is the interface of CI2 1320, and thus can send the ARP response. The ARP response from CI2 can be received by VI2, can be encapsulated, and can be sent as an ARP unicast to the requesting interface, and specifically to VI3. As indicated earlier in this application, the sending of this ARP response can include the providing of the encapsulated ARP response to the associated switch, which can send the encapsulated ARP response to VI3.

The ARP response can be received by VI3 and can be decapsulated. VI3 can learn mapping of the interface-to-MAC of CI2 based on the received ARP response, and can provide the updated learned mapping to VI3's associated switch. The decapsulated packet can be provided to CI3, which can learn IP-to-MAC address mapping of CI2 1320 based on the decapsulated packet. CI3 can send a packet, which packet can be an IP packet such as an IPv4 or IPv6 packet to CI2. This packet can have CI3's MAC and IP addresses as source addresses, and can have CI2's IP and MAC addresses as destination addresses.

The packet sent by CI3 can be received by VI3, which can encapsulate the packet and forward the packet to interface VI2. VI2 can receive the packet, can decapsulate the packet, and can forward the packet to CI2.

Inter-VLAN Communication

Figure 14:
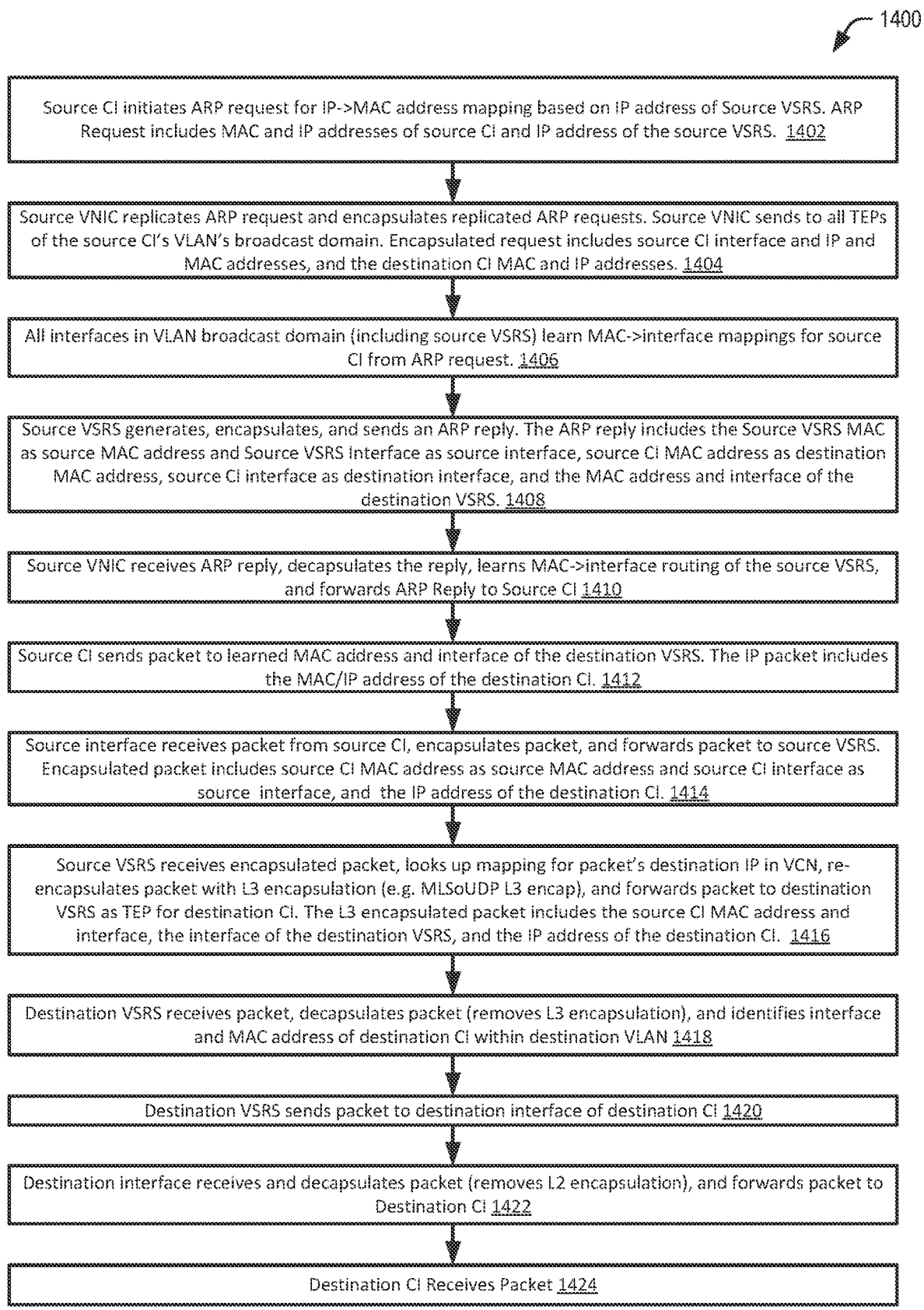
FIG. 14 is a flowchart illustrating one embodiment of a process for inter-VLAN communication in a virtual L2 network.

With reference now to FIG. 14, a flowchart illustrating one embodiment of a process 1400 for inter-VLAN communication in a virtual L2 network is shown. The process 1400 can be performed by all or portions of two connected VLANs, such as the multiple connected L2 VLANs 800 shown in FIG. 8. In some embodiments, the process 1400 can be performed when a compute instance (source CI) in a first VLAN (source VLAN) sends a packet to a destination compute instance (destination CI) in a second VLAN (destination VLAN). In some embodiments, the source CI can, based on the IP address of the destination CI, determine that the destination CI is outside of the source VLAN. For example, the source CI can determine that the destination IP is outside of the source VLAN CIDR. In such an event, the source CI can determine to send the IP packet to the destination CI via the VSRS of the source VLAN. If the source CI already knows the mapping of the VSRS in the first VLAN (source VSRS), then the source CI can direct the packet directly to the source VSRS. If the source CI does not know the mapping of the source VSRS, then the source CI and its associated VNIC (source interface or source VNIC) first learns the mapping of the source VSRS. In embodiments of inter-VLAN communication, both the source and destination VNICs are L2 VNICs. The first steps of process 1400, steps 1402 through 1410 relate to the learning of the source VSRS mapping by the source VNIC and source CI.

The process 1400 begins at block 1402, wherein the source CI, which has the destination IP address, initiates an ARP request. The ARP request is used to determine the IP→MAC address mapping of the source VSRS. The ARP request is sent to Ethernet broadcast by the source CI. The ARP request includes the IP address of the source CI as the source IP and MAC addresses.

At block 1404, the source VNIC receives the ARP request and replicates the ARP request. Specifically, the source VNIC receives the ARP request from the source CI, identifies all interfaces on the VLAN, and sends the ARP request to all interfaces on the VLAN broadcast domain. As previously mentioned, as the control plane knows all of the interfaces on the VLAN and provides that information to the interfaces with the VLAN, the source interface likewise knows all of the interfaces in the VLAN and is able to send the ARP request to each of the interfaces in the VLAN. To do this, the source interface replicates the ARP request and encapsulates one of the ARP requests for each of the interfaces on the VLAN. Each encapsulated ARP request includes the source CI interface identifier and source CI IP and MAC addresses as the source addresses, and the destination CI interface identifier and IP address as destination addresses. The source CI interface implements the Ethernet broadcast by sending the replicated and encapsulated ARP requests via serial unicast to each interface in the VLAN. The source VNIC can, in some embodiments, encapsulate the ARP request with Geneve encapsulation.

At block 1406, all interfaces in the VLAN broadcast domain receive and decapsulate the packet. Each of the interfaces in the VLAN broadcast domain that receives the packet learns the interface→MAC address mapping of the source VNIC of the source CI as the packet identifies the source CI MAC and IP addresses and source interface identifier. As part of learning the interface→MAC address mapping for the source CI, each of the interfaces can update their mapping tables, and can provide updated mapping tables to their associated switch and/or CI. Each recipient interface, except the VSRS, forward the decapsulated packet to their associated CI. The CI recipient of the forwarded decapsulated packet, and specifically the network interface of that CI, can determine if the target IP address of the packet matches the IP address of the CI. If the IP address of the CI associated with that interface does not match the destination CI IP address specified in the received packet, then no further action is taken.

The source VSRS determines that the target IP address matches the IP address of the source VSRS, and as indicated in block 1408, the source VSRS encapsulates and sends a response, which can be a unicast ARP response to the source interface. This response includes the source CI MAC address, IP address, and source CI interface identifier as destination addresses. The response further includes the source VSRS MAC address, IP address, and VSRS interface identifier as the source addresses. In some embodiments, the encapsulation of the ARP response can comprise Geneve encapsulation.

At block 1410, the source interface receives and decapsulates the ARP response. The source interface can further learn the interface-to-MAC address mapping for the source VSRS based on information contained in the encapsulation and/or in the encapsulated packet. The source interface can, in some embodiments, forward the ARP response to the source CI.

At block 1412, the source CI receives the ARP response. In some embodiments, the source CI can update a mapping table based on information contained in the ARP response, and specifically based on the MAC address and the IP address of the source VSRS. In some embodiments, for example, the source CI can update its mapping table to reflect the IP-to-MAC address mapping of the source VSRS. The source CI can then send a packet, which can be any packet including an IP packet, and specifically an IPv4 or IPv6 packet to the source VSRS. In some embodiments, this can include sending the IP packet with an IP address of the destination CI as the destination address. In some embodiments, the IP address of the destination CI can be contained in a header of the packet such as in, for example, an L3 header of the packet. The header can further include the MAC address of the source VSRS in another header of the packet, such as, for example, in an L2 header of the packet. The packet can further include the MAC address and IP address of the source CI as the source MAC address and source IP address.

At block 1414, the source interface can receive the packet from the source CI. The source interface can encapsulate the packet. The source interface can forward the encapsulated packet to the source VSRS, and specifically to source VSRS VNIC. The encapsulated packet can include, in addition to the addresses of the packet, the MAC address and interface identifier of the source CI as the source MAC address and source interface identifier, and the MAC address and interface identifier of the source VSRS as the destination MAC address and destination interface identifier.

At block 1416, the source VSRS receives the encapsulated packets. The source VSRS decapsulates the packet and strip the packet of any address information relating to the source VSRS including, for example, the source VSRS IP address, MAC address, and/or source VSRS interface identifier. The source VSRS identifies the destination CI of the packet. In some embodiments, the source VSRS identifies the destination CI of the packet based on the IP address of the destination CI included in the packet. The source VSRS looks up mapping for the packet's destination IP address. If the IP address is within the IP address space of the VCN, then the source VSRS looks up the mapping for the packet's destination IP address in the space of IP addresses for the VCN. The source VSRS then re-encapsulates the packet with an L3 encapsulation. In some embodiments, this L3 encapsulation can include, for example, a MPLSoUDP L3 encapsulation. The source VSRS then forwards the packet to the VSRS of the destination VLAN (destination VSRS). In some embodiments, the source VSRS can forward the packet to the destination VSRS such that the destination VSRS is the tunnel end point (TEP) of the packet. The L3 encapsulated packet includes the source CI IP address and MAC address, and the IP address of the destination CI.

At block 1418, the destination VSRS receives the packet and decapsulates the packet. In some embodiments, this decapsulation can include removing the L3 encapsulation. If the destination VSRS knows the IP-to-MAC and the MAC-to-interface mapping for the destination CI, then the destination VSRS identifies the interface and MAC address of the destination CI within the destination VLAN. Alternatively, if the destination VSRS does not know the destination CI mapping, then the steps 1612 through 1622 of process 1600 can be performed.

At block 1420, the destination VSRS forwards the packet to the destination interface of the destination CI. In some embodiments, this can include encapsulating the packet with an L2 encapsulation. In some embodiments, the packet can include the IP address and the MAC address of the source CI and/or the MAC address and interface identifier of the destination VSRS. In some embodiments, the packet can further include the MAC address and the interface identifier of the destination CI.

At block 1422, the destination interface receives and decapsulates the packet. Specifically, the destination VNIC removes the L2 encapsulation. In some embodiments, the destination VNIC forwards the packet to the destination CI. At block 1424, the destination CI receives the packet.

Figure 15:
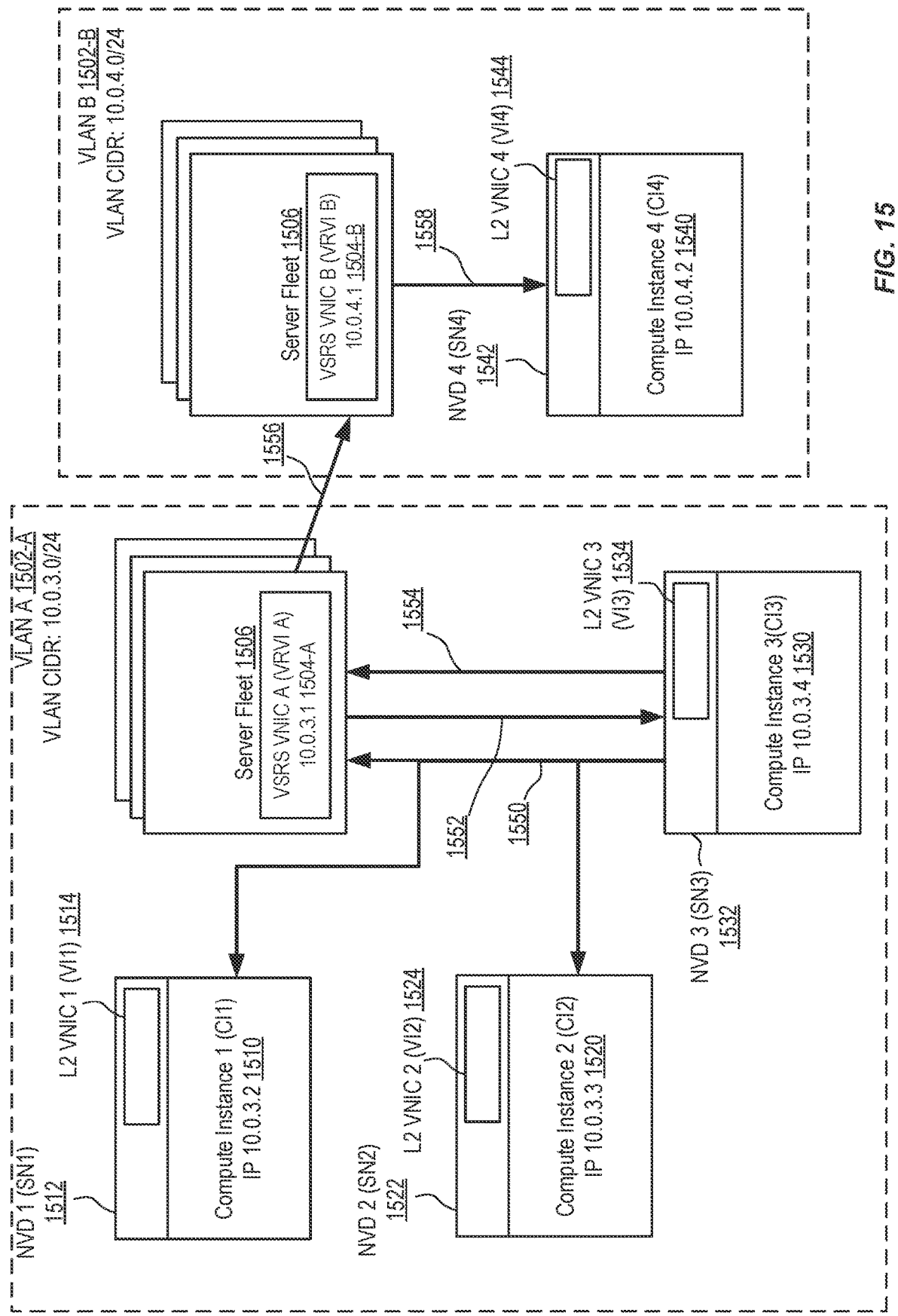
FIG. 15 is a schematic illustration of the process for inter-VLAN communication.

With reference now to FIG. 15, a schematic illustration 1500 of the process 1400 for inter-VLAN communication is shown. As seen, VLAN A 1502-A has a VLAN CIDR of 10.0.3.0/24. VLAN A 1502-A includes a VSRS VNIC A (VRVI A) 1504-A which can be instantiated on one or several pieces of hardware, and specifically can be instantiated on a server fleet 1506. VRVI A 1504-A can have an IP address of 10.0.3.1. The VLAN can include compute instance 1 (CI1) 1510 having an IP address of 10.0.3.2 and communicatively coupled with NVD 1 (SN1) 1512 which can instantiate L2 VNIC 1 (VI1) 1514 and L2 switch 1. The VLAN can include compute instance 2 (CI2) 1520 having an IP address of 10.0.3.3 and communicatively coupled with NVD 2 (SN2) 1522 which can instantiate L2 VNIC 2 (VI2) 1524 and L2 switch 2. The VLAN can include compute instance 3 (CI3) 1530 having an IP address of 10.0.3.4 and communicatively coupled with NVD 3 (SN3) 1532 which can instantiate L2 VNIC 3 (VI3) 1514 and L2 switch 3.

VLAN B 1502-B has a VLAN CIDR of 10.0.34.0/24. VLAN B 1502-B includes a VSRS VNIC B (VRVI B) 1504-B which can be instantiated on one or several pieces of hardware, and specifically can be instantiated on server fleet 1506. VRVI B 1504-B can have an IP address of 10.0.4.1. The VLAN can include compute instance 4 (CI4) 1540 having an IP address of 10.0.4.2 and communicatively coupled with NVD 4 (SN4) 1542 which can instantiate L2 VNIC 4 (VI3) 1544 and L2 switch 4.

In the example of FIG. 15, and applying the method 1400 of FIG. 14, CI3 1530 is the source CI and VI3 1534 is the source interface. Further, CI4 1540 is the destination CI and VI4 1544 is the destination interface. CI3 determines that it does not have an IP-to-MAC mapping for VRVI A 1504-A, resulting in CI3 1530 sending an ARP request. The ARP request can be for the address, and specifically can be for the known IP address of VRVI A 1504-A. Thus, in some embodiments, the ARP request can be for 10.0.3.1.

This ARP request is received by SN3 1532 and VI3 1534. VI3 1534 replicates the ARP request to create an ARP request for each CI in the VLAN 1502-A. VI3 1534 encapsulates each ARP request with an L2 encapsulation and sends an ARP request to each of the interfaces in the VLAN. These encapsulated ARP requests can include information identifying the MAC and IP addresses of the source CI, CI3, the interface identifier of the source interface, VI3, and the target IP address. These requests can be sent to each of the interfaces in the VLAN as shown by arrows 1550, and specifically can be sent as a serial unicast such that each interface in the VLAN receives an ARP request.

The interfaces in the VLAN receive the encapsulated ARP request, and decapsulate the ARP request. Based on information contained in and/or associated with the ARP request, the interfaces in the VLAN update their mapping. Specifically, for example, each of VI1 1514, VI2 1524, and VRVI A 1504-A receive a unicast ARP request from CI 3 1530, decapsulate the unicast ARP request, and learn the mapping of the interface-to-MAC address of the source CI, both of which interface identifier and MAC address are included in the encapsulated packet.

VRVI A 1504-A determines that its IP address matches the requested IP address, and sends an ARP response to CI 3 1530 as indicated with arrow 1552. The ARP response from VRVI A 1504-A can be encapsulated by VRVI A 1504-A with, for example, an L2 encapsulation, and can be sent as an ARP unicast to the requesting interface, and specifically to VI3. As indicated earlier in this application, the sending of this ARP response can include the providing of the encapsulated ARP response to the associated switch of VRVI A 1504-A, which can send the encapsulated ARP response to VI3.

The ARP response can be received by VI3 and can be decapsulated. VI3 can learn mapping of the interface-to- MAC of VRVI A 1504-A based on the received ARP response, and can provide the updated learned mapping to VI3's associated switch. The decapsulated packet can be provided to CI3. CI3 can learn the IP-to-MAC address mapping of VRVI A 1504-A, and can send a packet, which packet can be an IP packet such as an IPv4 or Ipv6 packet. This packet can have CI3's MAC address and IP address as source addresses. This packet can further include the IP address of the destination CI, CI4 1540 as the destination address, and can have VRVI A's 1504-A MAC address and IP address.

The packet sent by CI3 can be received by VI3, which can encapsulate the packet and forward the packet to VRVI A 1504-A. VRVI A 1504-A can receive the packet, can decapsulate the packet, and can look up mapping for the packet's destination IP address (the IP address of CI4). In some embodiments, the decapsulating of the packet can include the stripping of the L2 header from the packet, or in other words, stripping information relevant to the VLAN A 1502-A from the header. This stripped information can include, for example, the MAC address of CI3, the interface identifier of the interface of VI3, and/or the MAC address and interface identifier of VRVI A 1504-A. In some embodiments, a VSRS, and thus VRVI A 1504-A can reside in both an L2 network and in an L3 network. In the L2 network, thus within the VLAN, the VSRS can utilize L2 communication protocols, whereas the VSRS can utilize L3 communication protocols when communicating with the L3 network. In contrast to the learning performed in the VLAN, the VSRS can learn mapping to endpoints in the L3 network from the control plane. In some embodiments, for example, the control plane can provide information mapping IP addresses, and/or MAC addresses of instances in the L3 network.

VRVI A 1504-A can look up the mapping for the IP destination address contained in the packet, or in other words, can look up the mapping for the IP address of the destination CI. In some embodiments, looking up this mapping can include identifying VRVI B 1504-B as the VSRS of VLAN B 1502-B. VRVI A 1504-A can encapsulate the packet and forward the encapsulated packet to VRVI B 1504-B, which can be the tunnel end point (TEP) for the destination VLAN and/or destination interface. The forwarding of this encapsulated packet is indicated with block 1556. This forwarded packet can include the IP address of the source CI, CI3, as the source address, and the IP address of the destination CI, CI4, as the destination address.

VRVI B 1504-B can receive and decapsulate the packet. VRVI B 1504-B can further identify the interface within VLAN B 1502-B corresponding to the destination IP address. VRVI B 1504-B can encapsulate the packet and add L2 headers for tunneling within VLAN B 1504-B. VRVI B 1504-B can then forward the packet to destination CI. The destination interface VI4 1544 can receive and decapsulate the packet, and can then forward the Ethernet frame or packet to the destination CI 1540.

Ingress Packet Flow

Figure 16:
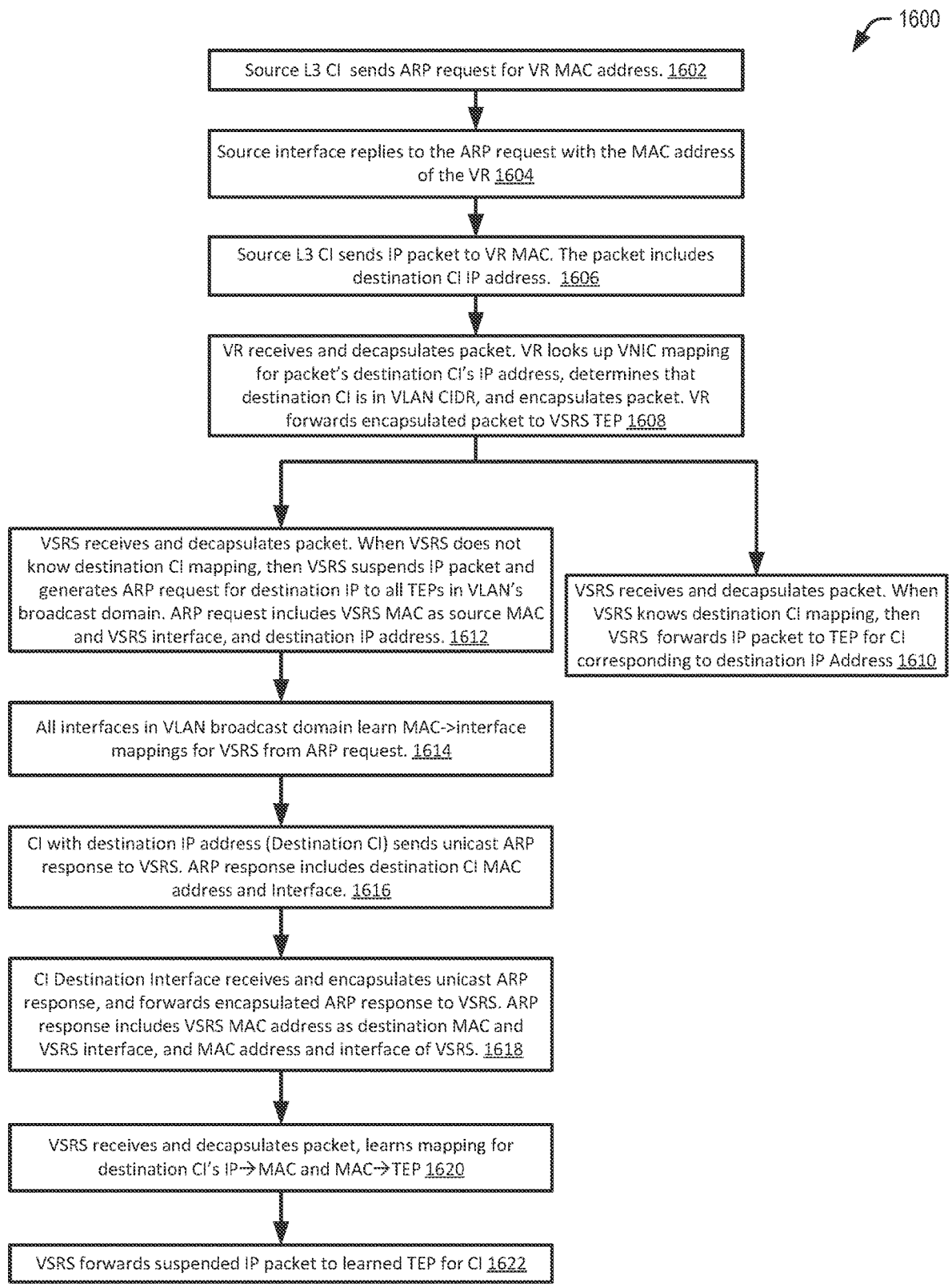
FIG. 16 is a flowchart illustrating one embodiment of a process for ingress packet flow.

With reference now to FIG. 16, a flowchart illustrating one embodiment of a process 1600 for ingress packet flow is shown. Specifically, FIG. 16 shows one embodiment of a process 1600 for ingress packet from a subnet. The process can be performed by all or portions of the system 600, and specifically can be performed by entities of a VLAN and some external (to the VLAN) source CI, which source CI can reside on an L3 subnet.

The process 1600 begins at block 1602, wherein the source L3 CI determines to send a packet to a destination CI, and specifically to a destination IP address within a VLAN. The source L3 CI does not know the mapping, and thus sends an ARP request for a MAC address of the virtual router of the subnet containing the source L3 CI. In some embodiments, the sending of this ARP request can include the sending of the ARP request to Ethernet broadcast. At block 1604, the source interface of source L3 CI replies to the ARP request with the MAC address of the VR. In some embodiments, the source interface can determine the MAC address of the VR based on mapping information accessed by the source interface.

Upon receipt of the ARP reply from the source interface, the source L3 CI sends an IP packet to the VR as indicated in block 1606. In some embodiments, this can include the source L3 CI sending the packet, and the source L3 interface receiving, encapsulating, and forwarding this packet. In some embodiments, the source L3 interface can encapsulate the packet with an L3 encapsulation, the L3 encapsulation includes the original packet starting from the L3 header. The source L3 interface can forward the packet to the VR. This IP packet can be sent to the VR MAC address and VR interface, and can include the source L3 CI MAC address as MAC address and source L3 CI interface identifier as source interface identifier.

The VR receives and decapsulates the packet. The VR then can look up the VNIC mapping for the packets destination's IP address. The VR can determine that the packet is in a VLAN CIDR, and can then encapsulate the packet and forward the encapsulated packet to the VSRS of the VLAN containing the destination CI. In some embodiments, the VR can encapsulate the packet with an L3 encapsulation. The encapsulated packet can include the destination IP address, the MAC address and interface identifier of the VSRS, and the source IP address.

The VSRS receives and decapsulates the packet as indicated in block 1610. When the VSRS knows the mapping of the destination CI, and specifically the mapping of the destination IP address in the received packet, then the VSRS forwards the IP packet to the TEP for the CI corresponding to the destination IP address. This can include generating and encapsulating an L2 packet having a destination MAC corresponding to the MAC address of the destination CI, and a destination interface identifier corresponding to the destination interface. In embodiment of ingress packet flow, the destination interface is an L2 VNIC.

If the VSRS does not know the destination CI mapping, the process 1600 continues at block 1612, wherein the VSRS receives and decapsulates the IP packet.

When the VSRS does not know the destination MAC address-to-VNIC mapping, then the VSRS can perform an interface-to-MAC address learning process. This can include the VSRS sending the packet to all interfaces within the VLAN. In some embodiments, this packet can be sent via broadcast to all of the interfaces within the VLAN. This packet can include the destination MAC and IP addresses, and the interface identifier and MAC address of the VSRS and the IP address of the source CI. Each of the VNICs in the VLAN can receive this packet and can learn the interface-to-MAC address mapping of the VSRS.

Each of the receiving VNICs can further decapsulate the packet and forward the decapsulated packet to their associated CI. Each CI can include a network interface which can evaluate the forwarded packet. If the network interface determines that the CI having received the forwarded packet does not match the destination MAC and/or IP address, then the packet is dropped. If the network interface determines that the CI having received the forwarded packet matches the destination MAC and/or IP address, then the packet is received by the CI. In some embodiments, the CI having a MAC and/or IP address matching the destination MAC and/or IP address of the packet can send a response to the VSRS, whereby the VSRS can learn the interface-to-MAC address mapping and the IP-to-MAC address mapping of the destination CI.

Alternatively, when the VSRS does not know the destination CI mapping, and specifically does not know the mapping of the destination IP address to a MAC address, then the VSRS suspends the IP packet. The VSRS then generates am ARP request for the destination IP address to all interfaces in the VSRS' VLAN's broadcast domain. This ARP request includes the VSRS MAC as the source MAC, the interface identifier of the VSRS interface as the source interface, and the destination IP address as the target IP address. In some embodiments, this ARP request can be broadcast to all interfaces in the VLAN.

At block 1614, all interfaces in the VLAN broadcast domain receive and decapsulate the packet. Each of the interfaces in the VLAN broadcast domain that receives the packet learns the interface→MAC address mapping of the VSRS as the packet identifies the VSRS MAC address and interface identifier. As part of learning the interface→MAC address mapping for the VSRS, each of the interfaces can update their mapping tables, and can provide updated mapping tables to their associated switch and/or CI.

Each recipient interface can forward the decapsulated packet to their associated CI. The CI recipient of the forwarded decapsulated packet, and specifically the network interface of that CI, can determine if the destination IP address of the packet matches the IP address of the CI. If the IP address of the CI associated with that interface does not match the destination CI IP address specified in the received packet, then no further action is taken.

If it is determined that the destination CI IP address specified in the received packet matches the IP address of the CI associated with the recipient interface (destination CI), then, and as indicated in block 1616, the destination CI sends a response, which can be a unicast ARP response to the source interface. This response includes the destination CI MAC and IP addresses, and the VSRS MAC and IP addresses. This response is received by the destination interface which encapsulates the unicast ARP response as indicated in block 1618. The destination interface can forward the encapsulated packet via the destination switch to the VSRS. The encapsulated packet includes the destination CI MAC and IP addresses and destination CI interface identifier, and the VSRS MAC and IP addresses and the VSRS interface identifier.

At block 1620, the VSRS, and specifically the VSRS interface, receives and decapsulates the ARP response. The VSRS, and specifically the VSRS interface, can further learn the interface-to-MAC address mapping for the destination CI based on information contained in the encapsulation and/or in the encapsulated packet.

At block 1622, the VSRS can then encapsulate and add L2 headers to the previously suspended IP packet, and can then forward the previously suspended IP packet to the destination CI, and specifically to the destination interface. The destination interface can decapsulate the packet and provide the decapsulated packet to the destination CI. This packet forwarded by the VSRS can include the MAC address and interface identifier of the VSRS as the source MAC address and source interface identifier and the MAC address and interface identifier of the destination CI as the destination MAC address and destination interface identifier. This packet can further include the IP address of the destination CI and the IP address of the source CI.

The destination interface receives the packet from the VSRS, and then decapsulates the packet. This decapsulation can include removing the headers added by the VSRS, which headers can be VCN headers. The destination interface can then forward the packet to the destination CI, and the destination CI can receive the packet from the destination interface.

Figure 17:
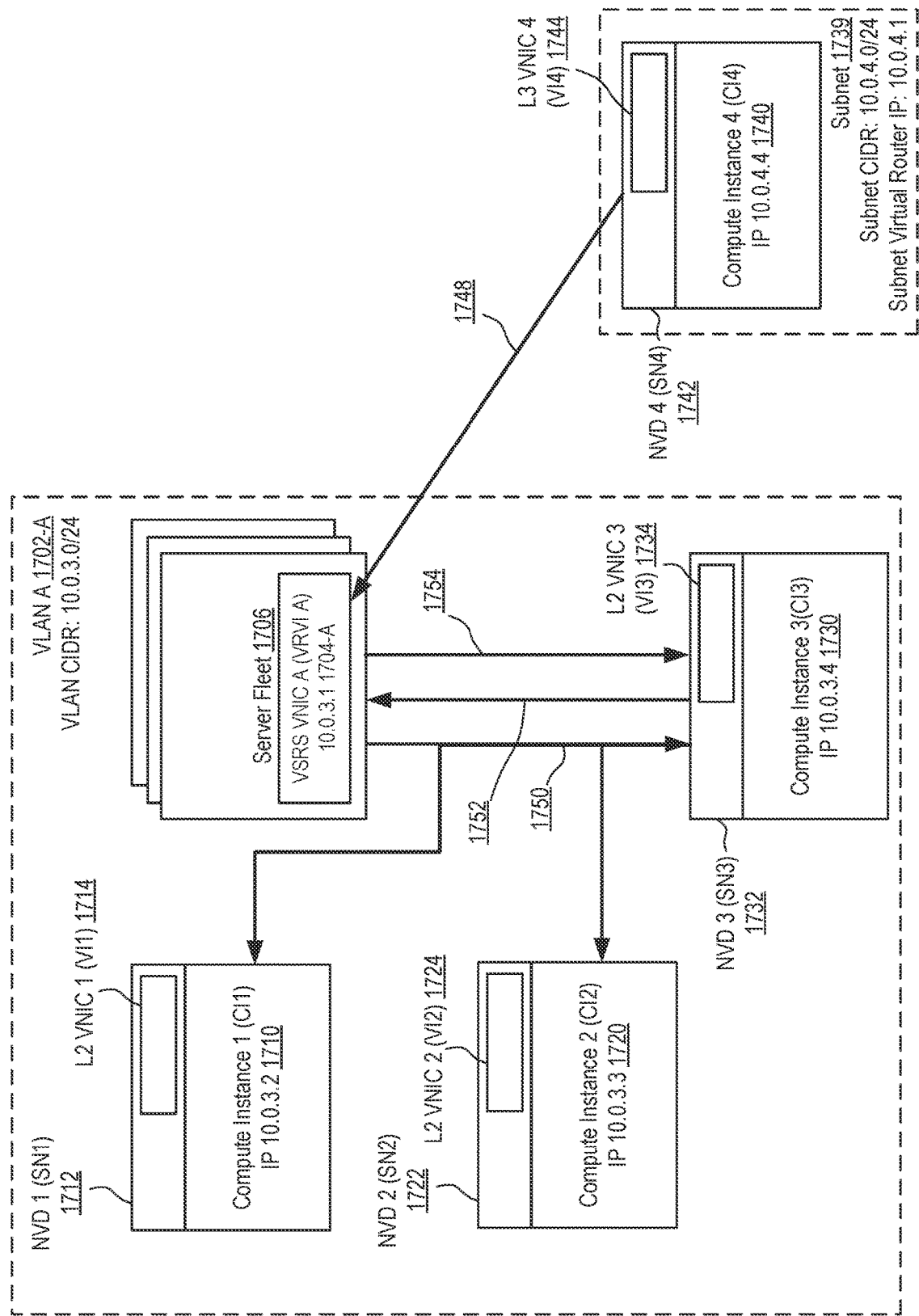
FIG. 17 is a schematic illustration of the process for ingress communication.

With reference now to FIG. 17, a schematic illustration 1700 of the process 1600 for ingress communication is shown. As seen, VLAN A 1502-A has a VLAN CIDR of 10.0.3.0/24. VLAN A 1502-A includes a VSRS VNIC A (VRVI A) 1504-A which can be instantiated on one or several pieces of hardware, and specifically can be instantiated on a server fleet 1506. VRVI A 1504-A can have an IP address of 10.0.3.1. The VLAN can include compute instance 1 (CI1) 1510 having an IP address of 10.0.3.2 and communicatively coupled with NVD 1 (SN1) 1512 which can instantiate L2 VNIC 1 (VI1) 1514 and L2 switch 1. The VLAN can include compute instance 2 (CI2) 1520 having an IP address of 10.0.3.3 and communicatively coupled with NVD 2 (SN2) 1522 which can instantiate L2 VNIC 2 (VI2) 1524 and L2 switch 2. The VLAN can include compute instance 3 (CI3) 1530 having an IP address of 10.0.3.4 and communicatively coupled with NVD 3 (SN3) 1532 which can instantiate L2 VNIC 3 (VI3) 1514 and L2 switch 3.

A compute instance, which can be L3 compute instance 4 (CI4) 1744 can reside on a subnet 1739 external to VLAN A 1702-A. CI4 can have an IP address of 10.0.4.4, and can be communicatively coupled with NVD 4 (SN4) 1742 which can instantiate L3 VNIC 4 (VI4) 1744.

In the example of FIG. 17, and applying the method 1600 of FIG. 16, CI4 1740 is the source CI and VI4 1744 is the source interface. Further, CI3 1730 is the destination CI and VI3 1734 is the destination interface. CI4 determines that it does not know mapping to send a packet to CI 3. Thus, CI4 sends an ARP request for the IP address of the subnet virtual router. In response to this request, VI4, which can, in some embodiments, reside on the NVD containing an instance of the subnet virtual router, replies directly to CI4 with the VR IP address. CI4 learns the VR IP address, and send the packet to the VR. The VR receives the packet, and then, based on mapping information, encapsulates the packet and forwards the packet to the VSRS as indicated in arrow 1748.

The VSRS receives the packet, and if the VSRS does not know the mapping, and specifically does not know the IP-to-MAC address mapping, to the destination CI, the VSRS suspends the packet, and sends an ARP request to all interfaces in VLAN A 1704-A. This ARP request includes the VSRS MAC address and interface identifier, and each recipient interface in VLAN A 1704-A learns the mapping of VSRS based on the ARP request. Each interface likewise decapsulates the packet and send the packet to its CI. Upon receipt of the decapsulated packet, CI3 determines that it is the CI identified in the packet, and CI3 generates an ARP reply answering with its MAC address. VI3 receives and encapsulates the ARP reply, and forwards the encapsulated ARP reply to the VSRS. The encapsulated ARP reply includes the MAC address and interface identifier of the VSRS as well as the MAC address and interface identifier of the interface of CI3.

VSRS receives the ARP reply and learns the mapping of IP address-to-MAC address and MAC address-to-Interface for CI3. VSRS then forwards the previously suspended packet to CI3, which packet is received by VI3, decapsulated, and forwarded to CI3.

Egress Packet Flow

Figure 18:
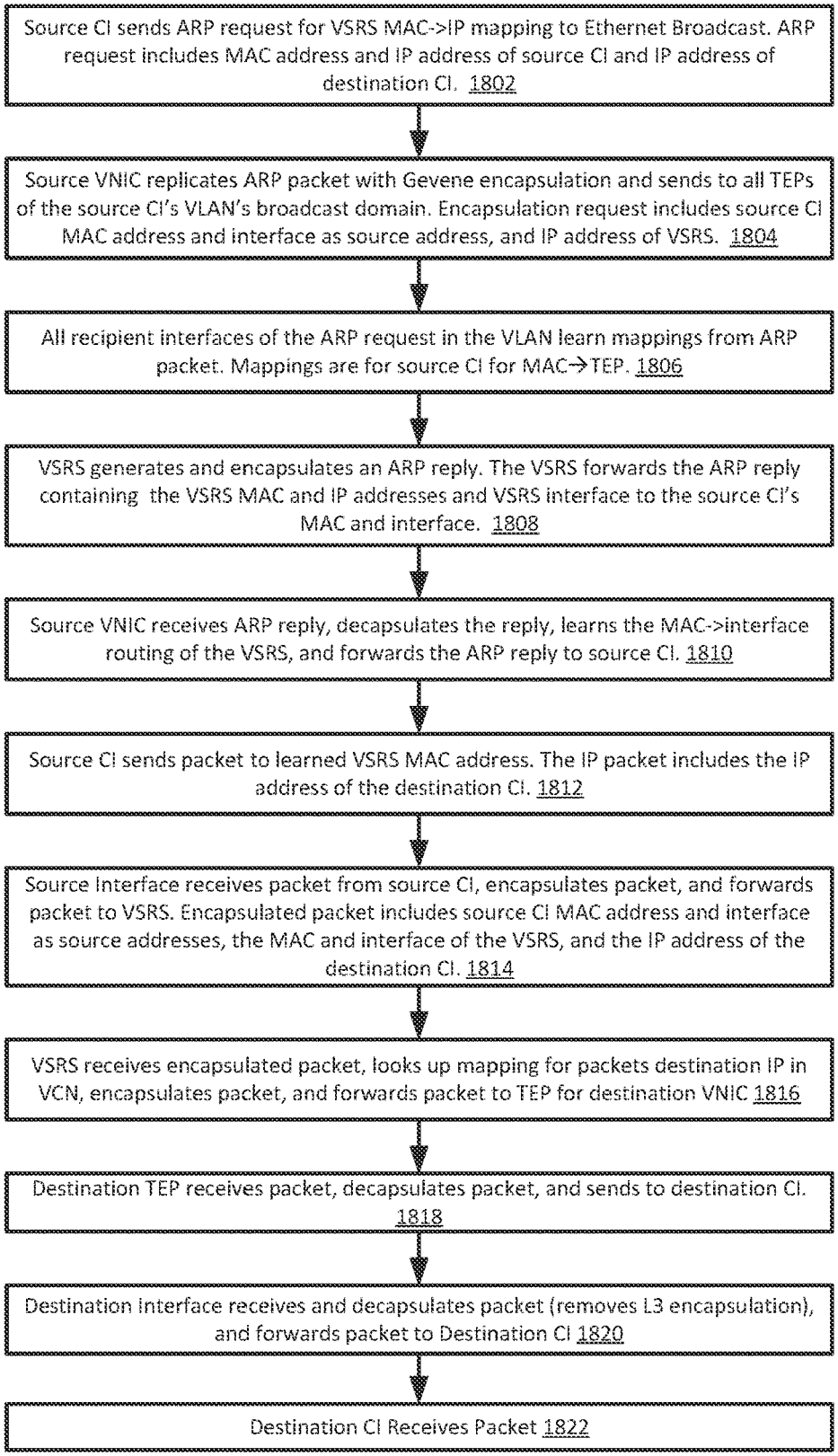
FIG. 18 is a flowchart illustrating one embodiment of a process for egress packet flow from a VLAN.

With reference now to FIG. 18, a flowchart illustrating one embodiment of a process 1800 for egress packet flow from a VLAN is shown. In some embodiments, a packet can egress from the VLAN to flow to another VLAN, to a subnet, or to another network. The process 1800 can be performed by all or portions of the system 600, and specifically can be performed by entities of a VLAN. In some embodiments, parts of the process can be performed by some external (to the source VLAN) destination CI, which destination CI can reside on an L3 subnet.

In some embodiments, the process 1800 can be performed when a compute instance (source CI) in a VLAN (source VLAN) sends a packet to a destination compute instance (destination CI) outside of the VLAN. If the source CI already knows the mapping of the VSRS in the first VLAN (source VSRS), then the source CI can direct the packet directly to the source VSRS. If the source CI does not know the mapping of the source VSRS, then the source CI and its associated VNIC (source interface or source VNIC) first learns the mapping, and specifically, the IP-to-MAC address mapping, of the source VSRS. In embodiment of egress packet flow from the L2 VLAN, the source VNIC is an L2 VNIC. The first steps of process 1800, steps 1802 through 1810 relate to the learning of the source VSRS mapping by the source VNIC and source CI.

The process 1800 begins at block 1802, wherein the source CI initiates an ARP request. The ARP request is used to determine the IP-to-MAC address mapping of the source VSRS. The ARP request is sent to Ethernet broadcast by the source CI. The ARP request includes the source CI MAC and IP addresses and interface identifier of the source CI as the source addresses and source interface identifier. The ARP request further includes the IP address of the source VSRS.

At block 1804, the source VNIC receives the ARP request and replicates the ARP request. Specifically, the source VNIC receives the ARP request from the source CI, identifies all interfaces on the VLAN, and sends the ARP request to all interfaces on the VLAN broadcast domain. As previously mentioned, as the control plane knows all of the interfaces on the VLAN and provides that information to the interfaces with the VLAN, the source interface likewise knows all of the interfaces in the VLAN and is able to send the ARP request to each of the interfaces in the VLAN. To do this, the source interface replicates the ARP request and encapsulates one of the ARP requests for each of the interfaces on the VLAN. Each encapsulated ARP request includes the source CI interface identifier and source CI MAC and/or IP addresses as the source addresses, and the destination CI interface identifier as a destination address. The source CI interface replicates an Ethernet broadcast by sending the replicated and encapsulated ARP requests via serial unicast. The source VNIC can, in some embodiments, encapsulate the ARP request with Geneve encapsulation.

At block 1806, all interfaces in the VLAN broadcast domain receive and decapsulate the packet. Each of the interfaces in the VLAN broadcast domain that receives the packet learns the interface-to-MAC address mapping of the source CI as the packet identifies the source CI MAC address and interface identifier. In addition to this, the VSRS learns the IP-to-MAC address mapping of the source CI. As part of learning the interface-to-MAC address mapping for the source CI, each of the interfaces can update their mapping tables, and can provide updated mapping tables to their associated switch and/or CI. Each recipient interface, except the VSRS, can forward the decapsulated packet to their associated CI. The CI recipient of the forwarded decapsulated packet, and specifically the network interface of that CI, can determine if the destination IP address of the packet matches the IP address of the CI. If the IP address of the CI associated with that interface does not match the destination CI IP address specified in the received packet, then no further action is taken.

The source VSRS determines that the destination IP address matches the IP address of the source VSRS, and as indicated in block 1808, the source VSRS encapsulates and sends a response, which can be a unicast ARP response to the source interface. This response includes the source CI MAC address and IP address as the destination addresses and the source CI interface identifier as the destination interface identifier. The response further includes the source VSRS MAC address and IP address as the source addresses, and the source VSRS interface identifier as the source interface identifier.

At block 1810, the source interface receives and decapsulates the ARP response. The source interface can further learn the interface-to-MAC address mapping for the source VSRS based on information contained in the encapsulation and/or in the encapsulated packet. The source interface can, in some embodiments, forward the ARP response to the source CI.

At block 1812, the source CI receives the ARP response. In some embodiments, the source CI can update a mapping table based on information contained in the ARP response, and specifically based on the MAC address of the source VSRS and on the IP address of the source VSRS. The source CI can then send a packet, which can be any packet including an IP packet, and specifically an IPv4 or IPv6 packet to the source VSRS. In some embodiments, this can include sending the IP packet with a destination address of the source VSRS MAC address and source VSRS IP address. The packet can further include the MAC address and IP address of the source CI as the source addresses.

At block 1814, the source interface receives the packet from the source CI. The source interface encapsulates the packet. The source interface can forward the encapsulated packet to the source VSRS, and specifically to source VSRS VNIC. The encapsulated packet can include the MAC address and interface identifier of the source CI as the source MAC address and source interface identifier, and the MAC address and interface identifier of the source VSRS as the destination MAC address and destination interface identifier. The encapsulated packet can further include the IP address of the source CI and the IP address of the source VSRS.

At block 1816, the source VSRS receives the encapsulated packet. The source VSRS identifies the destination CI of the packet. In some embodiments, the source VSRS identifies the destination CI of the packet based on the IP address of the destination CI included in the packet. The source VSRS looks up mapping for the packet's destination IP address. If the IP address is within the IP address space of the VCN, then the source VSRS looks up the mapping for the packet's destination IP address in the space of IP addresses for the VCN. The source VSRS then re-encapsulates the packet with an L3 encapsulation.

The source VSRS then forwards the packet to the destination CI. In some embodiments, this can include forwarding the encapsulated packet to a VR associated with the subnet containing the destination CI, and/or forwarding the packet to a gateway to allow the packet to exit the VCN. In some embodiments, forwarding the packet to the destination CI can comprise forwarding the packet to the TEP associated with the destination CI. The L3 encapsulated packet includes the IP address of the source CI as source address and the IP address of the destination CI as the destination address.

At block 1820, the destination interface receives and decapsulates the packet. In some embodiments, the destination VNIC forwards the packet to the destination CI. At block 1822, the destination CI receives the packet.

Figure 19:
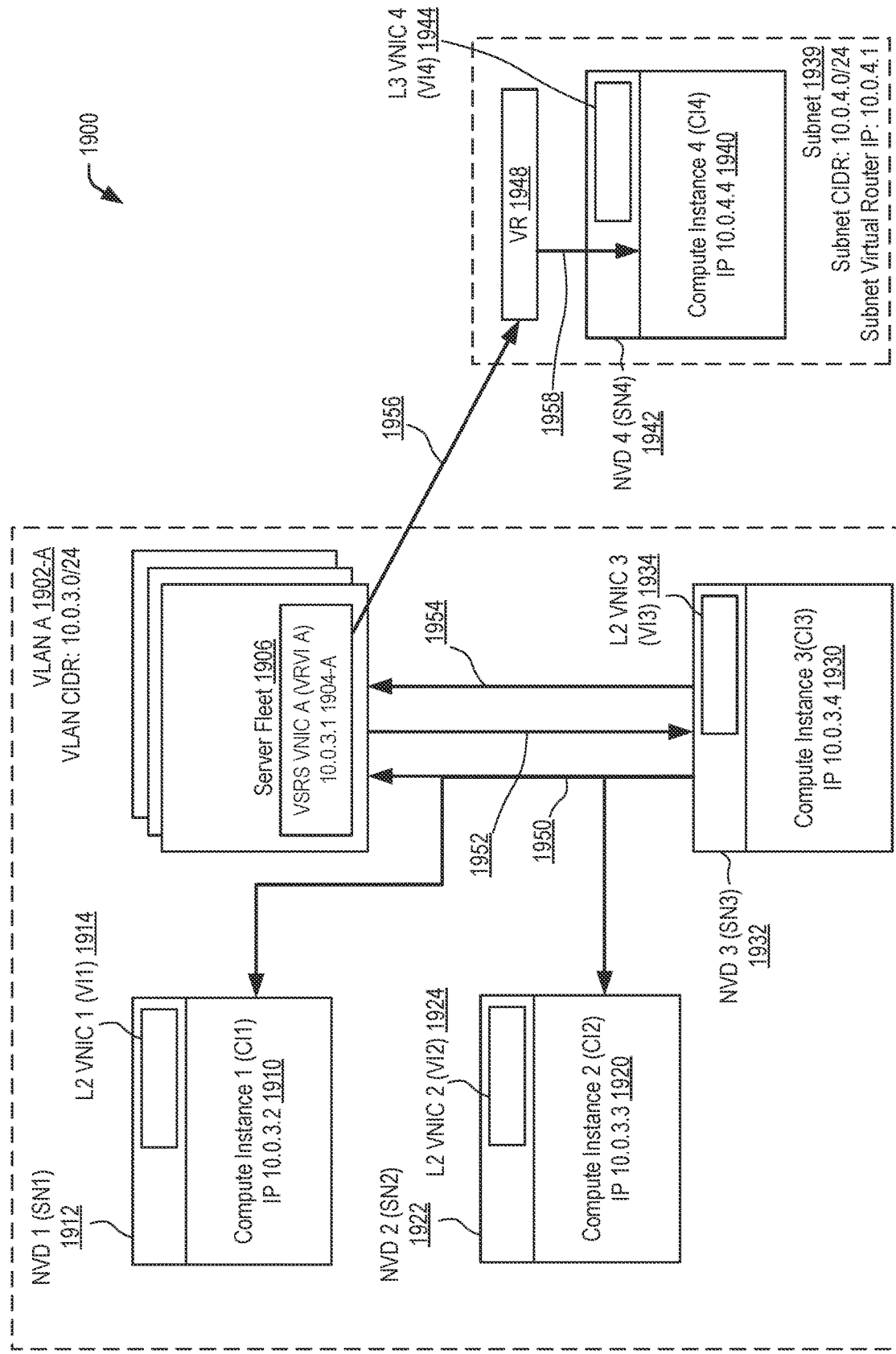
FIG. 19 is a schematic illustration of the process for egress packet flow.

With reference now to FIG. 19, a schematic illustration 1900 of the process 1800 for egress packet flow is shown. As seen, VLAN A 1502-A has a VLAN CIDR of 10.0.3.0/24. VLAN A 1502-A includes a VSRS VNIC A (VRVI A) 1504-A which can be instantiated on one or several pieces of hardware, and specifically can be instantiated on a server fleet 1506. VRVI A 1504-A can have an IP address of 10.0.3.1. The VLAN can include compute instance 1 (CI1) 1510 having an IP address of 10.0.3.2 and communicatively coupled with NVD 1 (SN1) 1512 which can instantiate L2 VNIC 1 (VI1) 1514 and L2 switch 1. The VLAN can include compute instance 2 (CI2) 1520 having an IP address of 10.0.3.3 and communicatively coupled with NVD 2 (SN2) 1522 which can instantiate L2 VNIC 2 (VI2) 1524 and L2 switch 2. The VLAN can include compute instance 3 (CI3) 1530 having an IP address of 10.0.3.4 and communicatively coupled with NVD 3 (SN3) 1532 which can instantiate L2 VNIC 3 (VI3) 1514 and L2 switch 3.

A compute instance, which can be L3 compute instance 4 (CI4) 1944 can reside on a subnet 1939 external to VLAN A 1902-A. CI4 can have an IP address of 10.0.4.4, and can be communicatively coupled with NVD 4 (SN4) 1942 which can instantiate L3 VNIC 4 (VI4) 1944. The subnet 1939 can include virtual router (VR) 1948. VR 1948 can have an IP address of 10.0.4.1. VR 1948 can be instantiated on, for example, a SmartNIC, a server, a server fleet, or the like.

In the example of FIG. 19, and applying the method 1800 of FIG. 18, CI3 1930 is the source CI and VI3 1934 is the source interface. Further, CI4 1940 is the destination CI and VI4 1944 is the destination interface. CI3 determines that it does not have an IP-to-MAC mapping for VRVI A 1904-A, resulting in CI3 1930 sending an ARP request. The ARP request can be for the known address, and specifically can be for the known IP address of VRVI A 1904-A. Thus, in some embodiments, the ARP request can be for 10.0.3.1.

This ARP request is received by SN3 1932 and VI3 1934. VI3 1934 replicates the ARP request to create an ARP request for each CI in the VLAN 1902-A. VI3 1934 encapsulates each ARP request with an L2 encapsulation and sends an ARP request to each of the interfaces in the VLAN. These encapsulated ARP requests can include information identifying the MAC address of the source CI, CI3, the source interface identifier, VI3, and the target IP address. These requests can be sent to each of the interfaces in the VLAN as shown by arrows 1950, and specifically can be broadcast such that each interface in the VLAN receives an ARP request.

The interfaces in the VLAN receive the encapsulated ARP request, and decapsulate the ARP request. Based on information contained in and/or associated with the ARP request, the interfaces in the VLAN update their mapping. Specifically, for example, each of VI1 1914, VI2 1924, and VRVI A 1904-A receive a unicast ARP request from CI 3 1930, decapsulate the unicast ARP request, and learn the mapping of the interface-to-MAC address of the source CI, both of which interface identifier and MAC address are included in the encapsulated packet.

VRVI A 1904-A determines that its IP address matches the requested IP address, and sends an ARP response to CI 3 1930 as indicated with arrow 1952. The ARP response from VRVI A 1904-A can be encapsulated by VRVI A 1904-A, and can be sent as an ARP unicast to the requesting interface, and specifically to VI3. As indicated earlier in this application, the sending of this ARP response can include the providing of the encapsulated ARP response to the associated switch of VRVI A 1904-A, which can send the encapsulated ARP response to VI3.

The ARP response can be received by VI3 and can be decapsulated. VI3 can learn mapping of the interface-to-MAC of VRVI A 1904-A based on the received ARP response, and can provide the updated learned mapping to VI3's associated switch. The decapsulated packet can be provided to CI3. CI3 can learn IP-MAC address mapping based on the received packet. CI3 can send a packet, which packet can be an IP packet such as an IPv4 or IPv6 packet. This packet can have CI3's MAC and IP addresses as source addresses, and can have the IP address of the destination CI, CI4 1940 as the destination address. In some embodiments, the destination address can further include VRVI A's 1904-A MAC address.

The packet sent by CI3 can be received by VI3, which can encapsulate the packet and forward the packet to VRVI A 1904-A. VRVI A 1904-A can receive the packet, decapsulate the packet, and look up mapping for the packet's destination IP address (the IP address of CI4). In some embodiments, a VSRS, and thus VRVI A 1904-A can reside in both an L2 network and in an L3 network. In the L2 network, thus within the VLAN, the VSRS can utilize L2 communication protocols, whereas the VSRS can utilize L3 communication protocols when communicating with the L3 network. In contrast to the learning performed in the VLAN, the VSRS can learn mapping to endpoints in the L3 network from the L3 control plane. In some embodiments, for example, the L3 control plane can provide information mapping IP addresses, MAC addresses, and/or interface identifier of instances in the L3 network.

VRVI A 1904-A can look up the mapping for the IP destination address contained in the packet, or in other words, can look up the mapping for the IP address of the destination CI. In some embodiments, looking up this mapping can include identifying subnet 1939 on which CI4 1940 resides and/or identifying the VR associated with the subnet 1939 on which CI4 resides. VRVI A 1904-A can encapsulate the packet and forward the encapsulated packet to VR 1948, which can be the tunnel end point (TEP) for the subnet 1939 and/or destination CI 1940. The forwarding of this encapsulated packet is indicated with block 1956.

VR 1948 can receive and decapsulate the packet. VR 1948 can further identify the interface within subnet 1939 corresponding to the destination IP address. VR 1948 can, in some embodiments, be located on the same NVD as the destination interface VI4 1944. VR 1948 can thus forward the packet directly to destination CI, and specifically to CI4 1940 as indicated in block 1958.

Interface-Based Access Control List Filtering

The VSRS can provide interface-based Access Control List (ACL) filtering. This can include evaluating an ingress security policy for the VLAN. This can also include evaluating an egress security policy for the sender at the VSRS based on learned mapping of interfaces to MAC and IP addresses in the VLAN at the time that the VSRS determines where to send a received packet. This can result in delayed classification of an ACL.

In some embodiments, an ACL can comprise a list of permissions associated with objects within the system. These objects can include hardware within the physical network, which hardware can include, for example, one or several servers, SmartNICs, host machines, or the like.

These objects can include one or several virtual objects within the virtual network. These virtual objects can include, for example, one or several interfaces, compute instances, address such as IP address and/or MAC addresses, or the like. In some embodiments, the ACL can specify which users, object, and/or system processes are granted access to objects and/or which operations are allowed on a given object.

The ACL can be specific to one or several CIs. Thus, in some embodiments, some or all of the CIs can have a unique ACL and/or can maintain a unique ACL. In some embodiments, a CIs ACL may specify to which interfaces and/or addresses (either MAC or IP) the CI may send packets, to which interfaces and/or addresses (either MAC or IP) the CI may not send packets, one or several types of packets which the CI may be allowed to send to one or several interfaces and/or address, and/or one or several types of packets which the CI may be prohibited from sending to one or several interfaces. In some embodiments, a CI's ACL may be stored in a location accessible by other entities within the network, including other entities such as one or several VRs or VSRSes which may enforce the ACL.

For example, when receiving a communication from an IP network for one or several intended recipients within the VLAN, the VSRS can determine and apply filtering and/or limit delivery of the communication based on the ACL of the sender of that communication. In some embodiments, this can be accomplished, for example, by: (1) the VSRS making communication decisions based on accessing a copy of a sender's ACL; or (2) the VSRS making communication decisions of a communication received by the VSRS based on information encoded in the packet metadata of that communication.

Figure 20:
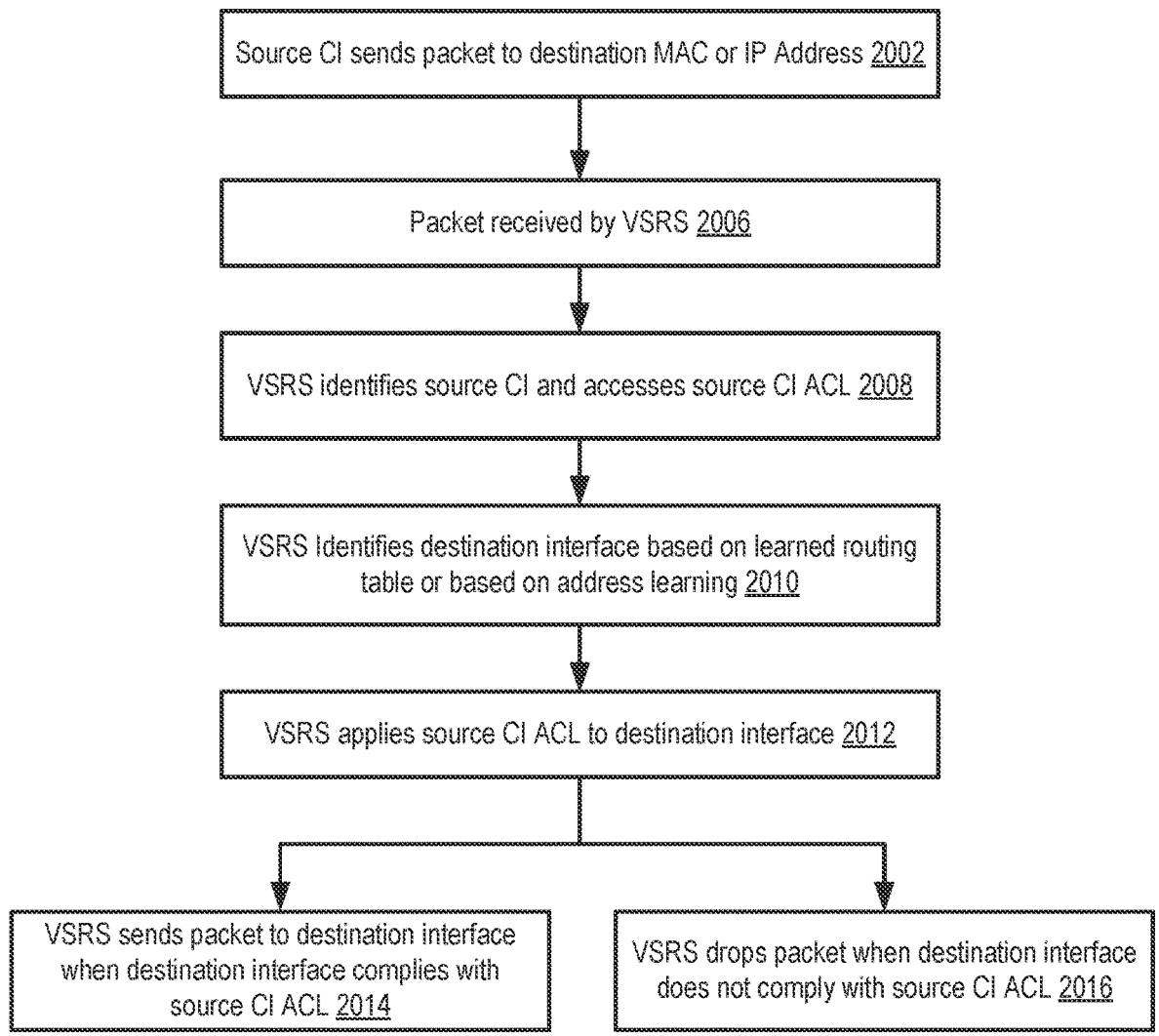
FIG. 20 is a flowchart illustrating one embodiment of a process for delayed Access Control List (ACL) classification.

With reference now to FIG. 20, a flowchart illustrating one embodiment of a process 2000 for delayed Access Control List (ACL) classification is shown. The process 2000 can be performed by all or portions of the system 600, and specifically can be performed by a VSRS 624, 634.

The process 2000 begins at block 2002, wherein a source CI sends a packet to a destination MAC or IP address. In some embodiments, the source CI can be external to the VLAN containing the destination MAC address or IP address to which the packet is sent.

At block 2006, the VSRS of the VLAN containing the destination MAC or IP address receives the packet. In some embodiments, the packet can be encapsulated with an L2 encapsulation, and in some embodiments, the packet can be encapsulated with an L3 encapsulation. The VSRS can decapsulate the packet and identify the source CI as indicated in block 2008. Upon identifying the source CI, the VSRS can access an ACL for the source CI. In some embodiments, for example, the ACL for the source CI can be stored in a location accessible by the VSRS. In some embodiments, accessing the ACL for the source CI can include retrieving information in the source CI's ACL, which information can, for example, identify one or several restrictions for delivery of packets. In some embodiments, this information can include one or several rules based on one or several IP addresses, MAC addresses, TCP and/or UDP source and destination ports, EtherType, or the like.

At block 2010, the VSRS identifies the destination interface for the packet. In embodiments in which the VSRS does not have mapping for the destination address, the VSRS can determine the mapping information as discussed above with respect to steps 1612 through 1620 of process 1600 of FIG. 16. In embodiments in which the mapping is previously learned, or learned via performing some or all of steps 1612 through 1620 of process 1600, the VSRS can identify the destination interface based on mapping learned by the VSRS through communication with interfaces within the VLAN of the VSRS. In some embodiments, identifying the destination interface can include looking up the destination interface based on the destination address, and specifically the destination IP address and/or MAC address of the packet.

At block 2012, the VSRS applies the source CI ACL to the destination interface. This can include determining whether any portion of the source CI ACL is relevant to the destination interface, and if so, applying that portion of the source CI ACL. At block 2014, if the destination interface complies with the source CI ACL, or in other words, if the source CI ACL allows sending of packets from the source CI to the destination interface, then the VSRS forwards the packet to the destination interface. In some embodiments, this forwarding of the packet can include encapsulating the packet. In some embodiments, the packet can be encapsulated according to an L2 encapsulation such as, for example, an L2 Geneve encapsulation. The VSRS can forward the packet to the destination interface, and more specifically to the destination CI which has the destination interface as its TEP. The destination interface can receive the packet, decapsulate the packet, and forward the packet to the destination CI.

Alternatively, at block 2016, if the destination interface does not comply with the source CI ACL, or in other words, if the source CI ACL does not allow sending of packets from the source CI to the destination interface, then the VSRS drops the packet. In some embodiments, the VSRS can respond to the source CI indicating the dropping of the packet and/or indicating the reason for the dropping of the packet. In some embodiments, the VSRS can update operational metrics/statistics associated with the sending interface to reflect the ACL decision.

Figure 21:
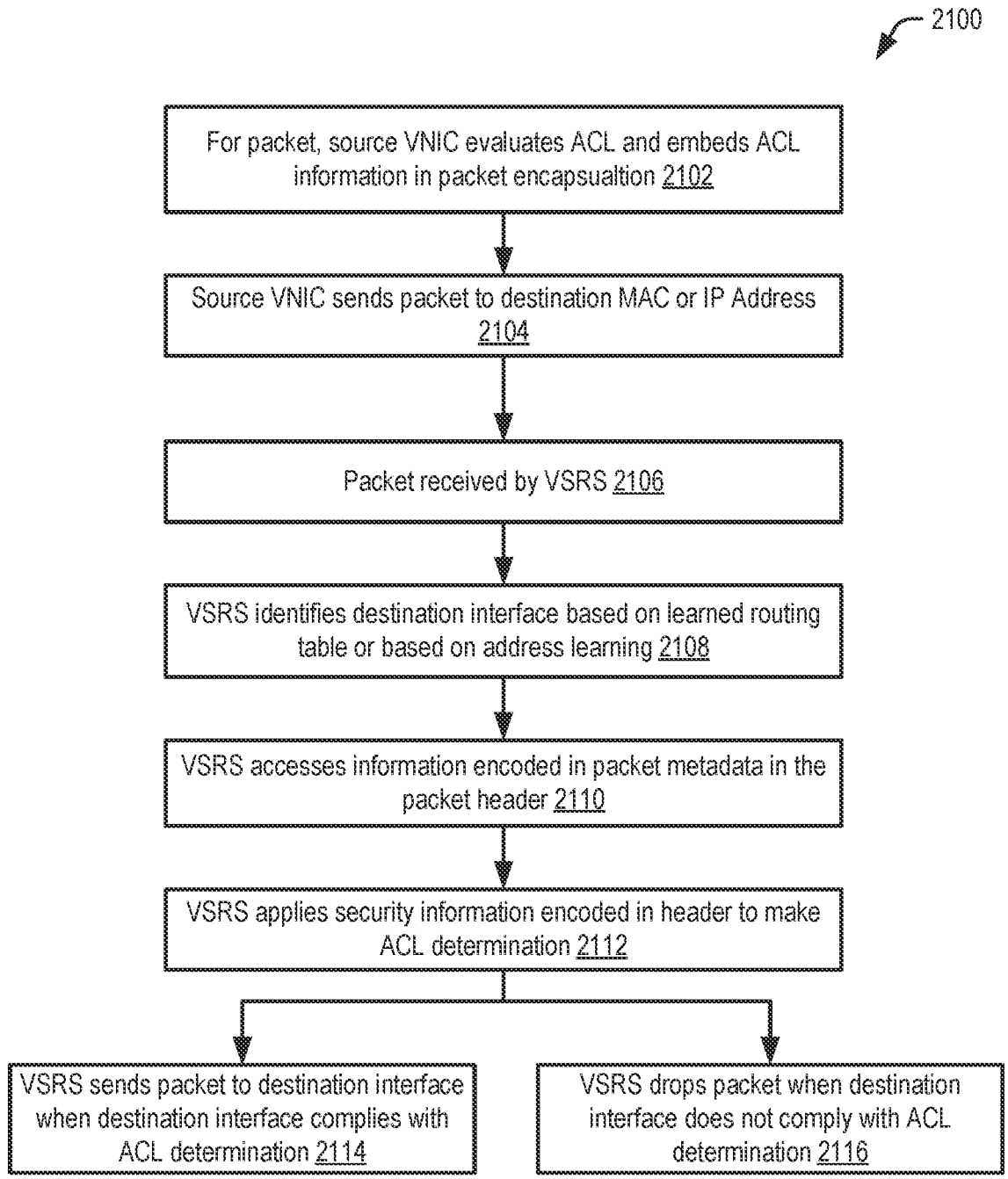
FIG. 21 is a flowchart illustrating one embodiment of a process for early classification of an ACL.

With reference now to FIG. 21, a flowchart illustrating one embodiment of a process 2100 for early classification of an ACL and incorporation of that classification in metadata is shown. The process 2100 can be performed by all or portions of the system 600, and specifically can be performed by a source CI and a VSRS 624, 634.

At block 2102, the source CI determines to send a packet to a destination CI. In some embodiments, this can include the source CI determining to send a packet to a MAC address and/or to an IP address of a destination CI. The source VNIC can send the packet as indicated in block 2104. The source VNIC can receive the packet, can evaluate the ACL for the packet, and can embed ACL information relevant to the packet in a portion of the packet. In some embodiments, this information can include one or several rules based on one or several IP addresses, MAC addresses, TCP and/or UDP source and destination ports, EtherType, or the like. The source VNIC can further encapsulate the packet. In some embodiments, the ACL can be stored as metadata in the encapsulated packet, and specifically can be stored in a header of the packet. In some embodiments, the source CI can be external to the VLAN containing the destination CI to which the packet is sent.

At block 2106, the VSRS of the VLAN containing the destination MAC or IP address receives the packet. In some embodiments, the packet can be encapsulated with an L2 encapsulation, and in some embodiments, the packet can be encapsulated with an L3 encapsulation. The VSRS can decapsulate the packet. In some embodiments, the VSRS can extract information from the packet identifying the destination of the packet, and specifically identifying the destination IP address.

At block 2108, the VSRS identifies the destination interface for the packet. In embodiments in which the VSRS does not have mapping for the destination address, the VSRS can determine the mapping information as discussed above with respect to steps 1612 through 1620 of process 1600 of FIG. 16. In embodiments in which the mapping is previously learned, or learned via performing some or all of steps 1612 through 1620 of process 1600, the VSRS can identify the destination interface based on mapping learned by the VSRS through communication with interfaces within the VLAN of the VSRS. Thus, in some embodiments, the VSRS can determine that it has mapping information for the destination address, and can identify the destination interface based on this mapping information. In some embodiments, identifying the destination interface can include looking up the destination interface based on the destination address, and specifically the destination IP address and/or MAC address of the packet.

At block 2110, the VSRS accesses ACL information contained in a portion of the packet. In some embodiments, this can include extracting metadata from the packet, and specifically extracting metadata from the packet header. In some embodiments, this can include decoding information encoded in the packet metadata in the packet header.

At block 2112, the VSRS applies the ACL information retrieved from the portion of the packet. Specifically, this can include applying the security information encoded in the to the destination interface. This can include determining whether any portion of ACL information is relevant to the destination interface, and if so, applying that portion of the ACL information. At block 2114, if the destination interface complies with the ACL information and/or with one or several rules of the ACL information, or in other words, if the ACL information allows sending of packets from the source CI to the destination interface, then the VSRS forwards the packet to the destination interface. In some embodiments, this forwarding of the packet can include encapsulating the packet. In some embodiments, the packet can be encapsulated according to an L2 encapsulation such as, for example, an L2 Geneve encapsulation. The VSRS can forward the packet to the destination interface, and more specifically to the destination CI which has the destination interface as its TEP. The destination interface can receive the packet, decapsulate the packet, and forward the packet to the destination CI.

Alternatively, at block 2116, if the destination interface does not comply with the ACL information, or in other words, if the ACL information does not allow sending of packets from the source CI to the destination interface, then the VSRS drops the packet. In some embodiments, the VSRS can respond to the source CI indicating the dropping of the packet and/or indicating the reason for the dropping of the packet.

Next Hop Routing

Some embodiments of the VSRS can facilitate next hop routing, and specifically can delay next hop evaluation until a communication is received at the VSRS. Because the sender of a communication outside of the VLAN may not know the updated virtual IP addresses for instances in the VLAN, the sender outside of the VLAN cannot accurately specify next hop routing.

In some embodiments, the VSRS can facilitate in next hop routing specification. In some embodiments, this can be accomplished, for example, by: (1) the sender making an initial specification of next hop routing for a communication and the VSRS re-evaluating next hop specification upon receipt of the communication; or (2) delaying next hop specification until the communication is received by the VSRS.

Figure 22:
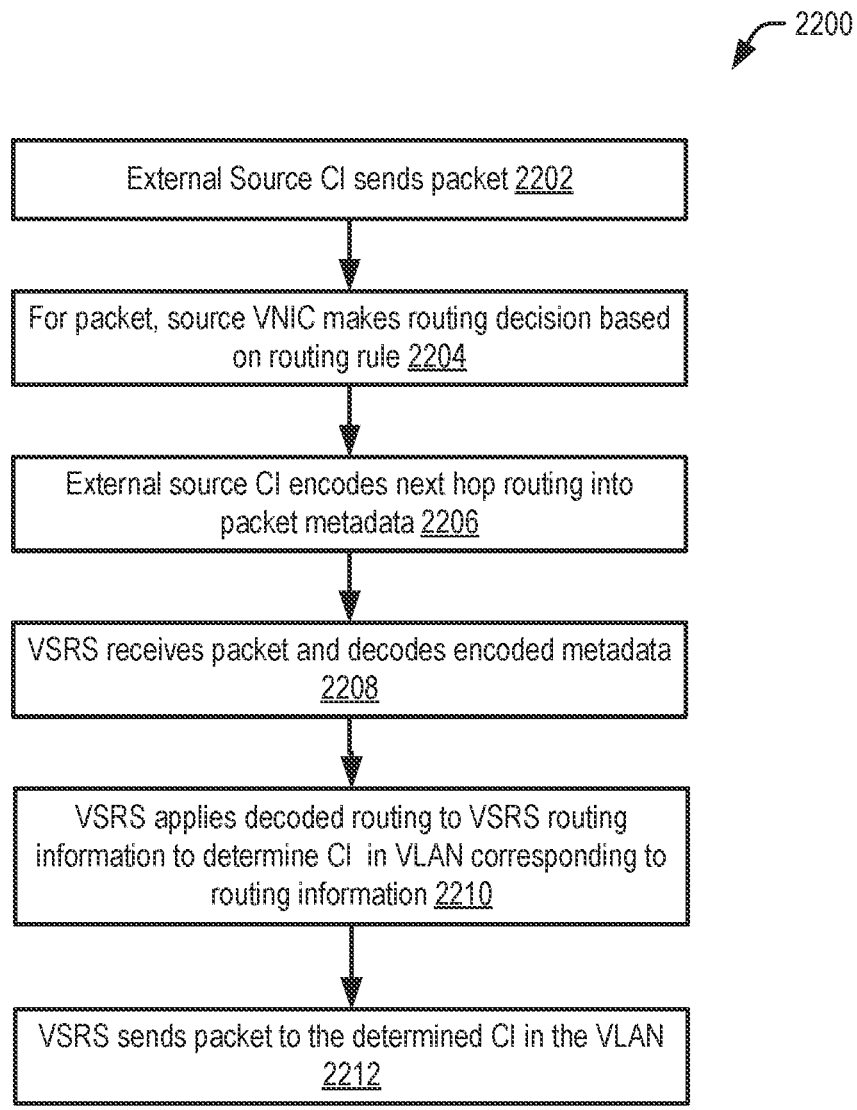
FIG. 22 is a flowchart illustrating one embodiment of a process for sender-based next hop routing.

With reference now to FIG. 22, a flowchart illustrating one embodiment of a process 2200 for sender-based next hop routing is shown. In some embodiments, this can include the separating of the evaluation of the next hop route and the specification of the next hop route. This can result in the source CI evaluating the route policy and encoding next hop route inside the packet metadata of the virtual packet header of the communication. In such embodiments, the packet can include an intended virtual IP address of the next hop destination, and the next hop route can be encoded in the packet metadata This communication is received by the VSRS, which then uses the encoded next hop route from the packet metadata to determine the instance within the VLAN to receive the communication, and the destination virtual IP address of that instance. This determination of the instance can use the tables generated and/or curated by the VSRS, and specifically can use tables linking virtual IP addresses, MAC addresses, and/or virtual interface IDs. With these tables, the VSRS can identify the virtual IP address corresponding to the MAC address and/or virtual interface ID of the intended next hop destination. In some embodiments, this identification of a recipient instance based on the encoded next hop route contained in the packet metadata by the VSRS can result in the VSRS sending the communication to a different destination virtual IP address as the next hop destination indicated by the virtual IP address in the packet and specified by the sender of the packet.

The process 2200 can be performed by all or portions of the system 600, and specifically can be performed by a source CI and a VSRS 624, 634.

The process begins at block 2202, wherein the source CI can send the packet. In some embodiments, the source CI can be external to the VLAN containing the destination MAC address or IP address to which the packet is sent.

At block 2204, the source VNIC can make a routing decision based on one or several routing rules. In some embodiments, this can include the source VNIC retrieving and/or accessing one or several routing rules, and then making the routing decision based on those routing rules. This routing decision can be, in some embodiments, a next hop routing decision for the packet. In some embodiments, these routing rules can be stored in, for example, a route table in the network of the source CI. In some embodiments, this can include, for example, a subnet route table.

At block 2206, the source VNIC can embed the routing decision into a portion of the packet. In some embodiments, this can include encapsulating the packet, and embedding the routing decision in metadata of the packet, which metadata can be, for example, encoded in a header of the packet. After the packet is encapsulated and the routing decision is embedded in the encapsulated packet, the source VNIC can forward the encapsulated packet to the VSRS.

At block 2208, the VSRS of the VLAN containing the destination MAC or IP address receives the packet. In some embodiments, the packet can be encapsulated with an L2 encapsulation, and in some embodiments, the packet can be encapsulated with an L3 encapsulation. In some embodiments, the receiving of the packet by the VSRS can include the decapsulating of the packet. In some embodiments, the receiving of the packet by the VSRS can include the extracting of the routing decision embedded in a portion of the packet. In some embodiments, this can include the decoding of the encoded metadata containing the routing decision.

At block 2210, the VSRS applies the routing decision to the VSRS routing information to determine a destination interface for the packet. In some embodiments, this can include applying the decoded routing decision to the VSRS routing information to determine a destination CI in the VLAN corresponding to the routing information. At block 2212, the VSRS sends the packet to the determined CI in the VLAN. In some embodiments, this can include the VSRS forwarding the packet to the destination interface. In some embodiments, this forwarding of the packet can include encapsulating the packet, which encapsulation can be according to an L2 encapsulation such as, for example, an L2 Geneve encapsulation. The VSRS can forward the packet to the destination interface, and more specifically to the destination CI which has the destination interface as its TEP. The destination interface can receive the packet, decapsulate the packet, and forward the packet to the destination CI.

Figure 23:
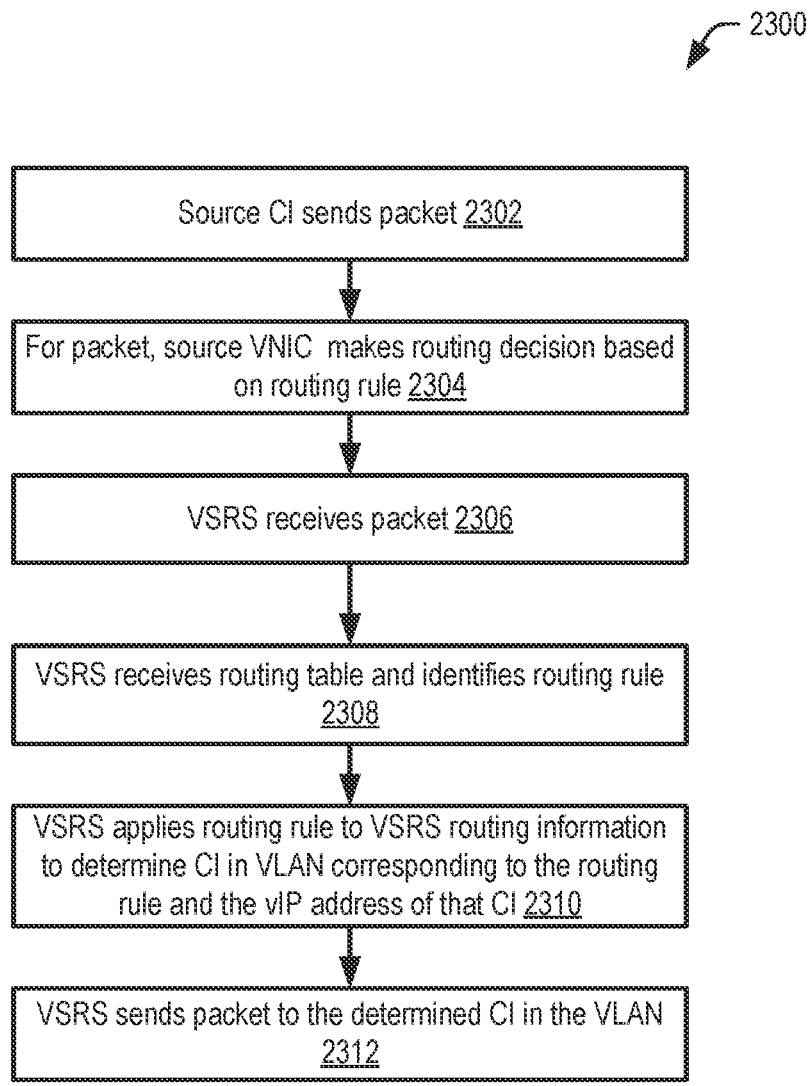
FIG. 23 is a flowchart illustrating one embodiment of a process for delayed next hop routing.

With reference now to FIG. 23, a flowchart illustrating one embodiment of a process 2300 for delayed next hop routing is shown. The process 2300 can be performed by all or portions of the system 600, and specifically can be performed by a source VNIC and a VSRS 624, 634.

In some embodiments, for example, the source VNIC can make a routing decision for a communication transiting the VLAN based on a routing rule that can be contained in a routing table. This communication can be received by the VSRS which can re-evaluate the next hop specification, and can query a copy of that same routing table to identify the routing rule. Based upon this routing rule, the VSRS determines the instance within the VLAN corresponding to the routing rule, the virtual IP address of that instance, and sends the communication to that instance. The determination of the instance corresponding to the routing rule can include the retrieving of information by the VSRS from tables linking virtual IP addresses, MAC addresses, and/or virtual interface IDs, and determining the virtual IP address associated with the virtual interface and/or instance that is the intended next hop destination.

The process 2300 begins at block 2302, wherein the source CI can send the packet. In some embodiments, this can include the source CI sending the packet to a MAC address and/or to an IP address of a destination CI. In some embodiments, the source CI can be external to the VLAN containing the destination MAC address or IP address to which the packet is sent.

At block 2204, the source VNIC can receive the packet. The source VNIC can then make a routing decision based on one or several routing rules. In some embodiments, this can include the source VNIC retrieving and/or accessing one or several routing rules, and then making the routing decision based on those routing rules. This routing decision can be, in some embodiments, a next hop routing decision for the packet. In some embodiments, these routing rules can be stored in, for example, a route table in the network of the source CI. In some embodiments, this can include, for example, a subnet route table. The source VNIC can then encapsulate the packet, and can send the packet to the VSRS.

At block 2206, the VSRS of the VLAN containing the destination MAC or IP address receives the packet. In some embodiments, the packet can be encapsulated with an L2 encapsulation, and in some embodiments, the packet can be encapsulated with an L3 encapsulation. In some embodiments, the receiving of the packet by the VSRS can include the decapsulating of the packet.

At block 2308, the VSRS retrieves routing information relevant to the packet. In some embodiments, this can include retrieving a routing table and/or portions of a routing table relevant to the received packet. In some embodiments, this routing table can be received from, for example, the control plane. Upon receiving the routing information, the VSRS identifies a routing rule relevant to the received packet.

At block 2310, the VSRS applies the routing rule to the VSRS routing information to determine a destination interface in the VLAN for the packet. In some embodiments, this can include applying the routing rule to the VSRS routing information to determine a destination CI in the VLAN corresponding to the routing information. At block 2312, the VSRS sends the packet to the determined CI in the VLAN. In some embodiments, this can include the VSRS forwarding the packet to the destination interface. In some embodiments, this forwarding of the packet can include encapsulating the packet, which encapsulation can be according to an L2 encapsulation such as, for example, an L2 Geneve encapsulation. The VSRS can forward the packet to the destination interface, and more specifically to the destination CI which has the destination interface as its TEP. The destination interface can receive the packet, decapsulate the packet, and forward the packet to the destination CI.

Example Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 24:
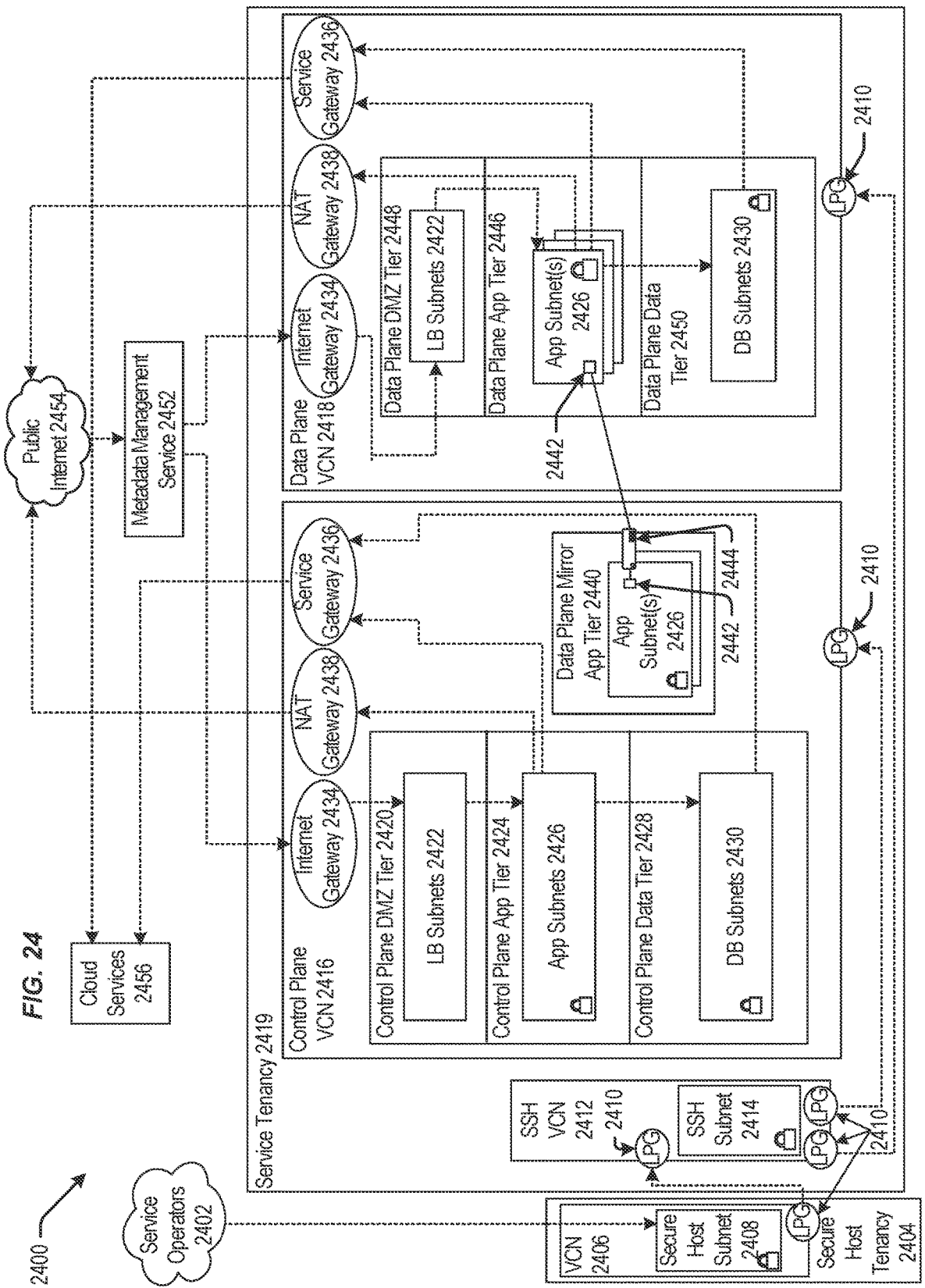
FIG. 24 is a block diagram illustrating one pattern for implementing a cloud infrastructure as a service system, according to at least one embodiment.

FIG. 24 is a block diagram 2400 illustrating an example pattern of an IaaS architecture, according to at least one embodiment. Service operators 2402 can be communicatively coupled to a secure host tenancy 2404 that can include a virtual cloud network (VCN) 2406 and a secure host subnet 2408. In some examples, the service operators 2402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 2406 and/or the Internet.

The VCN 2406 can include a local peering gateway (LPG) 2410 that can be communicatively coupled to a secure shell (SSH) VCN 2412 via an LPG 2410 contained in the SSH VCN 2412. The SSH VCN 2412 can include an SSH subnet 2414, and the SSH VCN 2412 can be communicatively coupled to a control plane VCN 2416 via the LPG 2410 contained in the control plane VCN 2416. Also, the SSH VCN 2412 can be communicatively coupled to a data plane VCN 2418 via an LPG 2410. The control plane VCN 2416 and the data plane VCN 2418 can be contained in a service tenancy 2419 that can be owned and/or operated by the IaaS provider.

The control plane VCN 2416 can include a control plane demilitarized zone (DMZ) tier 2420 that acts as a perimeter network (e.g., portions of a corporate network between the corporate intranet and external networks). The DMZ-based servers may have restricted responsibilities and help keep breaches contained. Additionally, the DMZ tier 2420 can include one or more load balancer (LB) subnet(s) 2422, a control plane app tier 2424 that can include app subnet(s) 2426, a control plane data tier 2428 that can include database (DB) subnet(s) 2430 (e.g., frontend DB subnet(s) and/or backend DB subnet(s)). The LB subnet(s) 2422 contained in the control plane DMZ tier 2420 can be communicatively coupled to the app subnet(s) 2426 contained in the control plane app tier 2424 and an Internet gateway 2434 that can be contained in the control plane VCN 2416, and the app subnet(s) 2426 can be communicatively coupled to the DB subnet(s) 2430 contained in the control plane data tier 2428 and a service gateway 2436 and a network address translation (NAT) gateway 2438. The control plane VCN 2416 can include the service gateway 2436 and the NAT gateway 2438.

The control plane VCN 2416 can include a data plane mirror app tier 2440 that can include app subnet(s) 2426. The app subnet(s) 2426 contained in the data plane mirror app tier 2440 can include a virtual network interface controller (VNIC) 2442 that can execute a compute instance 2444. The compute instance 2444 can communicatively couple the app subnet(s) 2426 of the data plane mirror app tier 2440 to app subnet(s) 2426 that can be contained in a data plane app tier 2446.

The data plane VCN 2418 can include the data plane app tier 2446, a data plane DMZ tier 2448, and a data plane data tier 2450. The data plane DMZ tier 2448 can include LB subnet(s) 2422 that can be communicatively coupled to the app subnet(s) 2426 of the data plane app tier 2446 and the Internet gateway 2434 of the data plane VCN 2418. The app subnet(s) 2426 can be communicatively coupled to the service gateway 2436 of the data plane VCN 2418 and the NAT gateway 2438 of the data plane VCN 2418. The data plane data tier 2450 can also include the DB subnet(s) 2430 that can be communicatively coupled to the app subnet(s) 2426 of the data plane app tier 2446.

The Internet gateway 2434 of the control plane VCN 2416 and of the data plane VCN 2418 can be communicatively coupled to a metadata management service 2452 that can be communicatively coupled to public Internet 2454. Public Internet 2454 can be communicatively coupled to the NAT gateway 2438 of the control plane VCN 2416 and of the data plane VCN 2418. The service gateway 2436 of the control plane VCN 2416 and of the data plane VCN 2418 can be communicatively couple to cloud services 2456.

In some examples, the service gateway 2436 of the control plane VCN 2416 or of the data plane VCN 2418 can make application programming interface (API) calls to cloud services 2456 without going through public Internet 2454. The API calls to cloud services 2456 from the service gateway 2436 can be one-way: the service gateway 2436 can make API calls to cloud services 2456, and cloud services 2456 can send requested data to the service gateway 2436. But, cloud services 2456 may not initiate API calls to the service gateway 2436.

In some examples, the secure host tenancy 2404 can be directly connected to the service tenancy 2419, which may be otherwise isolated. The secure host subnet 2408 can communicate with the SSH subnet 2414 through an LPG 2410 that may enable two-way communication over an otherwise isolated system. Connecting the secure host subnet 2408 to the SSH subnet 2414 may give the secure host subnet 2408 access to other entities within the service tenancy 2419.

The control plane VCN 2416 may allow users of the service tenancy 2419 to set up or otherwise provision desired resources. Desired resources provisioned in the control plane VCN 2416 may be deployed or otherwise used in the data plane VCN 2418. In some examples, the control plane VCN 2416 can be isolated from the data plane VCN 2418, and the data plane mirror app tier 2440 of the control plane VCN 2416 can communicate with the data plane app tier 2446 of the data plane VCN 2418 via VNICs 2442 that can be contained in the data plane mirror app tier 2440 and the data plane app tier 2446.

In some examples, users of the system, or customers, can make requests, for example create, read, update, or delete (CRUD) operations, through public Internet 2454 that can communicate the requests to the metadata management service 2452. The metadata management service 2452 can communicate the request to the control plane VCN 2416 through the Internet gateway 2434. The request can be received by the LB subnet(s) 2422 contained in the control plane DMZ tier 2420. The LB subnet(s) 2422 may determine that the request is valid, and in response to this determination, the LB subnet(s) 2422 can transmit the request to app subnet(s) 2426 contained in the control plane app tier 2424. If the request is validated and requires a call to public Internet 2454, the call to public Internet 2454 may be transmitted to the NAT gateway 2438 that can make the call to public Internet 2454. Memory that may be desired to be stored by the request can be stored in the DB subnet(s) 2430.

In some examples, the data plane mirror app tier 2440 can facilitate direct communication between the control plane VCN 2416 and the data plane VCN 2418. For example, changes, updates, or other suitable modifications to configuration may be desired to be applied to the resources contained in the data plane VCN 2418. Via a VNIC 2442, the control plane VCN 2416 can directly communicate with, and can thereby execute the changes, updates, or other suitable modifications to configuration to, resources contained in the data plane VCN 2418.

In some embodiments, the control plane VCN 2416 and the data plane VCN 2418 can be contained in the service tenancy 2419. In this case, the user, or the customer, of the system may not own or operate either the control plane VCN 2416 or the data plane VCN 2418. Instead, the IaaS provider may own or operate the control plane VCN 2416 and the data plane VCN 2418, both of which may be contained in the service tenancy 2419. This embodiment can enable isolation of networks that may prevent users or customers from interacting with other users', or other customers', resources. Also, this embodiment may allow users or customers of the system to store databases privately without needing to rely on public Internet 2454, which may not have a desired level of threat prevention, for storage.

In other embodiments, the LB subnet(s) 2422 contained in the control plane VCN 2416 can be configured to receive a signal from the service gateway 2436. In this embodiment, the control plane VCN 2416 and the data plane VCN 2418 may be configured to be called by a customer of the IaaS provider without calling public Internet 2454. Customers of the IaaS provider may desire this embodiment since database(s) that the customers use may be controlled by the IaaS provider and may be stored on the service tenancy 2419, which may be isolated from public Internet 2454.

Figure 25:
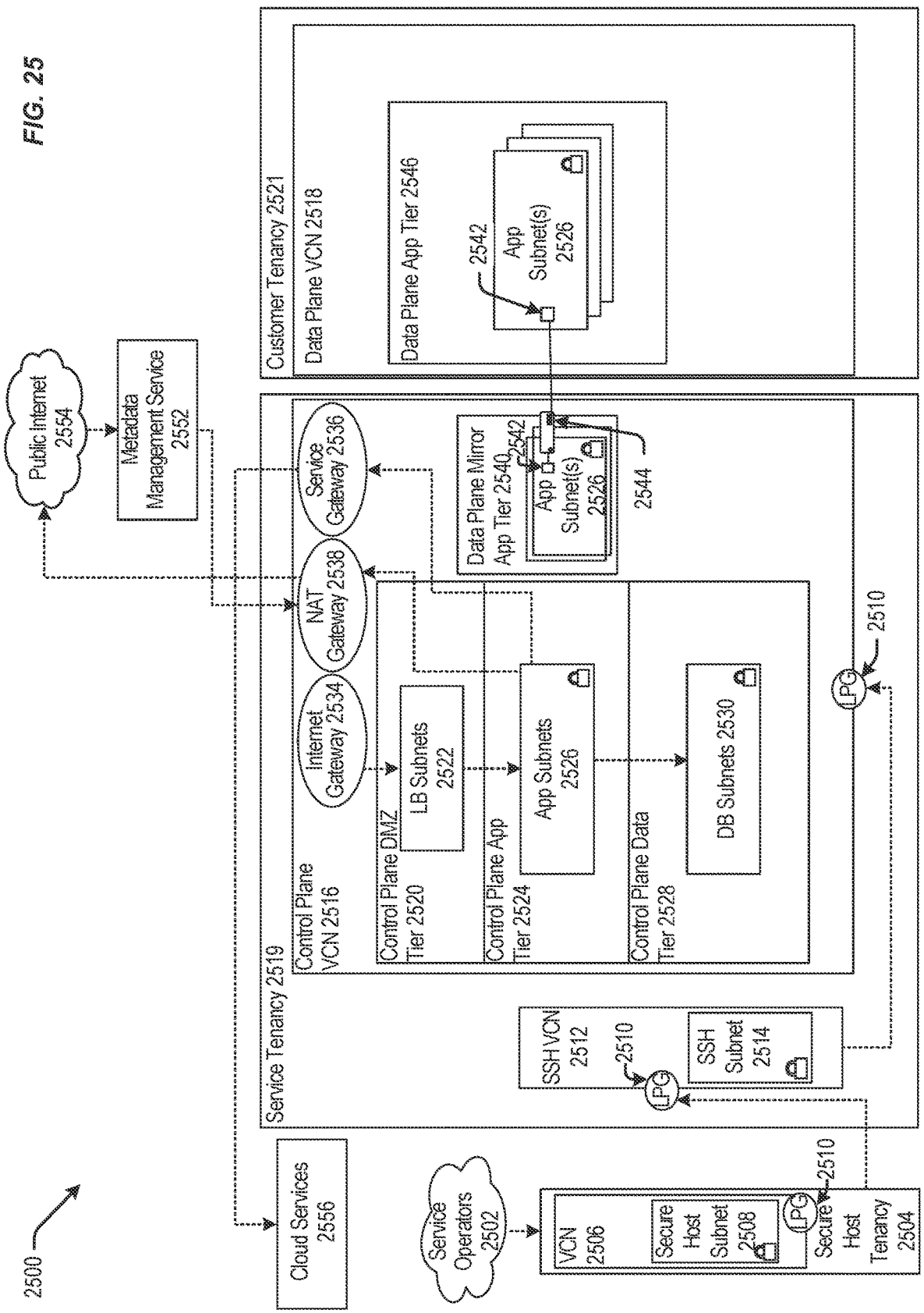
FIG. 25 is a block diagram illustrating another pattern for implementing a cloud infrastructure as a service system, according to at least one embodiment.

FIG. 25 is a block diagram 2500 illustrating another example pattern of an IaaS architecture, according to at least one embodiment. Service operators 2502 (e.g. service operators 2402 of FIG. 24) can be communicatively coupled to a secure host tenancy 2504 (e.g. the secure host tenancy 2404 of FIG. 24) that can include a virtual cloud network (VCN) 2506 (e.g. the VCN 2406 of FIG. 24) and a secure host subnet 2508 (e.g. the secure host subnet 2408 of FIG. 24). The VCN 2506 can include a local peering gateway (LPG) 2510 (e.g. the LPG 2410 of FIG. 24) that can be communicatively coupled to a secure shell (SSH) VCN 2512 (e.g. the SSH VCN 2412 of FIG. 24) via an LPG 2410 contained in the SSH VCN 2512. The SSH VCN 2512 can include an SSH subnet 2514 (e.g. the SSH subnet 2414 of FIG. 24), and the SSH VCN 2512 can be communicatively coupled to a control plane VCN 2516 (e.g. the control plane VCN 2416 of FIG. 24) via an LPG 2510 contained in the control plane VCN 2516. The control plane VCN 2516 can be contained in a service tenancy 2519 (e.g. the service tenancy 2419 of FIG. 24), and the data plane VCN 2518 (e.g. the data plane VCN 2418 of FIG. 24) can be contained in a customer tenancy 2521 that may be owned or operated by users, or customers, of the system.

The control plane VCN 2516 can include a control plane DMZ tier 2520 (e.g. the control plane DMZ tier 2420 of FIG. 24) that can include LB subnet(s) 2522 (e.g. LB subnet(s) 2422 of FIG. 24), a control plane app tier 2524 (e.g. the control plane app tier 2424 of FIG. 24) that can include app subnet(s) 2526 (e.g. app subnet(s) 2426 of FIG. 24), a control plane data tier 2528 (e.g. the control plane data tier 2428 of FIG. 24) that can include database (DB) subnet(s) 2530 (e.g. similar to DB subnet(s) 2430 of FIG. 24). The LB subnet(s) 2522 contained in the control plane DMZ tier 2520 can be communicatively coupled to the app subnet(s) 2526 contained in the control plane app tier 2524 and an Internet gateway 2534 (e.g. the Internet gateway 2434 of FIG. 24) that can be contained in the control plane VCN 2516, and the app subnet(s) 2526 can be communicatively coupled to the DB subnet(s) 2530 contained in the control plane data tier 2528 and a service gateway 2536 (e.g. the service gateway of FIG. 24) and a network address translation (NAT) gateway 2538 (e.g. the NAT gateway 2438 of FIG. 24). The control plane VCN 2516 can include the service gateway 2536 and the NAT gateway 2538.

The control plane VCN 2516 can include a data plane mirror app tier 2540 (e.g. the data plane mirror app tier 2440 of FIG. 24) that can include app subnet(s) 2526. The app subnet(s) 2526 contained in the data plane mirror app tier 2540 can include a virtual network interface controller (VNIC) 2542 (e.g. the VNIC of 2442) that can execute a compute instance 2544 (e.g. similar to the compute instance 2444 of FIG. 24). The compute instance 2544 can facilitate communication between the app subnet(s) 2526 of the data plane mirror app tier 2540 and the app subnet(s) 2526 that can be contained in a data plane app tier 2546 (e.g. the data plane app tier 2446 of FIG. 24) via the VNIC 2542 contained in the data plane mirror app tier 2540 and the VNIC 2542 contained in the data plane app tier 2546.

The Internet gateway 2534 contained in the control plane VCN 2516 can be communicatively coupled to a metadata management service 2552 (e.g. the metadata management service 2452 of FIG. 24) that can be communicatively coupled to public Internet 2554 (e.g. public Internet 2454 of FIG. 24). Public Internet 2554 can be communicatively coupled to the NAT gateway 2538 contained in the control plane VCN 2516. The service gateway 2536 contained in the control plane VCN 2516 can be communicatively couple to cloud services 2556 (e.g. cloud services 2456 of FIG. 24).

In some examples, the data plane VCN 2518 can be contained in the customer tenancy 2521. In this case, the IaaS provider may provide the control plane VCN 2516 for each customer, and the IaaS provider may, for each customer, set up a unique compute instance 2544 that is contained in the service tenancy 2519. Each compute instance 2544 may allow communication between the control plane VCN 2516, contained in the service tenancy 2519, and the data plane VCN 2518 that is contained in the customer tenancy 2521. The compute instance 2544 may allow resources, that are provisioned in the control plane VCN 2516 that is contained in the service tenancy 2519, to be deployed or otherwise used in the data plane VCN 2518 that is contained in the customer tenancy 2521.

In other examples, the customer of the IaaS provider may have databases that live in the customer tenancy 2521. In this example, the control plane VCN 2516 can include the data plane mirror app tier 2540 that can include app subnet(s) 2526. The data plane mirror app tier 2540 can reside in the data plane VCN 2518, but the data plane mirror app tier 2540 may not live in the data plane VCN 2518. That is, the data plane mirror app tier 2540 may have access to the customer tenancy 2521, but the data plane mirror app tier 2540 may not exist in the data plane VCN 2518 or be owned or operated by the customer of the IaaS provider. The data plane mirror app tier 2540 may be configured to make calls to the data plane VCN 2518 but may not be configured to make calls to any entity contained in the control plane VCN 2516. The customer may desire to deploy or otherwise use resources in the data plane VCN 2518 that are provisioned in the control plane VCN 2516, and the data plane mirror app tier 2540 can facilitate the desired deployment, or other usage of resources, of the customer.

In some embodiments, the customer of the IaaS provider can apply filters to the data plane VCN 2518. In this embodiment, the customer can determine what the data plane VCN 2518 can access, and the customer may restrict access to public Internet 2554 from the data plane VCN 2518. The IaaS provider may not be able to apply filters or otherwise control access of the data plane VCN 2518 to any outside networks or databases. Applying filters and controls by the customer onto the data plane VCN 2518, contained in the customer tenancy 2521, can help isolate the data plane VCN 2518 from other customers and from public Internet 2554.

In some embodiments, cloud services 2556 can be called by the service gateway 2536 to access services that may not exist on public Internet 2554, on the control plane VCN 2516, or on the data plane VCN 2518. The connection between cloud services 2556 and the control plane VCN 2516 or the data plane VCN 2518 may not be live or continuous. Cloud services 2556 may exist on a different network owned or operated by the IaaS provider. Cloud services 2556 may be configured to receive calls from the service gateway 2536 and may be configured to not receive calls from public Internet 2554. Some cloud services 2556 may be isolated from other cloud services 2556, and the control plane VCN 2516 may be isolated from cloud services 2556 that may not be in the same region as the control plane VCN 2516. For example, the control plane VCN 2516 may be located in "Region 1," and cloud service "Deployment 24," may be located in Region 1 and in "Region 2." If a call to Deployment 24 is made by the service gateway 2536 contained in the control plane VCN 2516 located in Region 1, the call may be transmitted to Deployment 24 in Region 1. In this example, the control plane VCN 2516, or Deployment 24 in Region 1, may not be communicatively coupled to, or otherwise in communication with, Deployment 24 in Region 2.

Figure 26:
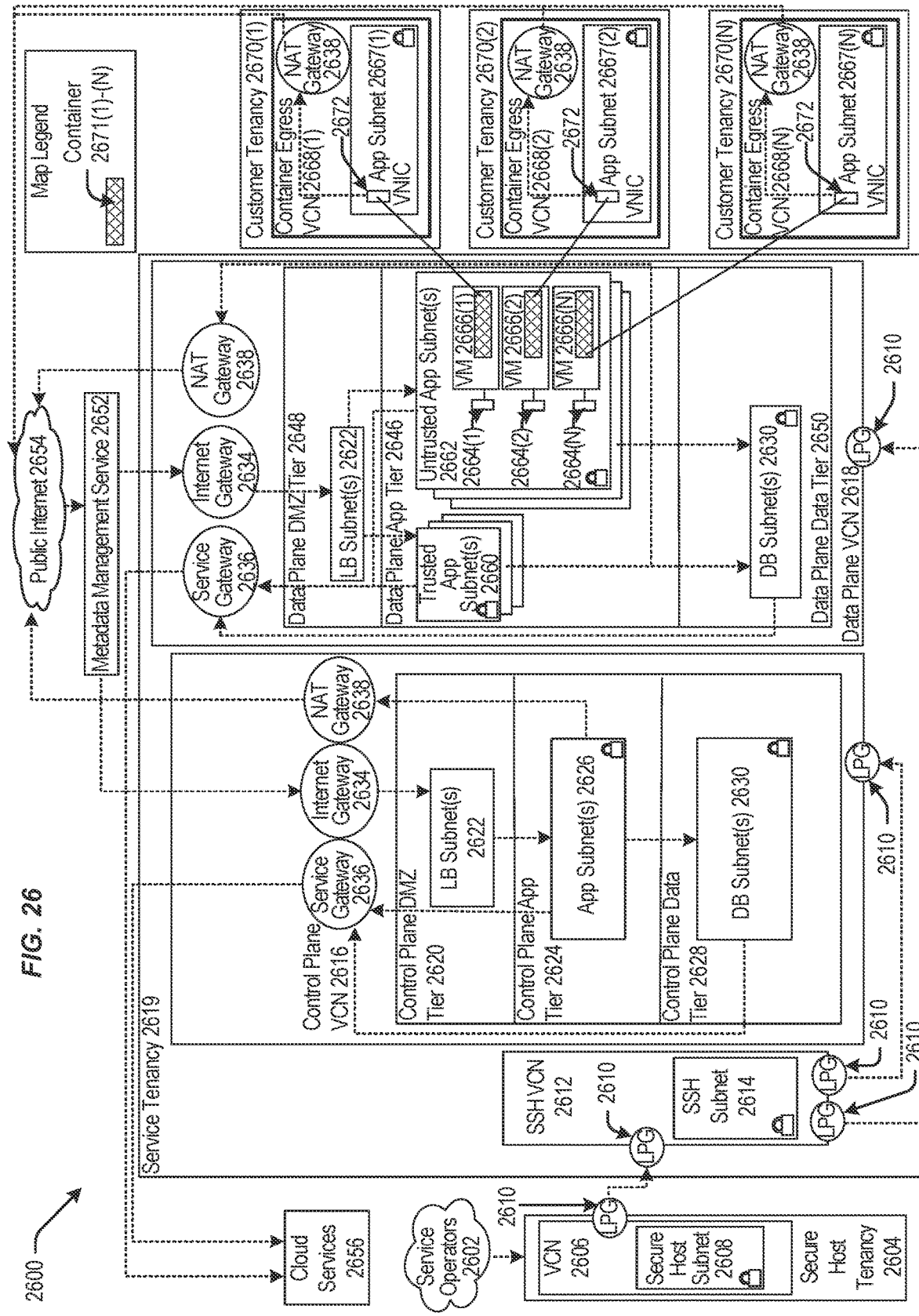
FIG. 26 is a block diagram illustrating another pattern for implementing a cloud infrastructure as a service system, according to at least one embodiment.

FIG. 26 is a block diagram 2600 illustrating another example pattern of an IaaS architecture, according to at least one embodiment. Service operators 2602 (e.g. service operators 2402 of FIG. 24) can be communicatively coupled to a secure host tenancy 2604 (e.g. the secure host tenancy 2404 of FIG. 24) that can include a virtual cloud network (VCN) 2606 (e.g. the VCN 2406 of FIG. 24) and a secure host subnet 2608 (e.g. the secure host subnet 2408 of FIG. 24). The VCN 2606 can include an LPG 2610 (e.g. the LPG 2410 of FIG. 24) that can be communicatively coupled to an SSH VCN 2612 (e.g. the SSH VCN 2412 of FIG. 24) via an LPG 2610 contained in the SSH VCN 2612. The SSH VCN 2612 can include an SSH subnet 2614 (e.g. the SSH subnet 2414 of FIG. 24), and the SSH VCN 2612 can be communicatively coupled to a control plane VCN 2616 (e.g. the control plane VCN 2416 of FIG. 24) via an LPG 2610 contained in the control plane VCN 2616 and to a data plane VCN 2618 (e.g. the data plane 2418 of FIG. 24) via an LPG 2610 contained in the data plane VCN 2618. The control plane VCN 2616 and the data plane VCN 2618 can be contained in a service tenancy 2619 (e.g. the service tenancy 2419 of FIG. 24).

The control plane VCN 2616 can include a control plane DMZ tier 2620 (e.g. the control plane DMZ tier 2420 of FIG. 24) that can include load balancer (LB) subnet(s) 2622 (e.g. LB subnet(s) 2422 of FIG. 24), a control plane app tier 2624 (e.g. the control plane app tier 2424 of FIG. 24) that can include app subnet(s) 2626 (e.g. similar to app subnet(s) 2426 of FIG. 24), a control plane data tier 2628 (e.g. the control plane data tier 2428 of FIG. 24) that can include DB subnet(s) 2630. The LB subnet(s) 2622 contained in the control plane DMZ tier 2620 can be communicatively coupled to the app subnet(s) 2626 contained in the control plane app tier 2624 and to an Internet gateway 2634 (e.g. the Internet gateway 2434 of FIG. 24) that can be contained in the control plane VCN 2616, and the app subnet(s) 2626 can be communicatively coupled to the DB subnet(s) 2630 contained in the control plane data tier 2628 and to a service gateway 2636 (e.g. the service gateway of FIG. 24) and a network address translation (NAT) gateway 2638 (e.g. the NAT gateway 2438 of FIG. 24). The control plane VCN 2616 can include the service gateway 2636 and the NAT gateway 2638.

The data plane VCN 2618 can include a data plane app tier 2646 (e.g. the data plane app tier 2446 of FIG. 24), a data plane DMZ tier 2648 (e.g. the data plane DMZ tier 2448 of FIG. 24), and a data plane data tier 2650 (e.g. the data plane data tier 2450 of FIG. 24). The data plane DMZ tier 2648 can include LB subnet(s) 2622 that can be communicatively coupled to trusted app subnet(s) 2660 and untrusted app subnet(s) 2662 of the data plane app tier 2646 and the Internet gateway 2634 contained in the data plane VCN 2618. The trusted app subnet(s) 2660 can be communicatively coupled to the service gateway 2636 contained in the data plane VCN 2618, the NAT gateway 2638 contained in the data plane VCN 2618, and DB subnet(s) 2630 contained in the data plane data tier 2650. The untrusted app subnet(s) 2662 can be communicatively coupled to the service gateway 2636 contained in the data plane VCN 2618 and DB subnet(s) 2630 contained in the data plane data tier 2650. The data plane data tier 2650 can include DB subnet(s) 2630 that can be communicatively coupled to the service gateway 2636 contained in the data plane VCN 2618.

The untrusted app subnet(s) 2662 can include one or more primary VNICs 2664(1)-(N) that can be communicatively coupled to tenant virtual machines (VMs) 2666(1)-(N). Each tenant VM 2666(1)-(N) can be communicatively coupled to a respective app subnet 2667(1)-(N) that can be contained in respective container egress VCNs 2668(1)-(N) that can be contained in respective customer tenancies 2670(1)-(N). Respective secondary VNICs 2672(1)-(N) can facilitate communication between the untrusted app subnet(s) 2662 contained in the data plane VCN 2618 and the app subnet contained in the container egress VCNs 2668(1)-(N). Each container egress VCNs 2668(1)-(N) can include a NAT gateway 2638 that can be communicatively coupled to public Internet 2654 (e.g. public Internet 2454 of FIG. 24).

The Internet gateway 2634 contained in the control plane VCN 2616 and contained in the data plane VCN 2618 can be communicatively coupled to a metadata management service 2652 (e.g. the metadata management system 2452 of FIG. 24) that can be communicatively coupled to public Internet 2654. Public Internet 2654 can be communicatively coupled to the NAT gateway 2638 contained in the control plane VCN 2616 and contained in the data plane VCN 2618. The service gateway 2636 contained in the control plane VCN 2616 and contained in the data plane VCN 2618 can be communicatively couple to cloud services 2656.

In some embodiments, the data plane VCN 2618 can be integrated with customer tenancies 2670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2646. Code to run the function may be executed in the VMs 2666(1)-(N), and the code may not be configured to run anywhere else on the data plane VCN 2618. Each VM 2666(1)-(N) may be connected to one customer tenancy 2670. Respective containers 2671(1)-(N) contained in the VMs 2666(1)-(N) may be configured to run the code. In this case, there can be a dual isolation (e.g., the containers 2671(1)-(N) running code, where the containers 2671(1)-(N) may be contained in at least the VM 2666(1)-(N) that are contained in the untrusted app subnet(s) 2662), which may help prevent incorrect or otherwise undesirable code from damaging the network of the IaaS provider or from damaging a network of a different customer. The containers 2671(1)-(N) may be communicatively coupled to the customer tenancy 2670 and may be configured to transmit or receive data from the customer tenancy 2670. The containers 2671(1)-(N) may not be configured to transmit or receive data from any other entity in the data plane VCN 2618. Upon completion of running the code, the IaaS provider may kill or otherwise dispose of the containers 2671(1)-(N).

In some embodiments, the trusted app subnet(s) 2660 may run code that may be owned or operated by the IaaS provider. In this embodiment, the trusted app subnet(s) 2660 may be communicatively coupled to the DB subnet(s) 2630 and be configured to execute CRUD operations in the DB subnet(s) 2630. The untrusted app subnet(s) 2662 may be communicatively coupled to the DB subnet(s) 2630, but in this embodiment, the untrusted app subnet(s) may be configured to execute read operations in the DB subnet(s) 2630. The containers 2671(1)-(N) that can be contained in the VM 2666(1)-(N) of each customer and that may run code from the customer may not be communicatively coupled with the DB subnet(s) 2630.

In other embodiments, the control plane VCN 2616 and the data plane VCN 2618 may not be directly communicatively coupled. In this embodiment, there may be no direct communication between the control plane VCN 2616 and the data plane VCN 2618. However, communication can occur indirectly through at least one method. An LPG 2610 may be established by the IaaS provider that can facilitate communication between the control plane VCN 2616 and the data plane VCN 2618. In another example, the control plane VCN 2616 or the data plane VCN 2618 can make a call to cloud services 2656 via the service gateway 2636. For example, a call to cloud services 2656 from the control plane VCN 2616 can include a request for a service that can communicate with the data plane VCN 2618.

Figure 27:
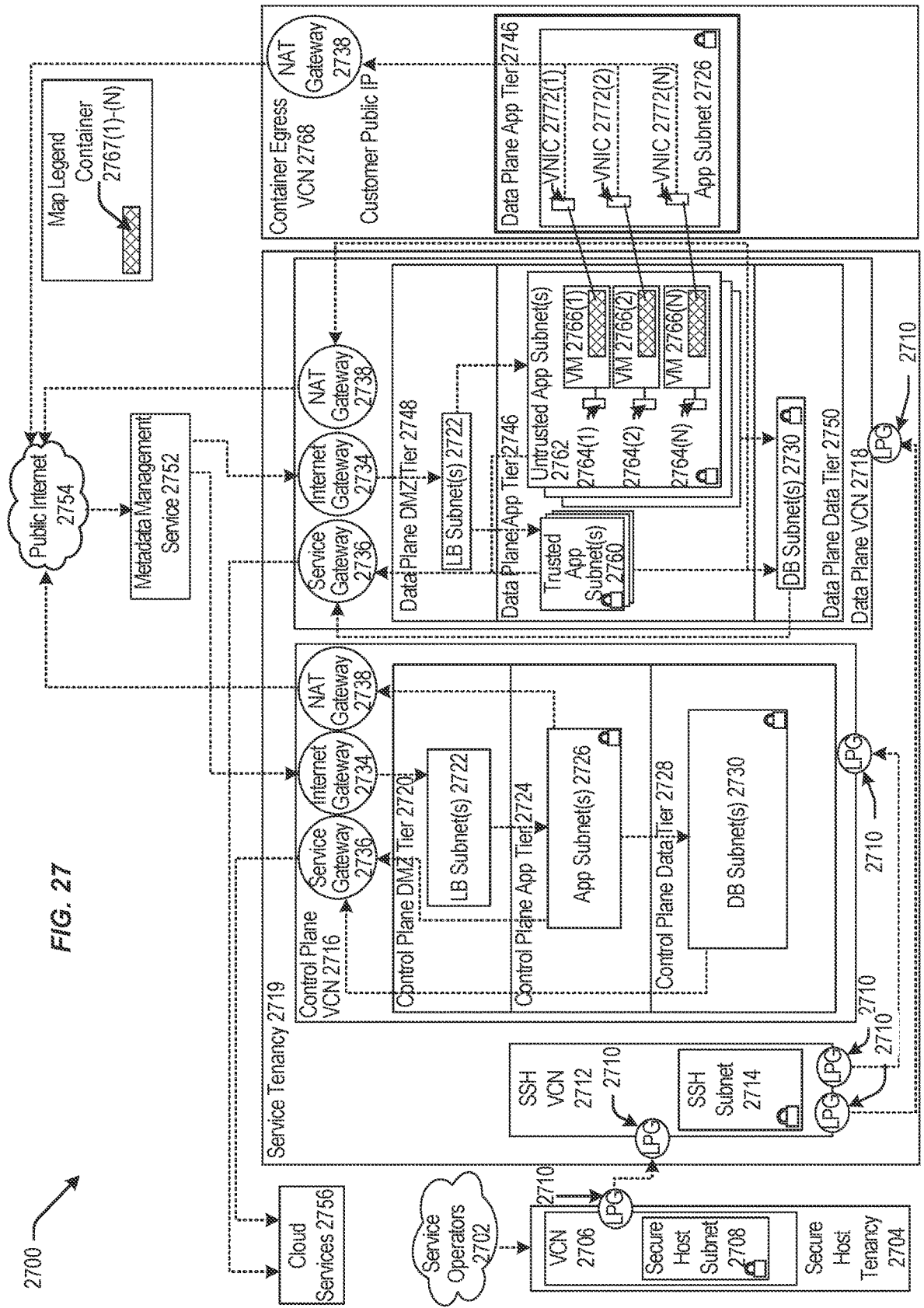
FIG. 27 is a block diagram illustrating another pattern for implementing a cloud infrastructure as a service system, according to at least one embodiment.

FIG. 27 is a block diagram 2700 illustrating another example pattern of an IaaS architecture, according to at least one embodiment. Service operators 2702 (e.g. service operators 2402 of FIG. 24) can be communicatively coupled to a secure host tenancy 2704 (e.g. the secure host tenancy 2404 of FIG. 24) that can include a virtual cloud network (VCN) 2706 (e.g. the VCN 2406 of FIG. 24) and a secure host subnet 2708 (e.g. the secure host subnet 2408 of FIG. 24). The VCN 2706 can include an LPG 2710 (e.g. the LPG 2410 of FIG. 24) that can be communicatively coupled to an SSH VCN 2712 (e.g. the SSH VCN 2412 of FIG. 24) via an LPG 2710 contained in the SSH VCN 2712. The SSH VCN 2712 can include an SSH subnet 2714 (e.g. the SSH subnet 2414 of FIG. 24), and the SSH VCN 2712 can be communicatively coupled to a control plane VCN 2716 (e.g. the control plane VCN 2416 of FIG. 24) via an LPG 2710 contained in the control plane VCN 2716 and to a data plane VCN 2718 (e.g. the data plane 2418 of FIG. 24) via an LPG 2710 contained in the data plane VCN 2718. The control plane VCN 2716 and the data plane VCN 2718 can be contained in a service tenancy 2719 (e.g. the service tenancy 2419 of FIG. 24).

The control plane VCN 2716 can include a control plane DMZ tier 2720 (e.g. the control plane DMZ tier 2420 of FIG. 24) that can include LB subnet(s) 2722 (e.g. LB subnet(s) 2422 of FIG. 24), a control plane app tier 2724 (e.g. the control plane app tier 2424 of FIG. 24) that can include app subnet(s) 2726 (e.g. app subnet(s) 2426 of FIG. 24), a control plane data tier 2728 (e.g. the control plane data tier 2428 of FIG. 24) that can include DB subnet(s) 2730 (e.g. DB subnet(s) 2630 of FIG. 26). The LB subnet(s) 2722 contained in the control plane DMZ tier 2720 can be communicatively coupled to the app subnet(s) 2726 contained in the control plane app tier 2724 and to an Internet gateway 2734 (e.g. the Internet gateway 2434 of FIG. 24) that can be contained in the control plane VCN 2716, and the app subnet(s) 2726 can be communicatively coupled to the DB subnet(s) 2730 contained in the control plane data tier 2728 and to a service gateway 2736 (e.g. the service gateway of FIG. 24) and a network address translation (NAT) gateway 2738 (e.g. the NAT gateway 2438 of FIG. 24). The control plane VCN 2716 can include the service gateway 2736 and the NAT gateway 2738.

The data plane VCN 2718 can include a data plane app tier 2746 (e.g. the data plane app tier 2446 of FIG. 24), a data plane DMZ tier 2748 (e.g. the data plane DMZ tier 2448 of FIG. 24), and a data plane data tier 2750 (e.g. the data plane data tier 2450 of FIG. 24). The data plane DMZ tier 2748 can include LB subnet(s) 2722 that can be communicatively coupled to trusted app subnet(s) 2760 (e.g. trusted app subnet(s) 2660 of FIG. 26) and untrusted app subnet(s) 2762 (e.g. untrusted app subnet(s) 2662 of FIG. 26) of the data plane app tier 2746 and the Internet gateway 2734 contained in the data plane VCN 2718. The trusted app subnet(s) 2760 can be communicatively coupled to the service gateway 2736 contained in the data plane VCN 2718, the NAT gateway 2738 contained in the data plane VCN 2718, and DB subnet(s) 2730 contained in the data plane data tier 2750. The untrusted app subnet(s) 2762 can be communicatively coupled to the service gateway 2736 contained in the data plane VCN 2718 and DB subnet(s) 2730 contained in the data plane data tier 2750. The data plane data tier 2750 can include DB subnet(s) 2730 that can be communicatively coupled to the service gateway 2736 contained in the data plane VCN 2718.

The untrusted app subnet(s) 2762 can include primary VNICs 2764(1)-(N) that can be communicatively coupled to tenant virtual machines (VMs) 2766(1)-(N) residing within the untrusted app subnet(s) 2762. Each tenant VM 2766(1)-(N) can run code in a respective container 2767(1)-(N), and be communicatively coupled to an app subnet 2726 that can be contained in a data plane app tier 2746 that can be contained in a container egress VCN 2768. Respective secondary VNICs 2772(1)-(N) can facilitate communication between the untrusted app subnet(s) 2762 contained in the data plane VCN 2718 and the app subnet contained in the container egress VCN 2768. The container egress VCN can include a NAT gateway 2738 that can be communicatively coupled to public Internet 2754 (e.g. public Internet 2454 of FIG. 24).

The Internet gateway 2734 contained in the control plane VCN 2716 and contained in the data plane VCN 2718 can be communicatively coupled to a metadata management service 2752 (e.g. the metadata management system 2452 of FIG. 24) that can be communicatively coupled to public Internet 2754. Public Internet 2754 can be communicatively coupled to the NAT gateway 2738 contained in the control plane VCN 2716 and contained in the data plane VCN 2718. The service gateway 2736 contained in the control plane VCN 2716 and contained in the data plane VCN 2718 can be communicatively couple to cloud services 2756.

In some examples, the pattern illustrated by the architecture of block diagram 2700 of FIG. 27 may be considered an exception to the pattern illustrated by the architecture of block diagram 2600 of FIG. 26 and may be desirable for a customer of the IaaS provider if the IaaS provider cannot directly communicate with the customer (e.g., a disconnected region). The respective containers 2767(1)-(N) that are contained in the VMs 2766(1)-(N) for each customer can be accessed in real-time by the customer. The containers 2767(1)-(N) may be configured to make calls to respective secondary VNICs 2772(1)-(N) contained in app subnet(s) 2726 of the data plane app tier 2746 that can be contained in the container egress VCN 2768. The secondary VNICs 2772(1)-(N) can transmit the calls to the NAT gateway 2738 that may transmit the calls to public Internet 2754. In this example, the containers 2767(1)-(N) that can be accessed in real-time by the customer can be isolated from the control plane VCN 2716 and can be isolated from other entities contained in the data plane VCN 2718. The containers 2767(1)-(N) may also be isolated from resources from other customers.

In other examples, the customer can use the containers 2767(1)-(N) to call cloud services 2756. In this example, the customer may run code in the containers 2767(1)-(N) that requests a service from cloud services 2756. The containers 2767(1)-(N) can transmit this request to the secondary VNICs 2772(1)-(N) that can transmit the request to the NAT gateway that can transmit the request to public Internet 2754. Public Internet 2754 can transmit the request to LB subnet(s) 2722 contained in the control plane VCN 2716 via the Internet gateway 2734. In response to determining the request is valid, the LB subnet(s) can transmit the request to app subnet(s) 2726 that can transmit the request to cloud services 2756 via the service gateway 2736.

It should be appreciated that IaaS architectures 2400, 2500, 2600, 2700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 28:
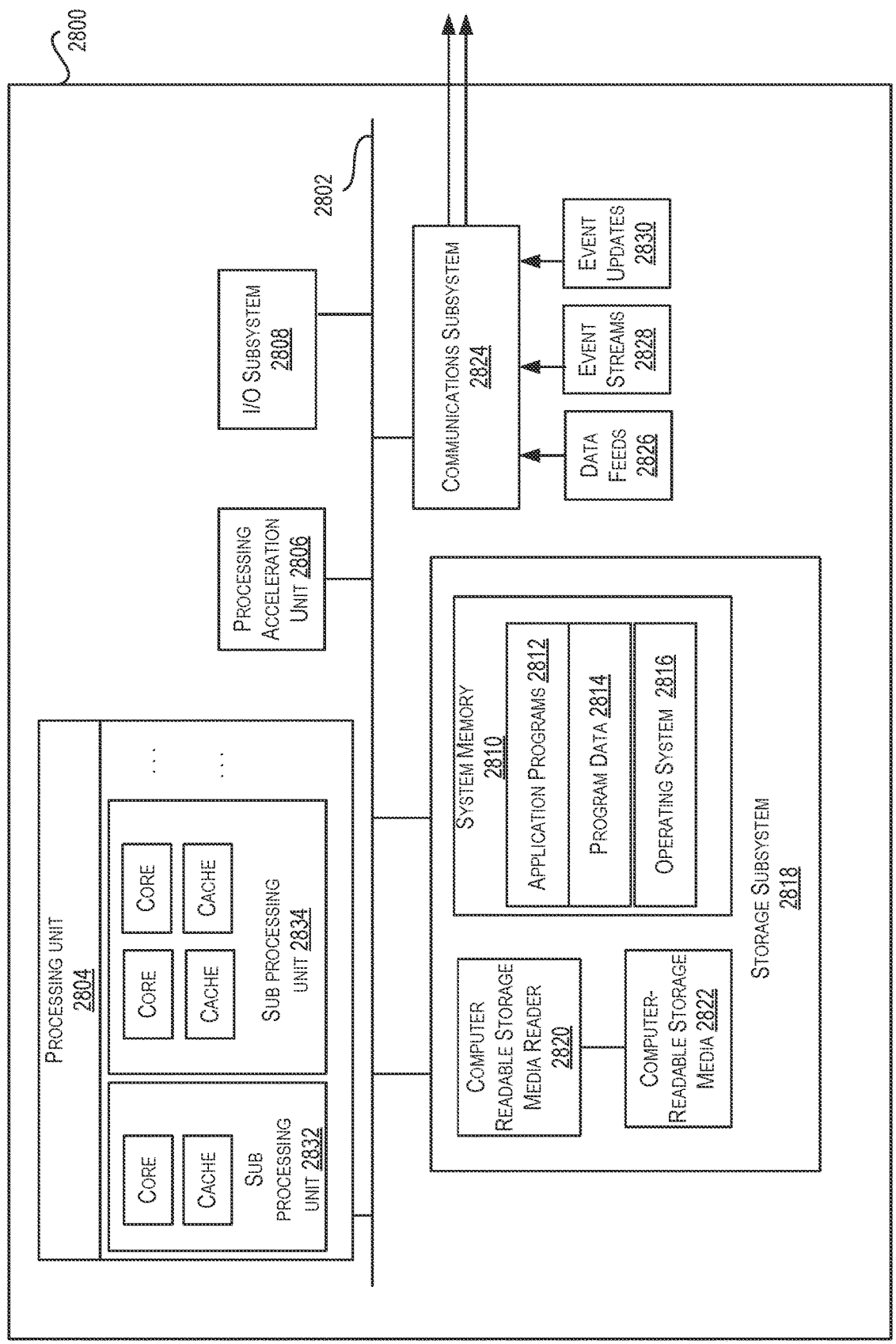
FIG. 28 is a block diagram illustrating an example computer system, according to at least one embodiment.

FIG. 28 illustrates an example computer system 2800, in which various embodiments may be implemented. The system 2800 may be used to implement any of the computer systems described above. As shown in the figure, computer system 2800 includes a processing unit 2804 that communicates with a number of peripheral subsystems via a bus subsystem 2802. These peripheral subsystems may include a processing acceleration unit 2806, an I/O subsystem 2808, a storage subsystem 2818 and a communications subsystem 2824. Storage subsystem 2818 includes tangible computer-readable storage media 2822 and a system memory 2810.

Bus subsystem 2802 provides a mechanism for letting the various components and subsystems of computer system 2800 communicate with each other as intended. Although bus subsystem 2802 is shown schematically as a single bus, alternative embodiments of the bus subsystem may utilize multiple buses. Bus subsystem 2802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2804, which can be implemented as one or more integrated circuits (e.g., a conventional microprocessor or microcontroller), controls the operation of computer system 2800. One or more processors may be included in processing unit 2804. These processors may include single core or multicore processors. In certain embodiments, processing unit 2804 may be implemented as one or more independent processing units 2832 and/or 2834 with single or multicore processors included in each processing unit. In other embodiments, processing unit 2804 may also be implemented as a quad-core processing unit formed by integrating two dual-core processors into a single chip.

In various embodiments, processing unit 2804 can execute a variety of programs in response to program code and can maintain multiple concurrently executing programs or processes. At any given time, some or all of the program code to be executed can be resident in processor(s) 2804 and/or in storage subsystem 2818. Through suitable programming, processor(s) 2804 can provide various functionalities described above. Computer system 2800 may additionally include a processing acceleration unit 2806, which can include a digital signal processor (DSP), a special-purpose processor, and/or the like.

I/O subsystem 2808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2800 may comprise a storage subsystem 2818 that comprises software elements, shown as being currently located within a system memory 2810. System memory 2810 may store program instructions that are loadable and executable on processing unit 2804, as well as data generated during the execution of these programs.

Depending on the configuration and type of computer system 2800, system memory 2810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2804. In some implementations, system memory 2810 may include multiple different types of memory, such as static random access memory (SRAM) or dynamic random access memory (DRAM). In some implementations, a basic input/output system (BIOS), containing the basic routines that help to transfer information between elements within computer system 2800, such as during start-up, may typically be stored in the ROM. By way of example, and not limitation, system memory 2810 also illustrates application programs 2812, which may include client applications, Web browsers, mid-tier applications, relational database management systems (RDBMS), etc., program data 2814, and an operating system 2816. By way of example, operating system 2816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 28 OS, and Palm® OS operating systems.

Storage subsystem 2818 may also provide a tangible computer-readable storage medium for storing the basic programming and data constructs that provide the functionality of some embodiments. Software (programs, code modules, instructions) that when executed by a processor provide the functionality described above may be stored in storage subsystem 2818. These software modules or instructions may be executed by processing unit 2804. Storage subsystem 2818 may also provide a repository for storing data used in accordance with the present disclosure.

Storage subsystem 2800 may also include a computer-readable storage media reader 2820 that can further be connected to computer-readable storage media 2822. Together and, optionally, in combination with system memory 2810, computer-readable storage media 2822 may comprehensively represent remote, local, fixed, and/or removable storage devices plus storage media for temporarily and/or more permanently containing, storing, transmitting, and retrieving computer-readable information.

Computer-readable storage media 2822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2800.

By way of example, computer-readable storage media 2822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2822 may include, but is not limited to, Zip® drives, flash memory cards, universal serial bus (USB) flash drives, secure digital (SD) cards, DVD disks, digital video tape, and the like. Computer-readable storage media 2822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2800.

Communications subsystem 2824 provides an interface to other computer systems and networks. Communications subsystem 2824 serves as an interface for receiving data from and transmitting data to other systems from computer system 2800. For example, communications subsystem 2824 may enable computer system 2800 to connect to one or more devices via the Internet. In some embodiments communications subsystem 2824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2824 can provide wired network connectivity (e.g., Ethernet) in addition to or instead of a wireless interface.

In some embodiments, communications subsystem 2824 may also receive input communication in the form of structured and/or unstructured data feeds 2826, event streams 2828, event updates 2830, and the like on behalf of one or more users who may use computer system 2800.

By way of example, communications subsystem 2824 may be configured to receive data feeds 2826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2824 may also be configured to receive data in the form of continuous data streams, which may include event streams 2828 of real-time events and/or event updates 2830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2824 may also be configured to output the structured and/or unstructured data feeds 2826, event streams 2828, event updates 2830, and the like to one or more databases that may be in communication with one or more streaming data source computers coupled to computer system 2800.

Computer system 2800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
    generating a table for an instance of a VLAN switching and routing service (VSRS), the VSRS coupling a first virtual layer 2 network with a second network, wherein the table contains information identifying IP addresses, MAC addresses, and virtual interface identifiers for instances within the first virtual layer 2 network;
    receiving with the VSRS a packet from a first compute instance for delivery to a second instance, wherein the first compute instance is inside of the second network, and wherein the second instance is inside of the first virtual layer 2 network;
    identifying with the VSRS the second instance for delivery of the packet based on information received with the packet and information contained within the table; and
    delivering the packet to the identified second instance.

2. The method of claim 1, wherein the first virtual layer 2 network comprises a plurality of instances.

3. The method of claim 2, wherein the first virtual layer 2 network comprises a plurality of layer 2 virtual network interface cards (L2 VNICs), and a plurality of switches, wherein each of the plurality of instances is communicatively coupled with a pair comprising a unique layer 2 virtual network interface card (L2 VNIC) and a unique switch.

4. The method of claim 3, wherein identifying with the VSRS the second instance for delivery of the packet based on information received with the packet and information contained within the table comprises:
    determining with the VSRS that the table does not include mapping information for the second instance;
    suspending with the VSRS delivery of the packet;
    broadcasting with the VSRS an ARP request to L2 VNICs in the first virtual layer 2 network, the ARP request containing an IP address of the second instance; and
    receiving with the VSRS an ARP response from the L2 VNIC of the second instance.

5. The method of claim 4, further comprising updating the table based on the received ARP response.

6. The method of claim 5, wherein the second network comprises an L3 network.

7. The method of claim 5, wherein the second network comprises a second virtual layer 2 network.

8. The method of claim 2, wherein the table is generated based on communications received by the VSRS.

9. The method of claim 8, further comprising instantiating the VSRS as a service on a plurality of hardware nodes.

10. The method of claim 9, further comprising distributing the table across the hardware nodes.

11. The method of claim 10, wherein the table distributed across the hardware nodes is accessible by another VSRS instantiation.

12. The method of claim 3, wherein the packet received with the VSRS from the first compute instance comprises an encapsulated packet including address information.

13. The method of claim 12, wherein the address information includes first address information identifying an address of the VSRS, and second address information identifying a destination IP address, wherein the destination IP address is the IP address of the second instance.

14. The method of claim 13, wherein identifying with the VSRS the second instance for delivery of the packet based on information received with the packet and information contained within the table comprises:
   decapsulating the packet;
   accessing the second address information; and
   looking up mapping for the packet in the table.

15. The method of claim 14, wherein delivering the packet to the identified second instance comprises:
   stripping the packet of the first address information; and
   re-encapsulating the packet.

16. The method of claim 15, wherein the packet is re-encapsulated with an layer 2 encapsulation.

17. The method of claim 16, wherein the re-encapsulated packet includes the IP address of the first compute instance, the destination IP address of the second instance, and a destination MAC address of the second instance.

18. The method of claim 17, delivering the packet to the identified second instance comprises delivering the packet to a tunnel end point of the second instance.

19. A system comprising:
   a physical network comprising:
      at least one processor; and
      a network virtualization device,
      wherein the at least one processor is configured to:
         instantiate an instance of a VLAN switching and routing service (VSRS), the VSRS coupling a first virtual layer 2 network with a second network;
         generate a table for the VSRS), wherein the table contains information identifying IP addresses, MAC addresses, and virtual interface identifiers for instances within the first virtual layer 2 network;
         receive with the VSRS a packet from a first compute instance for delivery to a second instance, wherein the first compute instance is inside of the second network, and wherein the second instance is inside of the first virtual layer 2 network;
         identify with the VSRS the second instance for delivery of the packet based on information received with the packet and information contained within the table; and
         deliver the packet to the identified second instance.

20. A non-transitory computer-readable storage medium storing a plurality of instructions executable by one or more processors, the plurality of instructions when executed by the one or more processors cause the one or more processors to:
   instantiate an instance of a VLAN switching and routing service (VSRS), the VSRS coupling a first virtual layer 2 network with a second network;
   generate a table for the VSRS), wherein the table contains information identifying IP addresses, MAC addresses, and virtual interface identifiers for instances within the first virtual layer 2 network;
   receive with the VSRS a packet from a first compute instance for delivery to a second instance, wherein the first compute instance is inside of the second network, and wherein the second instance is inside of the first virtual layer 2 network;
   identify with the VSRS the second instance for delivery of the packet based on information received with the packet and information contained within the table; and
   deliver the packet to the identified second instance.

* * * * *